(12) United States Patent
Takemori et al.

(10) Patent No.: US 11,212,087 B2
(45) Date of Patent: Dec. 28, 2021

(54) MANAGEMENT SYSTEM, KEY GENERATION DEVICE, IN-VEHICLE COMPUTER, MANAGEMENT METHOD, AND COMPUTER PROGRAM

(71) Applicant: KDDI CORPORATION, Tokyo (JP)

(72) Inventors: Keisuke Takemori, Tokyo (JP); Seiichiro Mizoguchi, Tokyo (JP); Hideaki Kawabata, Tokyo (JP); Ayumu Kubota, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 393 days.

(21) Appl. No.: 16/307,681

(22) PCT Filed: Mar. 28, 2017

(86) PCT No.: PCT/JP2017/012528
§ 371 (c)(1),
(2) Date: Dec. 6, 2018

(87) PCT Pub. No.: WO2018/029891
PCT Pub. Date: Feb. 15, 2018

(65) Prior Publication Data
US 2019/0199524 A1 Jun. 27, 2019

(30) Foreign Application Priority Data
Aug. 9, 2016 (JP) .............................. JP2016-156573

(51) Int. Cl.
*H04L 9/08* (2006.01)
*H04L 9/32* (2006.01)
(Continued)

(52) U.S. Cl.
CPC ............ *H04L 9/0861* (2013.01); *G06F 21/64* (2013.01); *G09C 1/00* (2013.01); *H04L 9/08* (2013.01);
(Continued)

(58) Field of Classification Search
CPC ....... H04L 9/0861; H04L 9/08; H04L 9/0816; H04L 9/0819; H04L 9/0822;
(Continued)

(56) References Cited

U.S. PATENT DOCUMENTS 9,177,153 B1 11/2015 Perrig et al.
10,142,311 B2 * 11/2018 Oshida ................ H04W 12/106
(Continued)

FOREIGN PATENT DOCUMENTS

DE 112014005412 8/2016
EP 3232602 10/2017
(Continued)

OTHER PUBLICATIONS

Takemori, Keisuke, "Automotive Security Using Secure Element", KDDI, 2015, pp. 11 and 14-15 (Year: 2015).*
(Continued)

*Primary Examiner* — Kristine L Kincaid
*Assistant Examiner* — Alexander R Lapian
(74) *Attorney, Agent, or Firm* — Greenblum & Bernstein, P.L.C.

(57) ABSTRACT

Provided are a key generation device and an in-vehicle computer which is installed in a vehicle. The key generation device includes a vehicle interface, a key generation unit that generates first and second keys, a cryptographic processing unit that encrypts the first key with an initial key to generate first encrypted data and encrypts the second key with the first key to generate second encrypted data, an expected value calculation unit that calculates an expected value of stored data using the second key, and a verification unit that verifies a received measured value on the basis of the expected value, and the key generation device transmits the first and second encrypted data to the vehicle. The in-vehicle computer includes an interface unit, a cryptographic processing unit
(Continued)

unit that decrypts the received first encrypted data, and decrypts the received second encrypted data, and a measured value calculation unit.

20 Claims, 12 Drawing Sheets

(51) Int. Cl.
*G06F 21/64* (2013.01)
*G09C 1/00* (2006.01)
*H04L 9/14* (2006.01)

(52) U.S. Cl.
CPC .............. *H04L 9/0894* (2013.01); *H04L 9/14* (2013.01); *H04L 9/32* (2013.01); *H04L 2209/84* (2013.01)

(58) Field of Classification Search
CPC ....... H04L 9/0877; H04L 9/0894; H04L 9/14; H04L 9/32; G06F 21/64; G09C 1/00
See application file for complete search history.

(56) References Cited

U.S. PATENT DOCUMENTS

| | | | |
|---|---|---|---|
| 2001/0002814 A1 | 6/2001 | Suganuma et al. | |
| 2008/0022121 A1* | 1/2008 | Fu | H04L 63/0853 713/185 |
| 2011/0083161 A1 | 4/2011 | Ishida et al. | |
| 2011/0320089 A1 | 12/2011 | Lewis | |
| 2013/0219170 A1 | 8/2013 | Naitou et al. | |
| 2014/0181526 A1 | 6/2014 | Alrabady et al. | |
| 2014/0248860 A1 | 9/2014 | Cepuran et al. | |
| 2015/0120560 A1* | 4/2015 | Fisher | G06Q 20/3224 705/44 |
| 2015/0180840 A1 | 6/2015 | Jung et al. | |
| 2016/0378457 A1 | 12/2016 | Adachi et al. | |
| 2017/0060559 A1* | 3/2017 | Ye | G06F 21/572 |
| 2017/0353315 A1 | 12/2017 | Dottax et al. | |
| 2019/0007215 A1* | 1/2019 | Hakuta | H04L 9/3247 |

FOREIGN PATENT DOCUMENTS

| | | |
|---|---|---|
| FR | 3030831 | 6/2016 |
| JP | 2013-192091 A | 9/2013 |
| JP | 2014-514203 A | 6/2014 |
| JP | 2014-182571 A | 9/2014 |
| JP | 2015-103163 A | 6/2015 |
| JP | 2016-072675 A | 5/2016 |
| JP | 2016-092811 A | 5/2016 |
| JP | 2016-116216 | 6/2016 |
| WO | 2012/130257 A1 | 10/2012 |
| WO | 2014/002280 A1 | 1/2014 |

OTHER PUBLICATIONS

Nilsson D K et al., "A Framework for Self-Verification of Firmware Updates over the Air in Vehicle ECUs", 2008 IEEE Globecom Workshops; 30 Nov. 4-Dec. 2008; New Orleans, LA, USA, IEEE, Piscataway, NJ, USA, XP0314056000, ISBN: 978-1-4244-3061-1, Nov. 30, 2008, pp. 1-5.
Official Communication issued in European Patent Office (EPO) Patent Application No. 17838967.2, dated Feb. 6, 2020.
Official Communication issued in Japanese family member Patent Appl. No. 2016-156573, dated Apr. 4, 2017, along with an English translation thereof.
International Search Report issued in International Bureau of WIPO Patent Application No. PCT/JP2017/012528, dated Jun. 13, 2017, along with an English translation thereof.
AN4240 Application note, "Introduction to the Cryptographic Service Engine (CSE) module for SPC56ECxx and SPC564Bxx devices," STMicroelectronics, http://www.st.com/web/en/resource/technical/document/application_note/DM00075575.pdf, Jun. 28, 2016.
"JIS D 4901, Vehicle Identification Number (VPN)", Japanese Industrial Standards, 1982.
Asano, "Increased Necessity of Internet Authentication by Establishment of Electronic Signature Law Practical Guidebook for Introduction of "PKI"", N+1 Magazine Network Guide, Japan, Softbank Publishing Corp., vol. 1, No. 6, Sep. 1, 2001, pp. 94-95.
Kawabata et al., "A Key Management Framework for Automotive ECUs", SCIS 2016, [USB], Japan, 2F 4-5, Jan. 22, 2016, pp. 1-7
Okamoto, "Cryptogram technology for realization of a bright information society 5. Distribution management of a cipher key", bit, vol. 23, No. 12, Nov. 1, 1991 (Nov. 1, 1991), pp. 51-59
Sheldon, "Encyclopedia of Networking", Japan, Softbank Corporation, May 31, 1996, pp. 691-692.
Takemori, "In-Vehicle Network Security Using Secure Elements-Discussion of Security Technologies-", IEICE Technical Report, vol. 114, No. 508, Mar. 2015, pp. 73-78
Takemori et al., "Key Management for ECU and Code Authetications Using Tamper-resistant Secure Element", IEICE Technical Report, vol. 115, No. 366, Dec. 10, 2015 (Dec. 10, 2015), pp. 227-232
Takemori et al., "Protection for Automotive Control System Using Secure Boot and Authentication", IEICE Technical Report, vol 114, No. 225, Sep. 12, 2014 (Sep. 12, 2014), pp. 47-54
Tsuji, "Relationship between Information Processing Technology and Society in Electronic Commerce", Information Processing Society of Japan, vol. 42, No. 3, Mar. 15, 2001, pp. 316-321
U.S. Appl. No. 16/307,394 to Keisuke Takemori, filed Dec. 5, 2018.
U.S. Appl. No. 16/307,414 to Keisuke Takemori et al., filed Dec. 5, 2018.
International Search Report issued in International Bureau of WIPO family member Patent Appl. No. 2016-156573, dated Apr. 4, 2017, along with an English translation thereof.
Decision of Rejection issued in Japanese family member Patent Appl. No. 2016-156573, dated Jul. 11, 2017, along with an English translation thereof.
Notice of Allowance issued in Japanese family member Patent Appl. No. 2017-197257, dated Nov. 20, 2018, along with an English translation thereof.
Official Communication issued in International Bureau of WIPO Patent Application No. PCT/JP2017/012528, dated Jun. 13, 2017, along with an English translation thereof.

* cited by examiner

MANAGEMENT SYSTEM, KEY GENERATION DEVICE, IN-VEHICLE COMPUTER, MANAGEMENT METHOD, AND COMPUTER PROGRAM

TECHNICAL FIELD

The present invention relates to a management system, a key generation device, an in-vehicle computer, a management method, and a computer program.

Priority is claimed on Japanese Patent Application No. 2016-156573, filed Aug. 9, 2016, the content of which is incorporated herein by reference.

BACKGROUND ART

Conventionally, a car has an electronic control unit (ECU), and implements a function such as engine control through the ECU. The ECU is a type of computer and implements a desired function through a computer program. For example, security technology for an in-vehicle control system configured by connecting a plurality of ECUs to a controller area network (CAN) is described in Non-Patent Document 1.

CITATION LIST

Non-Patent Literature

[Non-Patent Literature 1]
Keisuke TAKEMORI, "In-vehicle Network Security Using Secure Elements: Discussion of Security Technologies", Institute of Electronics, Information and Communication Engineers, Technical Report, vol. 114, no. 508, pp. 73-78, March 2015

[Non-Patent Literature 2]
Japanese Industrial Standards, JIS D4901, "Vehicle Identification Number (VIN)"

[Non-Patent Literature 3]
STMicroelectronics, "AN4240 Application note", retrieved on Jun. 28, 2016, Internet <URL: http://www.st.com/web/en/resource/technical/document/application_note/DM00075575.pdf>

SUMMARY OF INVENTION

Problem to be Solved by the Invention

One object is to improve the reliability of an ECU which is applied to an in-vehicle control system of a car.

The present invention is contrived in consideration of such circumstances, and an object thereof is to provide a management system, a key generation device, an in-vehicle computer, a management method, and a computer program that make it possible to improve the reliability of an in-vehicle computer such as an ECU which is installed in a vehicle such as an car.

Means for Solving the Problem (1) According to an aspect of the present invention, there is provided a management system including: a key generation device; and an in-vehicle computer which is installed in a vehicle, wherein the key generation device includes a vehicle interface configured to transmit and receive data to and from the vehicle, a key generation unit configured to generate a first key and a second key which are stored in the in-vehicle computer, a cryptographic processing unit configured to encrypt the first key with an initial key which is stored in advance in the in-vehicle computer to generate first encrypted data, and encrypts the second key with the first key to generate second encrypted data, an expected value calculation unit configured to calculate an expected value of stored data which is stored in advance in the in-vehicle computer using the second key, and a verification unit configured to verify a measured value received from the vehicle through the vehicle interface on the basis of the expected value, wherein the first encrypted data and the second encrypted data are transmitted to the vehicle through the vehicle interface, and wherein the in-vehicle computer includes an interface unit configure to transmit and receive data to and from a device outside of the in-vehicle computer, a cryptographic processing unit configured to decrypt the first encrypted data received from the key generation device through the interface unit with the initial key which is stored in advance in the in-vehicle computer to acquire the first key, and decrypt the second encrypted data received from the key generation device through the interface unit with the acquired first key to acquire the second key, and a measured value calculation unit configure to calculate the measured value of the stored data which is stored in advance in the in-vehicle computer using the acquired second key, wherein the measured value is transmitted to the key generation device through the interface unit.

(2) According to an aspect of the present invention, in the management system of the above (1), a plurality of the in-vehicle computers are installed in the vehicle, and a first in-vehicle computer out of the plurality of in-vehicle computers relays the first encrypted data and the second encrypted data, transmitted from the key generation device, to a second in-vehicle computer out of the plurality of in-vehicle computers.

(3) According to an aspect of the present invention, there is provided a management system including: a key generation device; and an in-vehicle computer which is installed in a vehicle, wherein the key generation device includes a vehicle interface configured to transmit and receive data to and from the vehicle, a key generation unit configured to generate a first key and a second key which are stored in the in-vehicle computer, an expected value calculation unit configured to calculate an expected value of stored data which is stored in advance in the in-vehicle computer using the second key, and a cryptographic processing unit configured to encrypt the first key with an initial key which is stored in advance in the in-vehicle computer to generate first encrypted data, encrypts the second key with the first key to generate second encrypted data, and encrypts the expected value with the first key to generate fourth encrypted data, wherein the first encrypted data, the second encrypted data and the fourth encrypted data are transmitted to the vehicle through the vehicle interface, and wherein the in-vehicle computer includes an interface unit configured to transmit and receive data to and from a device outside of the in-vehicle computer, a cryptographic processing unit configured to decrypt the first encrypted data received from the key generation device through the interface unit with the initial key which is stored in advance in the in-vehicle computer to acquire the first key, decrypts the second encrypted data received from the key generation device through the interface unit with the acquired first key to acquire the second key, and decrypts the fourth encrypted data received from the key generation device through the interface unit with the acquired first key to acquire the expected value, and a measurement unit configured to calculate a measured value of the stored data which is stored in advance in the in-vehicle computer using the acquired second key, and verifies the measured value on the basis of the acquired expected value, wherein a verification result for the measured value is transmitted through the interface unit.

(4) According to an aspect of the present invention, in the management system of the above (3), a plurality of the in-vehicle computers are installed in the vehicle, and a first in-vehicle computer out of the plurality of in-vehicle computers relays the first encrypted data, the second encrypted data and the fourth encrypted data, transmitted from the key generation device, to a second in-vehicle computer out of the plurality of in-vehicle computers.

(5) According to an aspect of the present invention, there is provided a management system including: a key generation device; and an in-vehicle computer which is installed in a vehicle, wherein the key generation device includes a vehicle interface configured to transmit and receive data to and from the vehicle, a key generation unit configured to generate a first key and a second key which are stored in the in-vehicle computer, an expected value calculation unit configure to calculate an expected value of stored data which is stored in advance in the in-vehicle computer using the second key, and a cryptographic processing unit configure to encrypt the first key with an initial key which is stored in advance in the in-vehicle computer to generate first encrypted data, encrypts the second key with the first key to generate second encrypted data, and encrypts the expected value with the first key to generate fourth encrypted data, wherein a verification value, the first encrypted data, the second encrypted data and the fourth encrypted data are transmitted to the vehicle through the vehicle interface, wherein the in-vehicle computer includes an interface unit configured to transmit and receive data to and from a device outside of the in-vehicle computer, a cryptographic processing unit configure to decrypt the first encrypted data received from the key generation device through the interface unit with the initial key which is stored in advance in the in-vehicle computer to acquire the first key, decrypt the second encrypted data received from the key generation device through the interface unit with the acquired first key to acquire the second key, and decrypt the fourth encrypted data received from the key generation device through the interface unit with the acquired first key to acquire the expected value, and a measurement unit configured to calculate a measured value of the stored data which is stored in advance in the in-vehicle computer using the acquired second key, and verify the measured value on the basis of the acquired expected value, wherein a verification result for the measured value is transmitted through the interface unit, wherein the in-vehicle computer transmits the verification result which is inclusive of the verification value received from the key generation device through the interface unit in a case where the verification of the measured value has been passed, and transmits the verification result which is not inclusive of the verification value received from the key generation device through the interface unit in a case where the verification of the measured value has failed, and wherein the key generation device further includes a verification unit configured to verify a verification value included in the verification result received from the vehicle through the vehicle interface on the basis of the verification value supplied to the vehicle.

(6) According to an aspect of the present invention, in the management system of the above (5), a plurality of the in-vehicle computers are installed in the vehicle, and a first in-vehicle computer out of the plurality of in-vehicle computers relays the first encrypted data, the second encrypted data and the fourth encrypted data, transmitted from the key generation device, to a second in-vehicle computer out of the plurality of in-vehicle computers.

(7) According to an aspect of the present invention, there is provided a key generation device including: a vehicle interface that transmits and receives data to and from a vehicle; a key generation unit that generates a first key and a second key which are stored in an in-vehicle computer installed in the vehicle; a cryptographic processing unit configured to encrypt the first key with an initial key which is stored in advance in the in-vehicle computer to generate first encrypted data, and encrypt the second key with the first key to generate second encrypted data; an expected value calculation unit configured to calculate an expected value of stored data which is stored in advance in the in-vehicle computer using the second key; and a verification unit configured to verify a measured value received from the vehicle through the vehicle interface on the basis of the expected value, wherein the first encrypted data and the second encrypted data are transmitted to the vehicle through the vehicle interface.

(8) According to an aspect of the present invention, there is provided an in-vehicle computer which is installed in a vehicle, including: an interface unit configured to transmit and receive data to and from a device outside of the in-vehicle computer; a cryptographic processing unit configured to decrypt first encrypted data received from a key generation device through the interface unit with an initial key which is stored in advance in the in-vehicle computer to acquire a first key, and decrypt second encrypted data received from the key generation device through the interface unit with the acquired first key to acquire a second key; and a measured value calculation unit configured to calculate a measured value of stored data which is stored in advance in the in-vehicle computer using the acquired second key, wherein the measured value is transmitted to the key generation device through the interface unit.

(9) According to an aspect of the present invention, there is provided a key generation device including: a vehicle interface configured to transmit and receive data to and from a vehicle; a key generation unit configured to generate a first key and a second key which are stored in an in-vehicle computer installed in the vehicle; an expected value calculation unit configured to calculate an expected value of stored data which is stored in advance in the in-vehicle computer using the second key; and a cryptographic processing unit configured to encrypt the first key with an initial key which is stored in advance in the in-vehicle computer to generate first encrypted data, encrypt the second key with the first key to generate second encrypted data, and encrypt the expected value with the first key to generate fourth encrypted data, wherein the first encrypted data, the second encrypted data and the fourth encrypted data are transmitted to the vehicle through the vehicle interface.

(10) According to an aspect of the present invention, there is provided an in-vehicle computer which is installed in a vehicle, including: an interface unit configured to transmit and receive data to and from a device outside of the in-vehicle computer; a cryptographic processing unit configured to decrypt first encrypted data received from a key generation device through the interface unit with an initial key which is stored in advance in the in-vehicle computer to acquire a first key, decrypt second encrypted data received from the key generation device through the interface unit with the acquired first key to acquire a second key, and decrypt fourth encrypted data received from the key generation device through the interface unit with the acquired first key to acquire an expected value; and a measurement unit configured to calculate a measured value of stored data which is stored in advance in the in-vehicle computer using the acquired second key, and verify the measured value on the basis of the acquired expected value, wherein a verification result for the measured value is transmitted through the interface unit.

(11) According to an aspect of the present invention, there is provided a key generation device including: a vehicle interface configured to transmit and receive data to and from a vehicle; a key generation unit configured to generate a first key and a second key which are stored in an in-vehicle computer installed in the vehicle; an expected value calculation unit configured to calculate an expected value of stored data which is stored in advance in the in-vehicle computer using the second key; and a cryptographic processing unit configured to encrypt the first key with an initial key which is stored in advance in the in-vehicle computer to generate first encrypted data, encrypt the second key with the first key to generate second encrypted data, and encrypt the expected value with the first key to generate fourth encrypted data, wherein the key generation device is a key generation device configured to transmit a verification value, the first encrypted data, the second encrypted data and the fourth encrypted data to the vehicle through the vehicle interface, and the key generation device further includes a verification unit configured to verify a verification value received from the vehicle through the vehicle interface on the basis of the verification value supplied to the vehicle.

(12) According to an aspect of the present invention, there is provided an in-vehicle computer which is installed in a vehicle, including: an interface unit configured to transmit and receive data to and from a device outside of the in-vehicle computer; a cryptographic processing unit configured to decrypt first encrypted data received from a key generation device through the interface unit with an initial key which is stored in advance in the in-vehicle computer to acquire a first key, decrypt second encrypted data received from the key generation device through the interface unit with the acquired first key to acquire a second key, and decrypt fourth encrypted data received from the key generation device through the interface unit with the acquired first key to acquire an expected value; and a measurement unit configured to calculate a measured value of stored data which is stored in advance in the in-vehicle computer using the acquired second key, and verify the measured value on the basis of the acquired expected value, wherein a verification result for the measured value is transmitted through the interface unit, and the in-vehicle computer transmits the verification result which is inclusive of a verification value received from the key generation device through the interface unit in a case where the verification of the measured value has been passed, and transmits the verification result which is not inclusive of the verification value received from the key generation device through the interface unit in a case where the verification of the measured value has failed.

(13) According to an aspect of the present invention, there is provided a method of managing a management system including a key generation device and an in-vehicle computer which is installed in a vehicle, the method including: causing the key generation device to generate a first key and a second key which are stored in the in-vehicle computer; causing the key generation device to encrypt the first key with an initial key which is stored in advance in the in-vehicle computer to generate first encrypted data, and to encrypt the second key with the first key to generate second encrypted data; causing the in-vehicle computer to decrypt the first encrypted data received from the key generation device through an interface unit that transmits and receives data to and from a device outside of the in-vehicle computer with the initial key which is stored in advance in the in-vehicle computer to acquire the first key, and to decrypt the second encrypted data received from the key generation device through the interface unit with the acquired first key to acquire the second key; causing the in-vehicle computer to calculate a measured value of stored data which is stored in advance in the in-vehicle computer using the acquired second key; causing the in-vehicle computer to transmit the measured value to the key generation device through the interface unit; causing the key generation device to calculate an expected value of stored data which is stored in advance in the in-vehicle computer using the second key; and causing the key generation device to verify the measured value received from the vehicle through a vehicle interface that transmits and receives data to and from the vehicle on the basis of the expected value.

(14) According to an aspect of the present invention, there is provided a method of managing a management system including a key generation device and an in-vehicle computer which is installed in a vehicle, the method including: causing the key generation device to generate a first key and a second key which are stored in the in-vehicle computer; causing the key generation device to calculate an expected value of stored data which is stored in advance in the in-vehicle computer using the second key; causing the key generation device to encrypt the first key with an initial key which is stored in advance in the in-vehicle computer to generate first encrypted data, to encrypt the second key with the first key to generate second encrypted data, and to encrypt the expected value with the first key to generate fourth encrypted data; causing the in-vehicle computer to decrypt the first encrypted data received from the key generation device through an interface unit that transmits and receives data to and from a device outside of the in-vehicle computer with the initial key which is stored in advance in the in-vehicle computer to acquire the first key, to decrypt the second encrypted data received from the key generation device through the interface unit with the acquired first key to acquire the second key, and to decrypt the fourth encrypted data received from the key generation device through the interface unit with the acquired first key to acquire the expected value; causing the in-vehicle computer to calculate a measured value of stored data which is stored in advance in the in-vehicle computer using the acquired second key, and verify the measured value on the basis of the acquired expected value; and causing the in-vehicle computer to transmit a verification result for the measured value through the interface unit.

(15) According to an aspect of the present invention, there is provided a method of managing a management system including a key generation device and an in-vehicle computer which is installed in a vehicle, the method including: causing the key generation device to generate a first key and a second key which are stored in the in-vehicle computer; causing the key generation device to calculate an expected value of stored data which is stored in advance in the in-vehicle computer using the second key; causing the key generation device to encrypt the first key with an initial key which is stored in advance in the in-vehicle computer to generate first encrypted data, to encrypt the second key with the first key to generate second encrypted data, and to encrypt the expected value with the first key to generate fourth encrypted data; causing the in-vehicle computer to decrypt the first encrypted data received from the key generation device through an interlace unit that transmits and receives data to and from a device outside of the in-vehicle computer with the initial key which is stored in advance in the in-vehicle computer to acquire the first key, to decrypt the second encrypted data received from the key generation device through the interface unit with the acquired first key to acquire the second key, and to decrypt the fourth encrypted data received from the key generation device through the interface unit with the acquired first key to acquire the expected value; causing the in-vehicle computer to calculate a measured value of stored data which is stored in advance in the in-vehicle computer using the acquired second key, and verify the measured value on the basis of the acquired expected value; causing the in-vehicle computer to generate a verification result for the measured value which is inclusive of a verification value received from the key generation device through the interface unit in a case where the verification of the measured value has been passed, and to generate the verification result which is not inclusive of the verification value received from the key generation device through the interface unit in a case where the verification of the measured value has failed; causing the in-vehicle computer to transmit the verification result through the interface unit; and causing the key generation device to verify a verification value included in the verification result received from the vehicle through a vehicle interface on the basis of the verification value supplied to the vehicle.

(16) According to an aspect of the present invention, there is provided a computer program causing a computer of a key generation device having a vehicle interface that transmits and receives data to and from a vehicle to execute the following processes of: generating a first key and a second key which are stored in an in-vehicle computer installed in the vehicle; encrypting the first key with an initial key which is stored in advance in the in-vehicle computer to generate first encrypted data, and encrypting the second key with the first key to generate second encrypted data; calculating an expected value of stored data which is stored in advance in the in-vehicle computer using the second key; verifying a measured value received from the vehicle through the vehicle interface on the basis of the expected value; and transmitting the first encrypted data and the second encrypted data to the vehicle through the vehicle interface.

(17) According to an aspect of the present invention, there is provided a computer program causing an in-vehicle computer which is installed in a vehicle to execute the following processes of: decrypting first encrypted data received from a key generation device through an interface unit that transmits and receives data to and from a device outside of the in-vehicle computer with an initial key which is stored in advance in the in-vehicle computer to acquire a first key, and decrypting second encrypted data received from the key generation device through the interface unit with the acquired first key to acquire a second key; calculating a measured value of stored data which is stored in advance in the in-vehicle computer using the acquired second key; and transmitting the measured value to the key generation device through the interface unit.

(18) According to an aspect of the present invention, there is provided a computer program causing a computer of a key generation device having a vehicle interface that transmits and receives data to and from a vehicle to execute the following processes of: generating a first key and a second key which are stored in an in-vehicle computer installed in the vehicle; calculating an expected value of stored data which is stored in advance in the in-vehicle computer using the second key; encrypting the first key with an initial key which is stored in advance in the in-vehicle computer to generate first encrypted data, encrypting the second key with the first key to generate second encrypted data, and encrypting the expected value with the first key to generate fourth encrypted data; and transmitting the first encrypted data, the second encrypted data and the fourth encrypted data to the vehicle through the vehicle interface.

(19) According to an aspect of the present invention, there is provided a computer program causing an in-vehicle computer which is installed in a vehicle to execute the following processes of: decrypting first encrypted data received from a key generation device through an interface unit that transmits and receives data to and from a device outside of the in-vehicle computer with an initial key which is stored in advance in the in-vehicle computer to acquire a first key, decrypting second encrypted data received from the key generation device through the interface unit with the acquired first key to acquire a second key, and decrypting fourth encrypted data received from the key generation device through the interface unit with the acquired first key to acquire an expected value; calculating a measured value of stored data which is stored in advance in the in-vehicle computer using the acquired second key, and verifying the measured value on the basis of the acquired expected value; and transmitting a verification result for the measured value through the interface unit.

(20) According to an aspect of the present invention, there is provided a computer program causing a computer of a key generation device having a vehicle interface that transmits and receives data to and from a vehicle to execute the following processes of: generating a first key and a second key which are stored in an in-vehicle computer installed in the vehicle; calculating an expected value of stored data which is stored in advance in the in-vehicle computer using the second key; encrypting the first key with an initial key which is stored in advance in the in-vehicle computer to generate first encrypted data, encrypting the second key with the first key to generate second encrypted data, and encrypting the expected value with the first key to generate fourth encrypted data; transmitting a verification value, the first encrypted data, the second encrypted data and the fourth encrypted data to the vehicle through the vehicle interface; and verifying a verification value received from the vehicle through the vehicle interface on the basis of the verification value supplied to the vehicle.

(21) According to an aspect of the present invention, there is provided a computer program causing an in-vehicle computer which is installed in a vehicle to execute the following processes of: decrypting first encrypted data received from a key generation device through an interface unit that transmits and receives data to and from a device outside of the in-vehicle computer with an initial key which is stored in advance in the in-vehicle computer to acquire a first key, decrypting second encrypted data received from the key generation device through the interface unit with the acquired first key to acquire a second key, and decrypting fourth encrypted data received from the key generation device through the interface unit with the acquired first key to acquire an expected value; calculating a measured value of stored data which is stored in advance in the in-vehicle computer using the acquired second key, and verifying the measured value on the basis of the acquired expected value; and transmitting a verification result for the measured value through the interface unit, wherein in the transmission, the verification result which is inclusive of a verification value received from the key generation device through the interface unit is transmitted in a case where the verification of the measured value has been passed, and the verification result which is not inclusive of the verification value received from the key generation device through the interface unit is transmitted in a case where the verification of the measured value has failed.

(22) According to an aspect of the present invention, there is provided a management system including: a data providing device; and an in-vehicle computer which is installed in a vehicle, wherein the data providing device includes a vehicle interface configured to transmit and receive data to and from the vehicle, and an expected value calculation unit configured to calculate an expected value of applied data which is applied to the in-vehicle computer, wherein the applied data and the expected value are transmitted to the vehicle through the vehicle interface, and wherein the in-vehicle computer includes an interface unit configured to transmit and receive data to and from a device outside of the in-vehicle computer, and a measurement unit configured to calculate a measured value of the applied data received from the data providing device through the interface unit, and verify the measured value on the basis of the expected value received from the data providing device through the interface unit, wherein a verification result for the measured value is transmitted to the data providing device through the interface unit.

(23) According to an aspect of the present invention, there is provided a method of managing a management system including a data providing device and an in-vehicle computer which is installed in a vehicle, the method including: causing the data providing device to calculate an expected value of applied data which is applied to the in-vehicle computer; causing the data providing device to transmit the applied data and the expected value to the vehicle through a vehicle interface that transmits and receives data to and from the vehicle; causing the in-vehicle computer to calculate a measured value of the applied data received from the data providing device through an interface unit that transmits and receives data to and from a device outside of the in-vehicle computer, and to verify the measured value on the basis of the expected value received from the data providing device through the interface unit; and causing the in-vehicle computer to transmit a verification result for the measured value to the data providing device through the interface unit.

(24) According to an aspect of the present invention, there is provided a computer program causing a computer of a data providing device including a vehicle interface that transmits and receives data to and from a vehicle to execute the following processes of: calculating an expected value of applied data which is applied to an in-vehicle computer which is installed in the vehicle; transmitting the applied data and the expected value to the vehicle through the vehicle interface; and receiving a verification result for a measured value of the applied data from the vehicle through the vehicle interface.

(25) According to an aspect of the present invention, there is provided a, computer program causing an in-vehicle computer which is installed in a vehicle to execute the following processes of: calculating a measured value of applied data received from a data providing device through an interface unit that transmits and receives data to and from a device outside of the in-vehicle computer, and verifying the measured value on the basis of an expected value received from the data providing device through the interface unit; and transmitting a verification result for the measured value to the data providing device through the interface unit.

Advantageous Effects of Invention

According to the present invention, an effect is obtained in which it is possible to improve the reliability of an in-vehicle computer such as an ECU installed in a vehicle such as a car.

DESCRIPTION OF EMBODIMENTS

Hereinafter, an embodiment of the present invention will be described with reference to the accompanying drawings. Also, in the embodiment shown below, as a vehicle, a car will be described by way of example.

Figure 1:
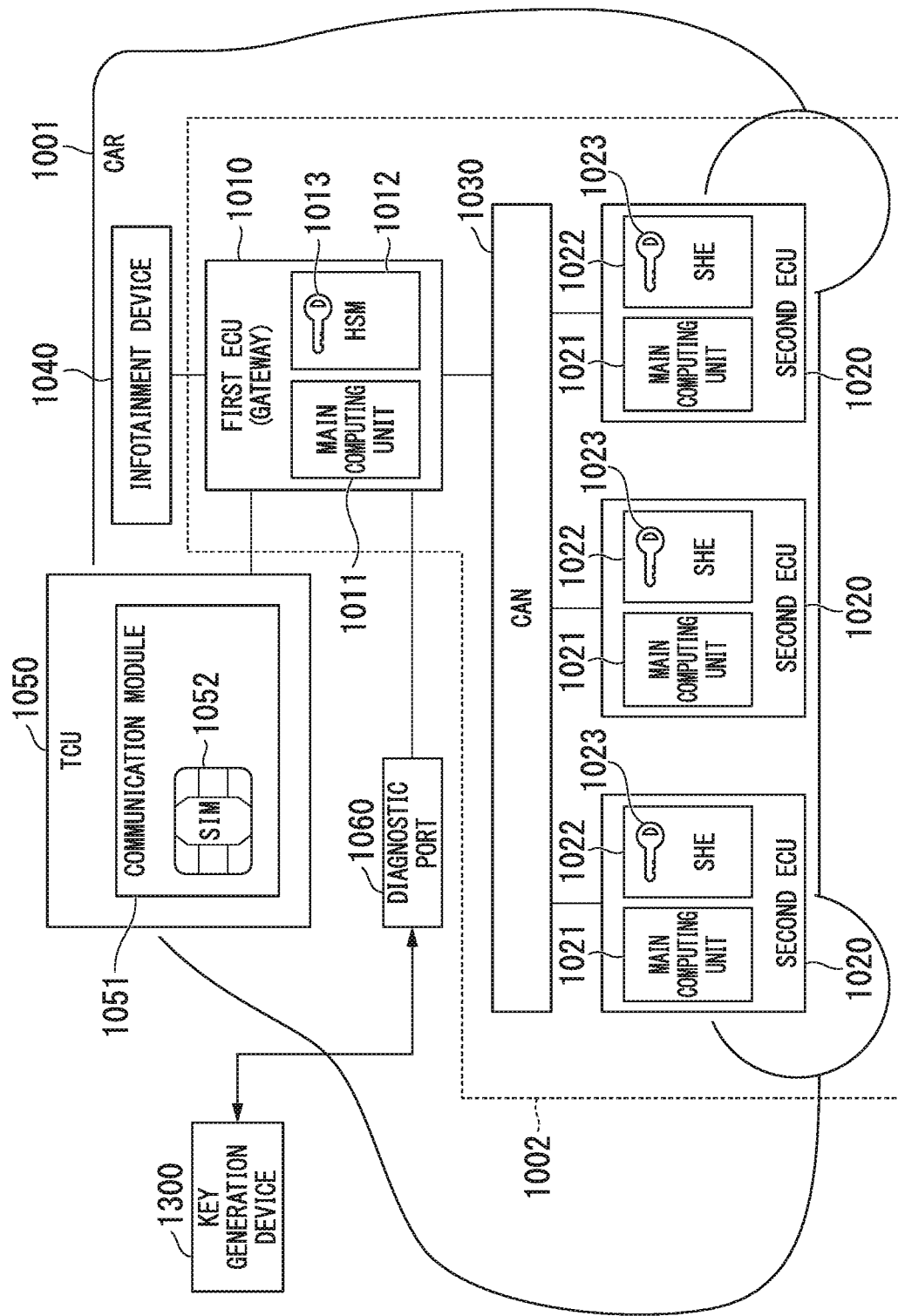
FIG. 1 is a diagram illustrating a configuration example of a management system and a car 1001 according to an embodiment.

FIG. 1 is a diagram illustrating a configuration example of a management system and a car 1001 according to the present embodiment. In the present embodiment, as an example of an in-vehicle computer, an electronic control unit (ECU) which is installed in a car 1001 will be described.

In FIG. 1, the car 1001 includes a first ECU 1010 and a plurality of second ECUs 1020. The first ECU 1010 and the second ECU 1020 are in-vehicle computers installed in the car 1001. The first ECU 1010 is an ECU having a gateway function among ECUs installed in the car 1001. The second ECU 1020 is an ECU having a function such as engine control among the ECUs installed in the car 1001. Examples of the second ECU 1020 include an ECU having an engine control function, an ECU having a steering control function, an ECU having a brake control function, and the like.

The first ECU 1010 and the plurality of second ECUs 1020 are connected to a controller area network (CAN) 1030 provided in the car 1001. The CAN 1030 is a communication network. The CAN is known as one of communication networks installed in vehicles.

The first ECU 1010 exchanges data with each of the second ECUs 1020 via the CAN 1030. The second ECU 1020 exchanges data with other second ECUs 1020 via the CAN 1030.

Also, as communication networks installed in a vehicle, communication networks other than a CAN may be provided in the car 1001, and an exchange of data between the first ECU 1010 and the second ECU 1020 and an exchange of data between the second ECUs 1020 may be performed via the communication networks other than a CAN. For example, a local interconnect network (LIN) may be included in the car 1001. Also, the CAN and the LIN may be included in the car 1001. Also, in the car 1001, the second ECU 1020 connected to an LIN may be provided. Also, the first ECU 1010 may be connected to the CAN and the LIN. Also, the first ECU 1010 may exchange data with the second ECU 102 connected to the CAN via the CAN, and may exchange data with the second ECU 1020 connected to the LIN via the LIN. Also, the second ECUs 1020 may exchange data with each other via the LIN.

The car 1001 includes a diagnostic port 1060. As the diagnostic port 1060, for example, an in-vehicle diagnostics (OBD) port may be used. A device outside of the car 1001 can be connected to the diagnostic port 1060. An example of a device outside of the car 1001 capable of being connected to the diagnostic port 1060 includes a diagnostic terminal, a key generation device 1300 shown in FIG. 1, or the like. The diagnostic port 1060 is connected to the first ECU 1010. Data is exchanged between the first ECU 1010 and a device connected to the diagnostic port 1060, for example the key generation device 1300, via the diagnostic port 1060.

The car 1001 includes an infotainment device 1040. An example of the infotainment device 1040 includes an instrument having a navigation function, a location information service function, a reproduction function for multimedia such as music or video, a voice communication function, a data communication function, an Internet connection function, or the like. The infotainment device 1040 is connected to the first ECU 1010. The first ECU 1010 transmits information which is input from the infotainment device 1040 to the second ECU 1020.

The car 1001 includes a tele communication unit (TCU) 1050. The TCU 1050 is a communication device. The TCU 1050 includes a communication module 1051.

The communication module 1051 performs wireless communication using a wireless communication network. The communication module 1051 includes a subscriber identity module (SIM) 1052. The SIM 1052 is a SIM in which information for using a wireless communication network is written. The communication module 1051 can perform wireless communication through connection to the wireless communication network by using the SIM 1052. Also, as the SIM 1052, an embedded subscriber identity module (eSIM) may be used.

The TCU 1050 is connected to the first ECU 1010. The first ECU 1010 exchanges data with the communication module 1051 of the TCU 1050.

Also, in the configuration of FIG. 1, the first ECU 1010 and the TCU 1050 are directly connected to each other to thereby exchange data between the first ECU 1010 and the communication module 1051, but there is no limitation thereto. For example, by connecting the TCU 1050 to the infotainment device 1040, the first ECU 1010 may exchange data with the communication module 1051 of the TCU 1050 via the infotainment device 1040. Alternatively, by connecting the TCU 1050 to the diagnostic port 1060, the first ECU 1010 may exchange data with the communication module 1051 of the TCU 1050 connected to the diagnostic port 1060 via the diagnostic port 1060. Alternatively, the first ECU 1010 may include the communication module 1051 including the SIM 1052. In a case where the first ECU 1010 includes the communication module 1051 including the SIM 1052, the car 1001 may not include the TCU 1050.

The first ECU 1010 includes a main computing unit 1011 and a hardware security module (HSM) 1012. The main computing unit 1011 executes a computer program for realizing the function of the first ECU 1010. The HSM 1012 has a cryptographic processing function or the like. The HSM 1012 is tamper resistant. The HSM 1012 is an example of a secure element (SE). The HSM 1012 includes a storage unit 1013 that stores data such as a key. The main computing unit 1011 uses the HSM 1012.

The second ECU 1020 includes a main computing unit 1021 and a secure hardware extension (SHE) 1022. The main computing unit 1021 executes a computer program for realizing the function of the second ECU 1020. The SHE 1022 has a cryptographic processing function or the like. The SHE 1022 is tamper resistant. The SHE 1022 is an example of a secure element. The SHE 1022 includes a storage unit 1023 that stores data such as a key. The main computing unit 1021 uses the SHE 1022.

An in-vehicle computer system 1002 included in the car 1001 is configured such that the first ECU 1010 and the plurality of second ECUs 1020 are connected to the CAN 1030. The first ECU 1010 has a gateway function, and monitors communication between inside and outside of the in-vehicle computer system 1002. In the present embodiment, the in-vehicle computer system 1002 functions as an in-vehicle control system of the car 1001. Also, the first ECU 1010 may be configured not to have a gateway function.

In the following description, in a case where the first ECU 1010 and the second ECU 1020 are not required to be particularly distinguished from each other, these ECUs are simply referred to as an ECU.

Figure 2:
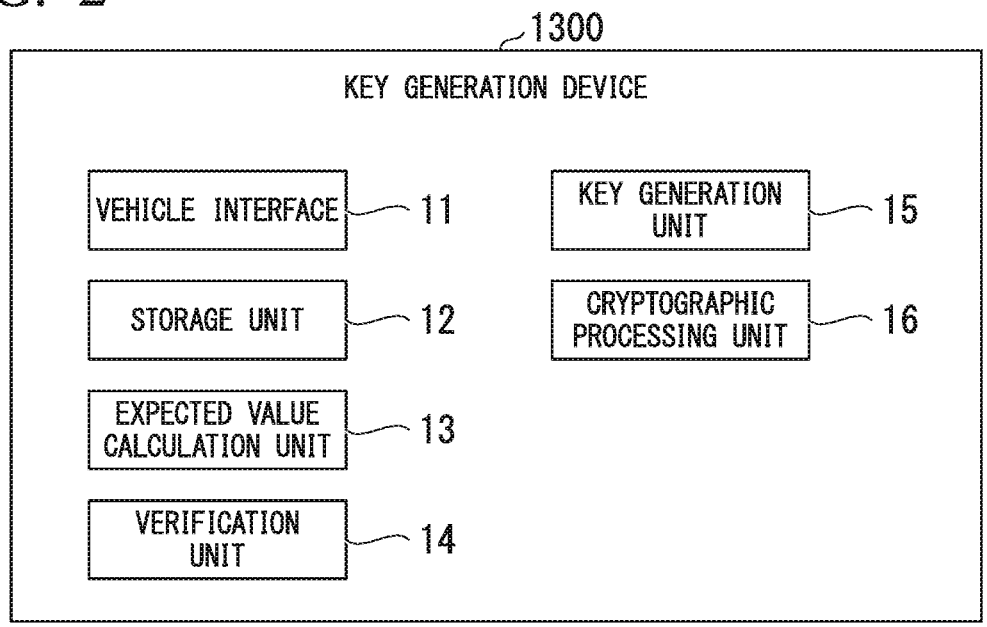
FIG. 2 is a diagram illustrating a configuration example of a key generation device 1300 according to an embodiment.

FIG. 2 is a diagram illustrating a configuration example of the key generation device 1300. In FIG. 2, the key generation device 1300 includes a vehicle interface 11, a storage unit 12, an expected value calculation unit 13, a verification unit 14, a key generation unit 15, and a cryptographic processing unit 16.

The vehicle interface 11 is an interface that transmits and receives data to and from the car 1001. In the present embodiment, the vehicle interface 11 is connected to the diagnostic port 1060, and transmits and receives data via the diagnostic port 1060. Also, as the vehicle interface 11, interfaces other than the interface of the diagnostic port 1060 may be provided. For example, as the vehicle interface 11, a communication module may be provided, and wireless communication with the communication module 1051 of the car 1001 may be performed. In addition, for example, as the vehicle interface 11, a CAN interface may be provided, and may be connected to the CAN 1030 of the car 1001 to have data transmitted and received via the CAN 1030.

The storage unit 12 store data such as a key. The expected value calculation unit 13 calculates an expected value of data stored in advance in the ECU. An example of the data stored in advance in the ECU includes an ECU code. The ECU code is an example of data which is applied to the ECU. The ECU code may be a computer program such as an initial program which is installed in advance in the ECU, or may be setting data such as an initial parameter setting value which is set in advance in the ECU.

The verification unit 14 performs a process relating to the verification of a measured value of the ECU. For example, the verification unit 14 may verify the measured value of the ECU on the basis of the expected value calculated by the expected value calculation unit 13. The key generation unit 15 generates a key of the ECU. The cryptographic processing unit 16 encrypts data and decrypts the encrypted data.

The function of the key generation device 1300 is realized by a central processing unit (CPU) included in the key generation device 1300 executing a computer program. Also, the key generation device 1300 may be configured using a general-purpose computer device, or may be configured as a dedicated hardware device.

Figure 3:
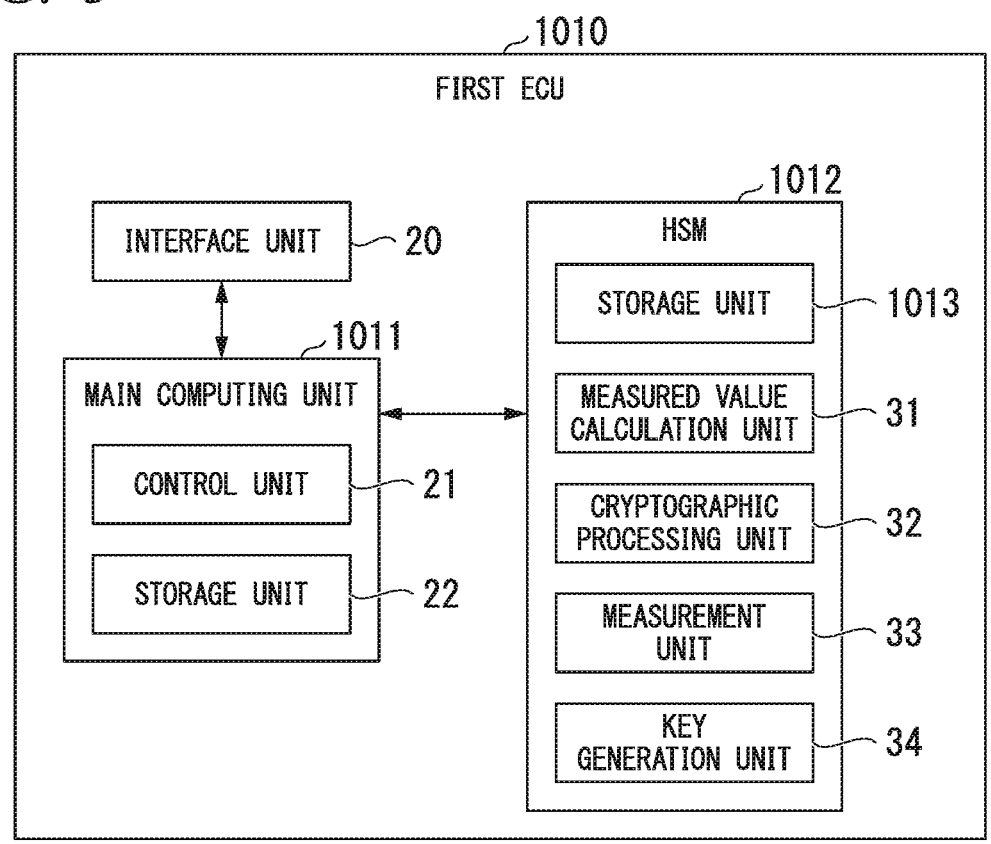
FIG. 3 is a diagram illustrating a configuration example of a first ECU 1010 according to an embodiment.

FIG. 3 is a diagram illustrating a configuration example of the first ECU 1010. In FIG. 3, the first ECU 1010 includes the main computing unit 1011, the HSM 1012, and an interface unit 20. The main computing unit 1011 includes a control unit 21 and a storage unit 22. The HSM 1012 includes the storage unit 1013, a measured value calculation unit 31, a cryptographic processing unit 32, a measurement unit 33, and a key generation unit 34.

The interface unit 20 transmits and receives data to and from a device outside of the first ECU 1010. The interface unit 20 includes an interface that transmits and receives data via the CAN 1030, an interface that transmits and receives data to and from the infotainment device 1040, an interface that transmits and receives data to and from the TCU 1050, and an interface that transmits and receives data via the diagnostic port 1060. The main computing unit 1011 transmits and receives data to and from devices other than the first ECU 1010 via the interface unit 20.

The control unit 21 controls the first ECU 1010. The storage unit 22 stores data. The storage unit 1013 stores data such as a key. The measured value calculation unit 31 calculates a measured value of data such as an ECU code. The cryptographic processing unit 32 encrypts data and decrypts the encrypted data. The measurement unit 33 calculates the measured value of data such as an ECU code, and verities the measured value on the basis of an expected value. The key generation unit 34 generates a key (hereinafter, referred to as an in-vehicle key) used inside the car 1001.

Figure 4:
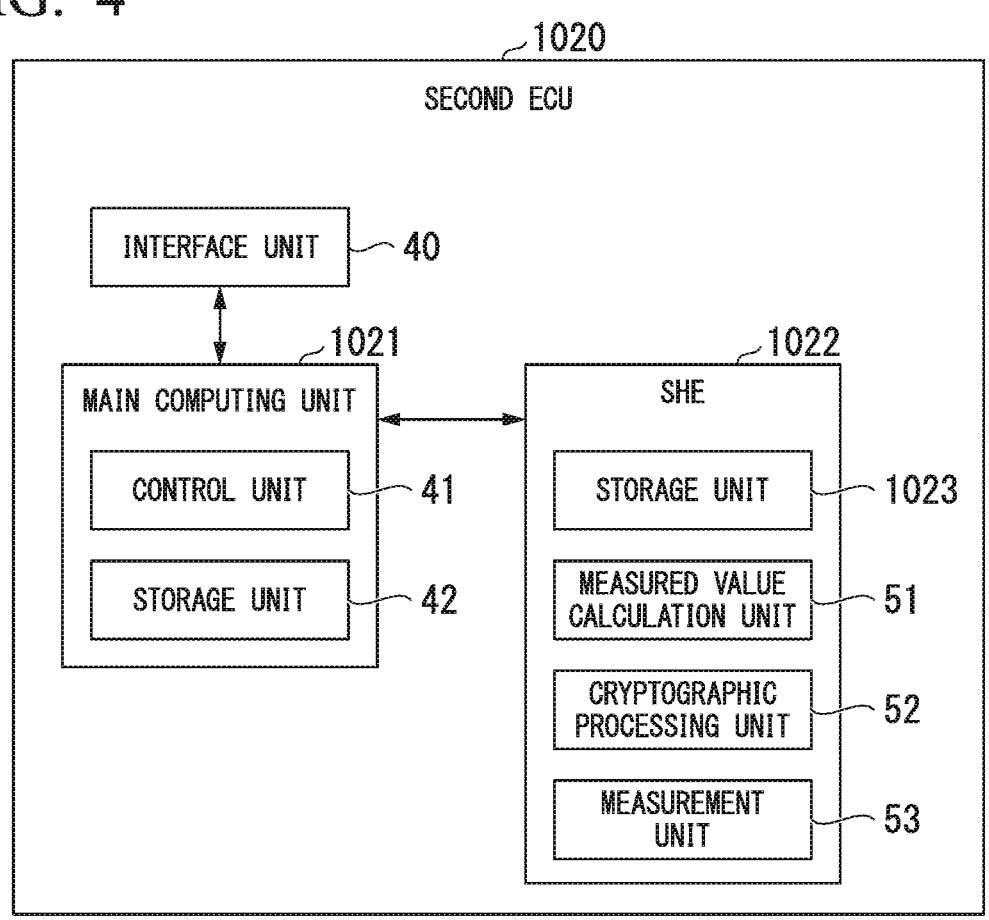
FIG. 4 is a diagram illustrating a configuration example of a second ECU 1020 according to an embodiment.

FIG. 4 is a diagram illustrating a configuration example of the second ECU 1020. In FIG. 4, the second ECU 1020 includes the main computing unit 1021, the SHE 1022, and an interface unit 40. The main computing unit 1021 includes a control unit 41 and a storage unit 42. The SHE 1022 includes the storage unit 1023, a measured value calculation unit 51, a cryptographic processing unit 52, and a measurement unit 53.

The interface unit 40 transmits and receives data to and from a device outside of the second ECU 1020. The interface unit 40 includes an interface that transmits and receives data via the CAN 1030. The main computing unit 1021 transmits and receives data to and from devices other than the second ECU 1020 via the interface unit 40.

The control unit 41 controls the second ECU 1020. The storage unit 42 stores data. The storage unit 1023 stores data such as a key. The measured value calculation unit 51 calculates a measured value of data such as an ECU code. The cryptographic processing unit 52 encrypts data and decrypts the encrypted data. The measurement unit 53 calculates the measured value of data such as an ECU code, and verifies the measured value on the basis of an expected value.

Also, in the present embodiment, the HSM is used in the first ECU 1010, but the SHE may be used instead of the HSM in the first ECU 1010. Also, the SHE is disclosed in, for example, Non-Patent Literature 3.

Configuration Examples of ECU Identifier

Configuration Example 1 of an ECU identifier according to the present embodiment will be described. The ECU identifier is information for identifying an ECU.

Configuration Example 1 of ECU Identifier

In Configuration Example 1 of the ECU identifier, the bit length of the ECU identifier is less than 64 bits. Examples of bit breakdowns of this ECU identifier are shown below.
ECU vendor identifier: 16 bits
ECU model identifier: 16 bits
Serial number: 32 bits Configuration Example 2 of ECU Identifier In Configuration Example 2 of the ECU identifier, the bit length of the ECU identifier is less than 128 bits. Examples 1, 2, and 3 of bit breakdowns of this ECU identifier are shown below.

Example 1

Vehicle identification number (VIN): 102 bits (alphanumeric characters of 17 digits; 1 character is equal to 6 bits)
CAN identifier: 11 bits
The CAN identifier of 11 bits is a CAN identifier stored in the ID field of 11-bit length in the data frame of a CAN standard format. Alternatively, the CAN identifier of 11 bits is a CAN identifier stored in the base ID field of 11-bit length in the data frame of a CAN extended format. Also, the vehicle identification number (VIN) is disclosed in, for example, Non-Patent Literature 2.

Example 2

Remaining portions other than world manufacturer identifier (WMI) of vehicle identification number (VIN): 84 bits (alphanumeric characters of 14 digits: 1 character is equal to 6 bits)
CAN identifier: 29 bits
The CAN identifier of 29 bits is a sum of "11 bits" which is a CAN identifier portion stored in the base ID field of 11-bit length in the data frame of a CAN extended format and "18 bits" which is a CAN identifier portion stored in the extend ID field of 18-bit length.

Example 3

SHE identifier (UID): 120 bits
In Example 3, an UID of the SHE included in an ECU is used in the ECU identifier of the ECU.
The vehicle identification number (VIN), the CAN identifier and the UID of the SHE are acquired beforehand in, for example, the manufacturing plant of the car 1001.

Examples of Management Method

Next, examples of a management method according to the present embodiment will be described.

Example 1 of Management Method

Figure 5:
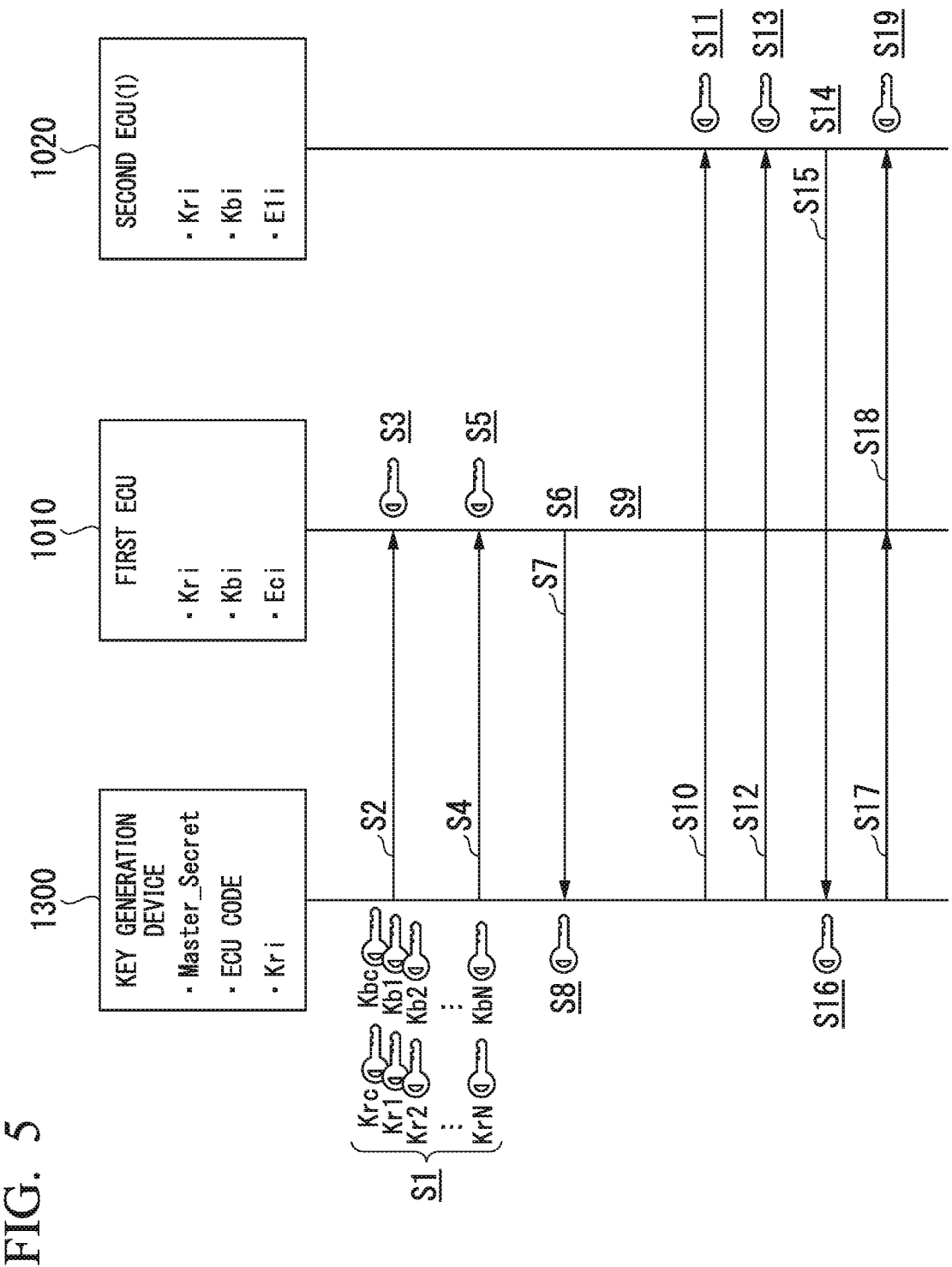
FIG. 5 is a sequence diagram of Example 1 of a management method according to an embodiment.

FIG. 5 is a sequence diagram of Example 1 of a management method according to the present embodiment. Example 1 of the management method according to the present embodiment will be described with reference to FIG. 5. The key generation device 1300 is provided in, for example, the manufacturing plant of the car 1001. The vehicle interface 11 of the key generation device 1300 is connected to the diagnostic port 1060 of the car 1001 during manufacturing in the manufacturing plant.

FIG. 5 shows only one second ECU (1) 1020 out of the second ECUs (n) 1020 installed in the car 1001, for convenience of description. Where, n is an integer from 1 to n. N is the number of second ECUs 1020 which are targets for key distribution among the second ECUs 1020 installed in the car 1001.

The key generation device 1300 stores a master key Master_Secret, an ECU code of the ECU, and an initial Root key Kri in advance in the storage unit 12. The ECU code of an ECU includes an initial ECU code of the ECU.

The HSM 1012 of the first ECU 1010 stores the initial Root key Kri and an initial signing key Kbi in advance in the storage unit 1013. The initial Root key Kri and the initial signing key Kbi are written in the HSM 1012, for example, during manufacturing of the first ECU 1010. The SHE 1022 of the second ECU 1020 stores the initial Root key Kri and the initial signing key Kbi in advance in the storage unit 1023. The initial Root key Kri and the initial signing key Kbi are written in the SHE 1022, for example, during manufacturing of the second ECU 1020. The initial Root key Kri and the initial signing key Kbi are keys stored in a new ECU.

The main computing unit 1011 of the first ECU 1010 stores an initial ECU code Eci in advance in the storage unit 22. The initial ECU code Eci is written in the main computing unit 1011, for example, during manufacturing of the first ECU 1010. The initial ECU code Eci is an ECU code stored in a new first ECU 1010. The main computing unit 1021 of the second ECU (n) 1020 stores an initial ECU code Eni in advance in the storage unit 42. The initial ECU code Eni is written in the main computing unit 1021, for example, during manufacturing of the second ECU (n) 1020. The initial ECU code Eni is an ECU code stored in a new second ECU (n) 1020.

Hereinafter, the vehicle interface 11 of the key generation device 1300 and the diagnostic port 1060 of the car 1001 are connected to each other.

(Step S1) In the key generation device 1300, the key generation unit 15 generates a Root key and a signing key of the ECU installed in the car 1001. In the present embodiment, the key generation unit 15 generates a Root key Krc and a signing key Kbc of the first ECU 1010, and a Root key Krn and a signing key Kbn of each of N second ECUs (n) 1020. The storage unit 12 stores the Root key Krc and the signing key Kbc of the first ECU 1010, and the Root key Krn and the signing key Kbn of each of the N second ECUs (n) 1020. The Root keys Krc and Krn correspond to a first key. The signing keys Kbc and Kbn correspond to a second key.

The key generation unit 15 calculates a first digest value on the basis of the master key Master_Secret stored in the storage unit 12 of the key generation device 1300, and an ECU identifier ECU_ID of the first ECU 1010. The first digest value is the Root key Krc of the first ECU 1010. The key generation unit 15 calculates a second digest value on the basis of the master key Master_Secret stored in the storage unit 12 of the key generation device 1300 and the ECU identifier ECU_ID of the first ECU 1010. The second digest value is the signing key Kbc of the first ECU 1010. A method of calculating the first digest value and a method of calculating the second digest value are different from each other. Thus, the first digest value (the Root key Krc of the first ECU 1010) and the second digest value (the signing key Kbc of the first ECU 1010) are different from each other.

The key generation unit 15 calculates a first digest value on the basis of the master key Master_Secret stored in the storage unit 12 of the key generation device 1300 and an ECU identifier ECU_ID of the second ECU (n) 1020. The first digest value is the Root key Krn of the second ECU (n) 1020. The key generation unit 15 calculates a second digest value on the basis of the master key Master_Secret stored in the storage unit 12 of the key generation device 1300 and the ECU identifier ECU_ID of the second ECU (n) 1020. The second digest value is the signing key Kbn of the second ECU (n) 1020. A method of calculating the first digest value and a method of calculating the second digest value are different from each other. Thus, the first digest value (the Root key Krn of the second ECU (n) 1020) and the second digest value (the signing key Kbn of the second ECU (n) 1020) are different from each other.

The ECU identifier ECU_ID of the ECU of the car 1001 is generated by any of the configuration examples of the ECU identifier described above. The key generation device 1300 may generate the ECU identifier ECU_ID of the ECU of the car 1001, or the ECU identifier ECU_ID of the ECU of the car 1001 may be input to the key generation device 1300.

Examples of the digest values include a value calculated by a hash function, a value calculated by an exclusive-OR operation, and the like.

An example of a method of generation a key (common key) according to the present embodiment is represented by the following expression.

Common key=digest (Master_Secret, ECU_ID, Nk)

Where, Nk is a variable. The digest (Master_Secret, ECU_ID, Nk) is a digest value which is generated on the basis of the master key Master_Secret, the ECU identifier ECU_ID and the variable Nk. For example, the common key is a hash function value which is calculated using the master key Master_Secret, the ECU identifier ECU_ID and the variable Nk as input values. In a case where the value of the variable Nk is made different, the method of calculating the digest value is made different. By changing the value of the variable Nk, a different common key can be generated on the basis of the same master key Master_Secret and the ECU identifier ECU_ID. For example, the value of the variable Nk for the Root key is set to Nk_1, and the value of the variable Nk for the signing key is set to Nk_2. In this case, using the same master key Master_Secret and the same ECU identifier ECU_ID, the Root key and the signing key can be generated as different keys on the basis of the following expressions:

Root key=digest (Master_Secret, ECU_ID, Nk_1), and

Signing key=digest (Master_Secret, ECU_ID, Nk_2).

As another example of the method of generation a key (common key) according to the present embodiment, the Root key of the ECU may be set to a value calculated by a hash function, and the signing key may be set to a value calculated by an exclusive-OR operation. Alternatively, on the contrary, that is, the Root key of the ECU may be set to a value calculated by an exclusive-OR operation, and the signing key may be set to a value calculated by a hash function.

(Step S2) The cryptographic processing unit 16 of the key generation device 1300 encrypts the Root key Krc of the first ECU 1010 with the initial Root key Kri to generate first encrypted data Kri (Krc). The key generation device 1300 transmits the first encrypted data Kri (Krc) to the first ECU 1010 of the car 1001 through the vehicle interface 11. The first ECU 1010 of the car 1001 receives the first encrypted data Kri (Krc) from the key generation device 1300 via diagnostic port 1060 through the interface unit 20.

(Step S3) The control unit 21 of the first ECU 1010 delivers the first encrypted data Kri (Krc) to the HSM 1012. The cryptographic processing unit 32 of the HSM 1012 decrypts the first encrypted data Kri (Krc) with the initial Root key Kri stored in the storage unit 1013, and acquires the Root key Krc. The HSM 1012 stores the acquired Root key Krc in the storage unit 1013. The HSM 1012 may store the acquired Root key Krc in place of the initial Root key Kri in the storage unit 1013.

(Step S4) The cryptographic processing unit 16 of the key generation device 1300 encrypts the signing key Kbc of the first ECU 1010 with the Root key Krc of the first ECU 1010 to generate second encrypted data Krc (Kbc). The key generation device 1300 transmits the second encrypted data Krc (Kbc) to the first ECU 1010 of the car 1001 through the vehicle interface 11. The first ECU 1010 of the car 1001 receives the second encrypted data Krc (Kbc) from the key generation device 1300 via the diagnostic port 1060 through the interface unit 20.

(Step S5) The control unit 21 of the first ECU 1010 delivers the second encrypted data Krc (Kbc) to the HSM 1012. The cryptographic processing unit 32 of the HSM 1012 decrypts the second encrypted data Krc (Kbc) with the Root key Krc stored in the storage unit 1013, and acquires the signing key Kbc. The HSM 1012 stores the acquired signing key Kbc in the storage unit 1013. The HSM 1012 may store the acquired signing key Kbc in place of the initial signing key Kbi in the storage unit 1013.

(Step S6) The control unit 21 of the first ECU 1010 delivers the initial ECU code Eci stored in the storage unit 22 to the HSM 1012, and executes a secure boot process. In the secure boot process, the measured value calculation unit 31 of the HSM 1012 calculates the measured value of the initial ECU code Eci using the signing key Kbc stored in the storage unit 1013. In the present embodiment, as an example of the measured value, a cipher-based message authentication code (CMAC) is used. Thus, the measured value calculation unit 31 calculates the CMAC of the initial ECU code Eci using the signing key Kbc stored in the storage unit 1013. The CMAC of this calculation result is referred to as a measured value Ecn_a. The HSM 1012 sets the measured value Ecn_a to an expected value which is used in the secure boot process. The expected value "measured value Ecn_a" is stored in the storage unit 1013.

(Step S7) The cryptographic processing unit 32 of the HSM 1012 of the first ECU 1010 encrypts the measured value Ecn_a with the Root key Krc stored in the storage unit 1013 to generate third encrypted data Krc (Ecn_a). The HSM 1012 delivers the third encrypted data Krc (Ecn_a) to the control unit 21. The control unit 21 transmits the third encrypted data Krc (Ecn_a) to the key generation device 1300 via the diagnostic port 1060 through the interface unit 20. The key generation de ice 1300 receives the third encrypted data Krc (Ecn_a) from the first ECU 1010 of the car 1001 through the diagnostic port 1060 through the vehicle interface 11.

(Step S8) The cryptographic processing unit 16 of the key generation device 1300 decrypts the third encrypted data Krc (Ecn_a) with the Root key Krc of the first ECU 1010 and acquire the measured value Ecn_a. The expected value calculation unit 13 calculates the CMAC of the initial ECU code Eci of the first ECU 1010 using the signing key Kbc of the first ECU 1010. The CMAC of this calculation result is referred to as an expected value Ecn_b.

Also, the first ECU 1010 may transmit data kept as it is without encrypting the measured value Ecn_a to the key generation device 1300.

The verification unit 14 compares the measured value Ecn_a with the expected value Ecn_b, and determines whether both are coincident with each other. In a case where the result of this determination is that both are coincident with each other, the verification of the measured value Ecn_a is a pass. In a case where the verification of the measured value Ecn_a is a pass, the process proceeds to step S9. On the other hand, in a case where both are not coincident with each other, the verification of the measured value Ecn_a is a fail. In a case where the verification of the measured value Ecn_a is a fail, the process of FIG. 5 is terminated. In addition, in a case where the verification of the measured value Ecn_a is a fail, the key generation device 1300 may execute predetermined error processing.

(Step S9) The key generation unit 34 of the HSM 1012 of the first ECU 1010 generates an in-vehicle key Kv. The storage unit 1013 stores the in-vehicle key Kv.

(Step S10) The cryptographic processing unit 16 of the key generation device 1300 encrypts a Root key Kr1 of the second ECU (1) 1020 with the initial Root key Kri to generate first encrypted data Kri (Kr1). The key generation device 1300 transmits the first encrypted data Kri (Kr1) to the second ECU (1) 1020 through the first ECU 1010 of the car 1001 with the vehicle interface 11. In a case where the first encrypted data Kri (Kr1) is received from the key generation device 1300 via the diagnostic port 1060 through the interface unit 20, the first ECU 1010 of the car 1001 transmits the first encrypted data Kri (Kr1) to the second ECU (1) 1020 via the CAN 1030 through the interface unit 20. The second ECU (1) 1020 receives the first encrypted data Kri (Kr1) from the first ECU 1010 via the CAN 1030 through the interface unit 40.

(Step S11) The control unit 41 of the second ECU (1) 1020 delivers the first encrypted data Kri (Kr1) to the SHE 1022. The cryptographic processing unit 52 of the SHE 1022 decrypts the first encrypted data Kri (Kr1) with the initial Root key Kri stored in the storage unit 1023, and acquires the Root key Kr1. The SHE 1022 stores the acquired Root key Kr1 in the storage unit 1023. The SHE 1022 may store the acquired Root key Kr1 in place of the initial Root key Kri in the storage unit 1023.

(Step S12) The cryptographic processing unit 16 of the key generation device 1300 encrypts a signing key Kb1 of the second ECU (1) 1020 with the Root key Kr1 of the second ECU (1) 1020 to generate second encrypted data Kr1 (Kb1). The key generation device 1300 transmits the second encrypted data Kr1 (Kb1) to the second ECU (1) 1020 via the first ECU 1010 of the car 1001 through the vehicle interface 11. In a case where the second encrypted data Kr1 (Kb1) is received from the key generation device 1300 via the diagnostic port 1060 through the interface unit 20, the first ECU 1010 of the car 1001 transmits the second encrypted data Kr1 (Kb1) to the second ECU (1) 1020 via the CAN 1030 through the interface unit 20. The second ECU (1) 1020 receives the second encrypted data Kr1 (Kb1) from the first ECU 1010 via the CAN 1030 through the interface unit 40.

(Step S13) The control unit 41 of the second ECU (1) 1020 delivers the second encrypted data Kr1 (Kb1) to the SHE 1022. The cryptographic processing unit 52 of the SHE 1022 decrypts the second encrypted data Kr1 (Kb1) with the Root key Kr1 stored in the storage unit 1023, and acquires the signing key Kb1. The SHE 1022 stores the acquired signing key Kb1 in the storage unit 1023. The SHE 1022 may store the acquired signing key Kb1 in place of the initial signing key Kbi in the storage unit 1023.

(Step S14) The control unit 41 of the second ECU (1) 1020 delivers an initial ECU code E1$i$ stored in the storage unit 42 to the SHE 1022 and causes the SHE 1022 to execute the secure boot process. In the secure boot process, the measured value calculation unit 51 of the SHE 1022 calculates the measured value of the initial ECU code E1$i$ using the signing key Kb1 stored in the storage unit 1023. In the present embodiment, as an example of the measured value, the CMAC is used. Thus, the measured value calculation unit 51 calculates the CMAC of the initial ECU code E1$i$ using the signing key Kb1 stored in the storage unit 1023. The CMAC of this calculation result is referred to as a measured value E1$n$_a. The SHE 1022 sets the measured value E1$n$_a to an expected value which is used in the secure boot process. The expected value "measured value E1$n$_a" is stored in the storage unit 1023.

(Step S15) The cryptographic processing unit 52 of the SHE 1022 of the second ECU (1) 1020 encrypts the measured value E1$n$_a with the Root key Kr1 stored in the storage unit 1023 to generate third encrypted data Kr1 (E1$n$_a). The SHE 1022 delivers the third encrypted data Kr1 (E1$n$_a) to the control unit 41. The control unit 41 transmits the third encrypted data Kr1 (E1$n$_a) to the key generation device 1300 via the CAN 1030 by way of the first ECU 1010 through the interface unit 40. In a case where the third encrypted data Kr1 (E1$n$_a) is received from the second ECU (1) 1020 via the CAN 1030 through the interface unit 20, the first ECU 1010 transmits the third encrypted data Kr1 (E1$n$_a) to the key generation device 1300 via the diagnostic port 1060 through the interface unit 20. The key generation device 1300 receives the third encrypted data Kr1 (E1$n$_a) from the first ECU 1010 of the car 1001 via the diagnostic port 1060 through the vehicle interface 11.

(Step S16) The cryptographic processing unit 16 of the key generation device 1300 decrypts the third encrypted data Kr1 (E1$n$_a) with the Root key Kr1 of the second ECU (1) 1020 and acquires the measured value E1$n$_a. The expected value calculation unit 13 calculates the CMAC of the initial ECU code E1$i$ of the second ECU (1) 1020 using the signing key Kb1 of the second ECU (1) 1020. The CMAC of this calculation result is referred to as an expected value E1$n$_b.

Also, the second ECU (1) 1020 may transmit data kept as it is without encrypting the measured value E1$n$_a to the key generation device 1300.

The verification unit 14 compares the measured value E1$n$_a with the expected value E1$n$_b, and determines whether both are coincident with each other. In a case where the result of this determination is that both are coincident with each other, the verification of the measured value E1$n$_a is a pass. In a case where the verification of the measured value E1$n$_a is a pass, the process proceeds to step S17. On the other hand, in a case where both are not coincident with each other, the verification of the measured value E1$n$_a is a fail. In a case where the verification of the measured value E1$n$_a is a fail, the process of FIG. 5 is terminated with respect to the second ECU (1) 1020. Thus, in a case where the verification of the measured value E1$n$_a is a fail, step S17 is not executed with respect to the second ECU (1) 1020. In addition, in a case where the verification of the measured value E1$n$_a is a fail, the key generation device 1300 may execute the predetermined error processing.

(Step S17) The key generation device 1300 transmits an in-vehicle key sending request message to the first ECU 1010 of the car 1001 through the vehicle interface 11. This in-vehicle key sending request message is a message for requesting that an in-vehicle key be sent to the second ECU (1) 1020 in which the verification of the measured value E1$n$_a has been passed. The in-vehicle key sending request message includes the Root key Kr1 of the second ECU (1) 1020. It is preferable that the Root key Kr1 is encrypted with the Root key Krc of the first ECU 1010 and is stored in the in-vehicle key sending request message. The first ECU 1010 of the car 1001 receives the in-vehicle key sending request message from the key generation device 1300 via the diagnostic port 1060 through the interface unit 20.

(Step S18) The control unit 21 of the first ECU 1010 delivers the Root key Kr1 of the second ECU (1) 1020 included in the in-vehicle key sending request message to the HSM 1012, and causes the HSM 1012 to execute the encryption of the in-vehicle key Kv. Also, in a case where the Root key Kr1 of the second ECU (I) 1020 included in the in-vehicle key sending request message is encrypted, the control unit 21 delivers encrypted data Krc (Kr1) of the Root key Kr1 to the HSM 1012, and causes the HSM 1012 to decrypt the encrypted data with the Root key Krc. Thereby, the control unit 21 acquires the Root key Kr1 of the second ECU (1) 1020.

The cryptographic processing unit 32 of the HSM 1012 encrypts the in-vehicle key Kv with the Root key Kr1 of the second ECU (1) 1020 to generate encrypted data Kr1 (Kv). The HSM 1012 delivers the encrypted data Kr1 (Kv) to the control unit 21. The control unit 21 transmits the encrypted data Kr1 (Kv) to the second ECU (1) 1020 via the CAN 1030 through the interface unit 20. The second ECU (1) 1020 receives the encrypted data Kr1 (Kv) from the first ECU 1010 via the CAN 1030 through the interface unit 40.

(Step S19) The control unit 41 of the second ECU (1) 1020 delivers the encrypted data Kr1 (Kv) to the SHE 1022. The cryptographic processing unit 52 of the SHE 1022 decrypts the encrypted data Kr1 (Kv) with the Root key Kr1 stored in the storage unit 1023, and acquires the in-vehicle key Kv. The SHE 1022 stores the acquired in-vehicle key Kv in the storage unit 1023.

Steps S10 to S19 described above are similarly executed with respect to all the second ECUs (n) 1020 installed in the car 1001.

According to Example 1 of the management method described above, the measured value of the ECU code calculated by the ECU installed in the car 1001 is verified by the key generation device 1300 on the basis of the expected value. Thereby, the determination of authenticity of the ECU installed in the car 1001 is performed. Thereby, the reliability of the ECU installed in the car 1001 is improved.

Example 2 of Management Method

Figure 6:
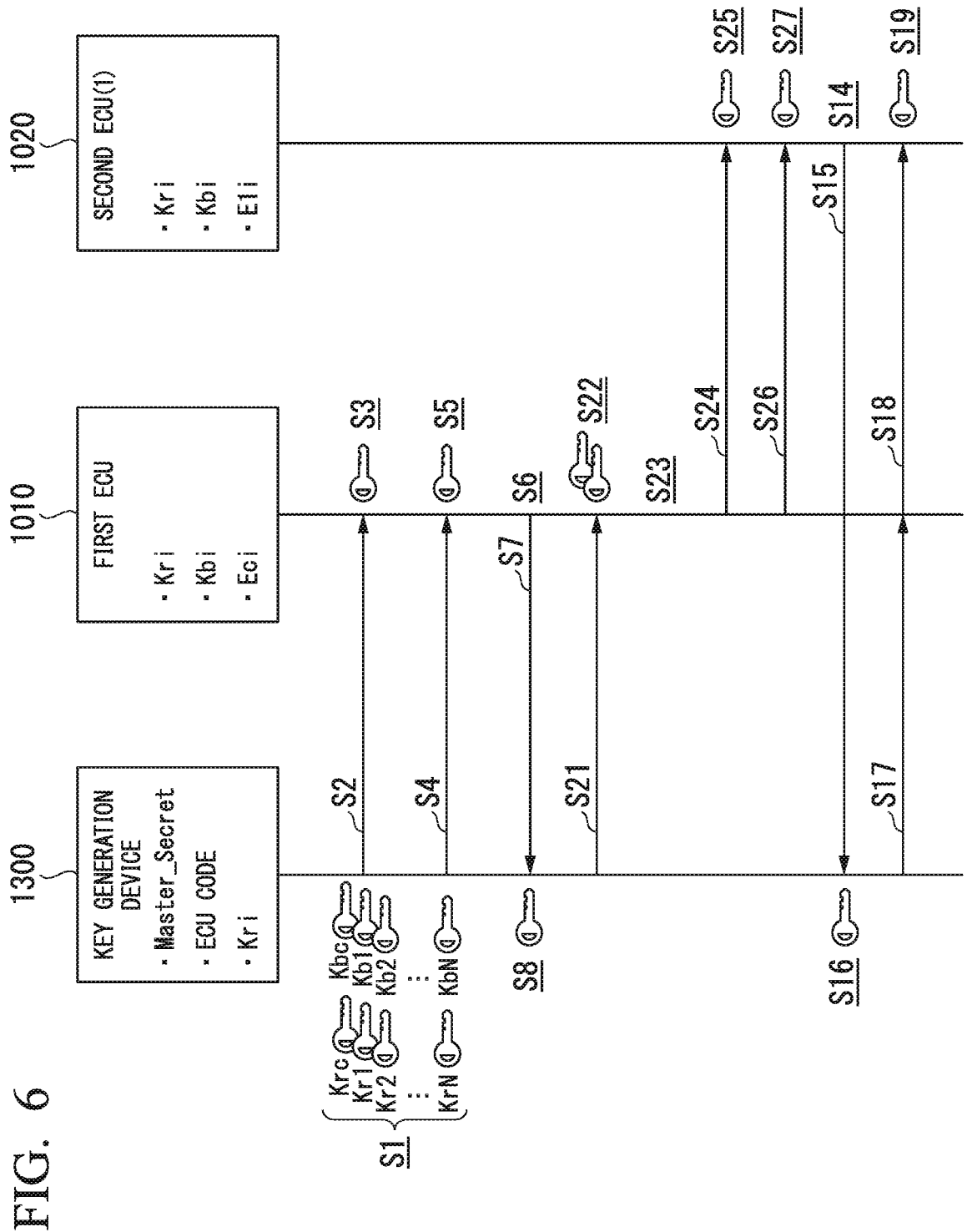
FIG. 6 is a sequence diagram of Example 2 of the management method according to an embodiment.

Example 2 of the management method is a modification example of Example 1 of the management method described above. FIG. 6 is a sequence diagram of Example 2 of the management method according to the present embodiment. In FIG. 6, portions corresponding to the respective units of FIG. 5 are denoted by the same reference numerals and signs, and thus the description thereof will not be given. Hereinafter, points different from those in Example 1 of the management method described above will be mainly described with reference to FIG. 6.

The vehicle interface 11 of the key generation device 1300 and the diagnostic port 1060 of the car 1001 are connected to each other. The processes of steps S1 to S8 are executed. The processes of steps S1 to S8 are the same as those in Example 1 of the management method according to FIG. 5 described above. In a case where the verification of the measured value Ecn_a is a pass in step S8, the process proceeds to step S21. On the other hand, in a case where the verification of the measured value Ecn_a is a fail in step S8, the process of FIG. 6 is terminated. In addition, in a case where the verification of the measured value Ecn_a is a fail, the key generation device 1300 may execute the predetermined error processing.

(Step S21) The cryptographic processing unit 16 of the key generation device 1300 encrypts the Root key Krn and the signing key Kbn of each of the N second ECUs (n) 1020 with the Root key Krc of the first ECU 1010, respectively. N pieces of first encrypted data Krc (Kr1), Krc (Kr2), . . . , Krc (KrN) and N pieces of second encrypted data Krc (Kb1), Krc (Kb2), . . . , Krc (KbN) are generated by this encryption.

The key generation device 1300 transmits the N pieces of first encrypted data Krc (Kr1), Krc (Kr2), . . . , Krc (KrN) and the N pieces of second encrypted data Krc (Kb1), Krc (Kb2), . . . , Krc (KbN) to the first ECU 1010 of the car 1001 through the vehicle interface 11. The first ECU 1010 of the car 1001 receives the N pieces of first encrypted data Krc (Kr1), Krc (Kr2), . . . , Krc (KrN) and the N pieces of second encrypted data Krc (Kb1), Krc (Kb2), . . . , Krc (KbN) from the key generation device 1300 via the diagnostic port 1060 through the interface unit 20.

(Step S22) The control unit 21 of the first ECU 1010 delivers the N pieces of first encrypted data Krc (Kr1), Krc (Kr2), . . . , Krc (KrN) and the N pieces of second encrypted data Krc (Kb1), Krc (Kb2), . . . , Krc (KbN) to the HSM 1012. The cryptographic processing unit 32 of the HSM 1012 decrypts the N pieces of first encrypted data Krc (Kr1), Krc (Kr2), . . . , Krc (KrN) and the N pieces of second encrypted data Krc (Kb1), Krc (Kb2), . . . , Krc (KbN) with the Root key Krc stored in the storage unit 1013, respectively. N Root keys Kr1, Kr2, . . . , KrN and N signing keys Kb1, Kb2, . . . , KbN are acquired by this decryption. The HSM 1012 stores the acquired N Root keys Kr1, Kr2, . . . , KrN and N signing keys Kb1, Kb2, . . . , KbN in the storage unit 1013.

(Step S23) The key generation unit 34 of the HSM 1012 of the first ECU 1010 generates an in-vehicle key Kv. The storage unit 1013 stores the in-vehicle key Kv.

(Step S24) The cryptographic processing unit 32 of the HSM 1012 of the first ECU 1010 encrypts the Root key Kr1 of the second ECU (1) 1020 with the initial Root key Kri to generate the first encrypted data Kri (Kr1). The HSM 1012 delivers the first encrypted data Kri (Kr1) to the control unit 21. The control unit 21 transmits the first encrypted data Kri (Kr1) to the second ECU (1) 1020 via the CAN 1030 through the interface unit 20. The second ECU (1) 1020 receives the first encrypted data Kri (Kr1) from the first ECU 1010 via the CAN 1030 through the interface unit 40.

(Step S25) The control unit 41 of the second ECU (1) 1020 delivers the first encrypted data Kri (Kr1) to the SHE 1022. The cryptographic processing unit 52 of the SHE 1022 decrypts the first encrypted data Kri (Kr1) with the initial Root key Kri stored in the storage unit 1023, and acquires the Root key Kr1. The SHE 1022 stores the acquired Root key Kr1 in the storage unit 1023. The SHE 1022 may store the acquired Root key Kr1 in place of the initial Root key Kri in the storage unit 1023.

(Step S26) The cryptographic processing unit 32 of the HSM 1012 of the first ECU 1010 encrypts the signing key Kb1 of the second ECU (1) 1020 with the Root key Kr1 of the second ECU (1) 1020 to generate the second encrypted data Kr1 (Kb1). The HSM 1012 delivers the second encrypted data Kr1 (Kb1) to the control unit 21. The control unit 21 transmits the second encrypted data Kr1 (Kb1) to the second ECU (1) 1020 via the CAN 1030 through the interface unit 20. The second ECU (1) 1020 receives the second encrypted data Kr1 (Kb1) from first ECU 1010 via the CAN 1030 through the interface unit 40.

(Step S27) The control unit 41 of the second ECU (1) 1020 delivers the second encrypted data Kr1 (Kb1) to the SHE 1022. The cryptographic processing unit 52 of the SHE 1022 decrypts the second encrypted data Kr1 (Kb1) with the Root key Kr1 stored in the storage unit 1023, and acquires the signing key Kb1. The SHE 1022 stores the acquired signing key Kb1 in the storage unit 1023. The SHE 1022 may store the acquired signing key Kb1 in place of the initial signing key Kbi in the storage unit 1023.

Next, the processes of steps S14 to S19 are executed. The processes of steps S14 to S19 are the same as those in Example 1 of the management method according to FIG. 5 described above.

The processes of steps S24 to S27 and steps S14 to S19 described above are similarly executed with respect to all the second ECUs (n) 1020 installed in the car 1001.

Also, the processes of steps S22 to S27 described above are processes which are performed within the car 1001. Therefore, while the processes of steps S22 to S27 are executed, the vehicle interface 11 of the key generation device 1300 and the diagnostic port 1060 of the car 1001 may not be connected to each other.

According to Example 2 of the management method described above, similarly to Example 1 of the management method, the measured value of the ECU code calculated by the ECU installed in the car 1001 is verified by the key generation device 1300 on the basis of the expected value, and thus the determination of authenticity of the ECU installed in the car 1001 is performed. Thereby, the reliability of the ECU installed in the car 1001 is improved.

In addition, according to Example 2 of the management method, the first ECU 1010 has a function (function corresponding to steps S22, S24 and S26) of relaying the N pieces of first encrypted data Krc (Kr1), Krc (Kr2), . . . , Krc (KrN) and the N pieces of second encrypted data Krc (Kb1), Krc (Kb2), . . . , Krc (KbN), transmitted from the key generation device 1300, to the second ECU (n) 1020. Thereby, a time during which the key generation device 1300 and the car 1001 are connected to each other can be further shortened than in Example 1 of the management method.

Example 3 of Management Method

Figure 7:
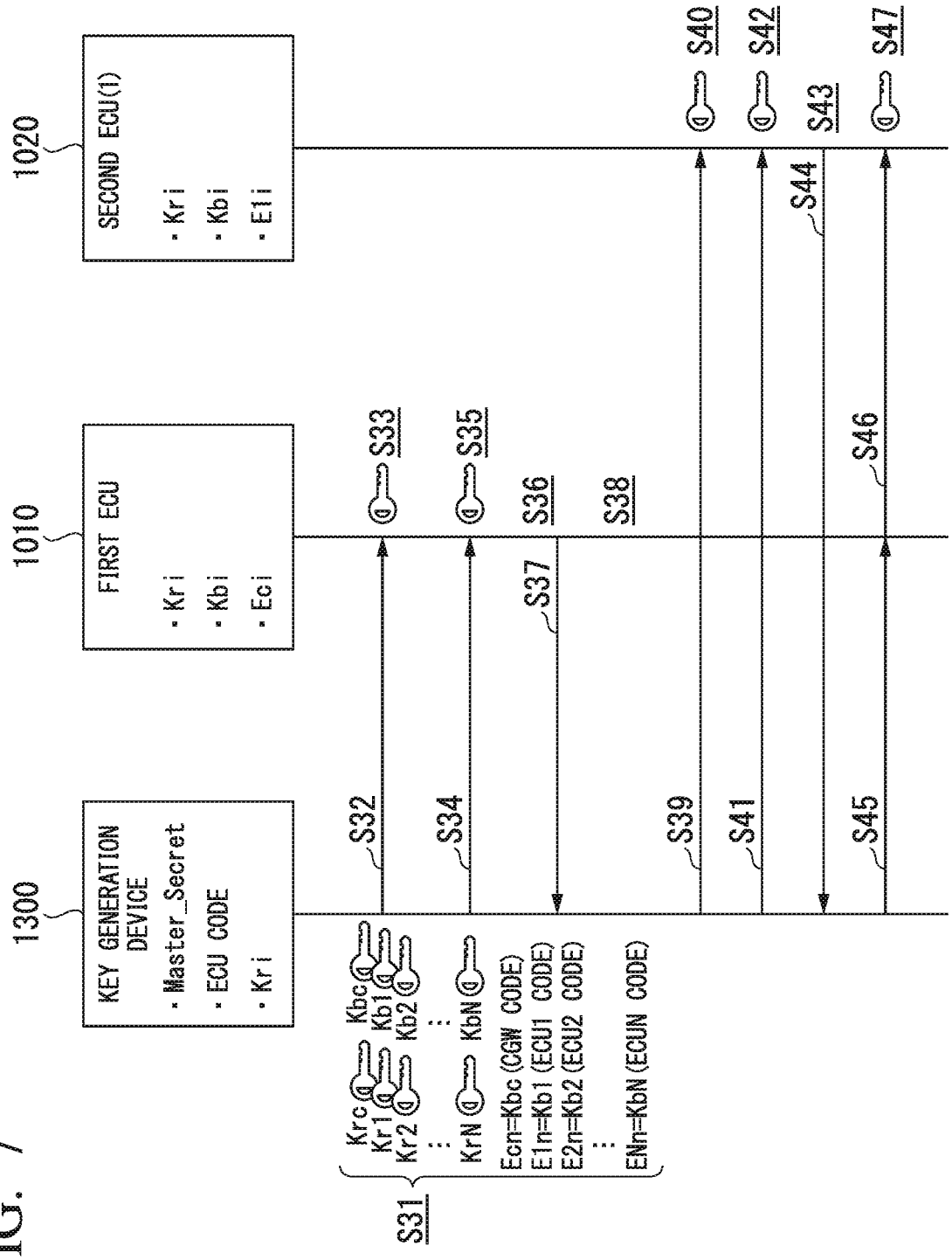
FIG. 7 is a sequence diagram of Example 3 of the management method according to an embodiment.

FIG. 7 is a sequence diagram of Example 3 of the management method according to the present embodiment. Example 3 of the management method according to the present embodiment will be described with reference to FIG. 7. The key generation device 1300 is provided in, for example, the manufacturing plant of the car 1001. The vehicle interface 11 of the key generation device 1300 is connected to the diagnostic port 1060 of the car 1001 during manufacturing in the manufacturing plant.

FIG. 7 shows only one second ECU (1) 1020 out of the second ECUs (n) 1020 installed in the car 1001, for convenience of description. Where, n is an integer from 1 to n. N is the number of second ECUs 1020 which are targets for key distribution among the second ECUs 1020 installed in the car 1001.

Similarly to Example 1 of the management method according to FIG. 5, the key generation device 1300 stores a master key Master_Secret, an ECU code of the ECU, and an initial Root key Kri in advance in the storage unit 12. The ECU code of an ECU includes an initial ECU code of the ECU.

Similarly to Example 1 of the management method according to FIG. 5, the HSM 1012 of the first ECU 1010 stores the initial Root key Kri and an initial signing key Kbi in advance in the storage unit 1013. Similarly to Example 1 of the management method according to FIG. 5, the SHE 1022 of the second ECU 1020 stores the initial Root key Kri and the initial signing key Kbi in advance in the storage unit 1023.

Similarly to Example 1 of the management method according to FIG. 5, the main computing unit 1011 of the first ECU 1010 stores an initial ECU code Eci in advance in the storage unit 22. Similarly to Example 1 of the management method according to FIG. 5, the main computing unit 1021 of the second ECU (n) 1020 stores an initial ECU code Eni in advance in the storage unit 42.

Hereinafter, the vehicle interface 11 of the key generation device 1300 and the diagnostic port 1060 of the car 1001 are connected to each other.

(Step S31) In the key generation device 1300, the key generation unit 15 generates a Root key and a signing key of the ECU installed in the car 1001. In the present embodiment, the key generation unit 15 generates the Root key Krc and the signing key Kbc of the first ECU 1010, and the Root key Krn and the signing key Kbn of each of the N second ECUs (n) 1020. The storage unit 12 stores the Root key Krc and the signing key Kbc of the first ECU 1010, and the Root key Krn and the signing key Kbn of each of the N second ECUs (n) 1020. The Root keys Krc and Krn correspond to a first key. The signing keys Kbc and Kbn correspond to a second key. A method of generation the Root keys Krc and Krn and the signing keys Kbc and Kbn is the same as step S1 of Example 1 of the management method according to FIG. 5.

The expected value calculation unit 13 calculates the CMAC of the initial ECU code Eci (CGW code) of the first ECU 1010 using the signing key Kbc of the first ECU 1010. The CMAC of this calculation result is referred to as an expected value Ecn. The expected value calculation unit 13 calculates the CMAC of the initial ECU code Eni (ECUn code) of the second ECU (n) 1020 using the signing key Kbn of the second ECU (n) 1020. The CMAC of this calculation result is referred to as an expected value Enn. Thereby, the expected value Ecn relating the initial ECU code Eci (CGW code) of the first ECU 1010 and each of expected values E1n, E2n, . . . , ENn relating to the initial ECU code Eni (ECUn code) of the N second ECUs (n) 1020 are generated by the expected value calculation unit 13. The storage unit 12 stores the expected value Ecn relating to the initial ECU code Eci (CGW code) of the first ECU 1010 and each of the expected values E1n, E2n, . . . , ENn relating to the initial ECU code Eni (ECUn code) of the N second ECUs (n) 1020.

Next, steps S32 and S33 are executed. Step S32 is the same as step S2 in Example 1 of the management method according to FIG. 5. Step S33 is the same as step S3 in Example 1 of the management method according to FIG. 5. Next, step S34 is executed.

(Step S34) The cryptographic processing unit 16 of the key generation device 1300 encrypts the signing key Kbc of the first ECU 1010 and the expected value Ecn with the Root key Krc of the first ECU 1010, respectively, to generate second encrypted data Krc (Kbc) and fourth encrypted data Krc (Ecn). The key generation device 1300 transmits the second encrypted data Krc (Kbc) and the fourth encrypted data Krc (Ecn) to the first ECU 1010 of the car 1001 through the vehicle interface 11. The first ECU 1010 of the car 1001 receives the second encrypted data Krc (Kbc) and the fourth encrypted data Krc (Ecn) from the key generation device 1300 via the diagnostic port 1060 through the interface unit 20.

(Step S35) The control unit 21 of the first ECU 1010 delivers the second encrypted data Krc (Kbc) and the fourth encrypted data Krc (Ecn) to the HSM 1012. The cryptographic processing unit 32 of the HSM 1012 decrypts the second encrypted data Krc (Kbc) and the fourth encrypted data Krc (Ecn) with the Root key Krc stored in the storage unit 1013, respectively, and acquires the signing key Kbc and the expected value Ecn. The HSM 1012 stores the acquired signing key Kbc in the storage unit 1013. The HSM 1012 may store the acquired signing key Kbc in place of the initial signing key Kbi in the storage unit 1013. In addition, the HSM 1012 sets the acquired expected value Ecn to an expected value which is used in the secure boot process.

(Step S36) The control unit 21 of the first ECU 1010 delivers the initial ECU code Eci stored in the storage unit 22 to the HSM 1012, and causes the HSM 1012 to execute the secure boot process. In the secure boot process, the measurement unit 33 of the HSM 1012 calculates the measured value of the initial ECU code Eci using the signing key Kbc stored in the storage unit 1013. In the present embodiment, as an example of the measured value, the CMAC is used. Thus, the measurement unit 33 calculates the CMAC of the initial ECU code Eci using the signing key Kbc stored in the storage unit 1013. The CMAC of this calculation result is referred to as a measured value Ecn_x.

The measurement unit 33 compares the measured value Ecn_x with the expected value Ecn, and determines whether both are coincident with each other. In a case where the result of this determination is that both are coincident with each other, the verification of the measured value Ecn_x is a pass. On the other hand, in a case where both are not coincident with each other, the verification of the measured value Ecn_x is a fail. The HSM 1012 delivers the "pass or fail" which is a verification result for the measured value Ecn_x to the control unit 21.

(Step S37) The control unit 21 transmits the "pass or fail" which is a verification result for the measured value Ecn_x as a secure boot result to the key generation device 1300 via the diagnostic port 1060 through the interface unit 20. The key generation device 1300 receives the secure boot result "pass or fail" from the first ECU 1010 of the car 1001 via the diagnostic port 1060 through the vehicle interface 11.

Also, the first ECU 1010 may encrypt the "pass or fail" which is a verification result for the measured value Ecn_x as the secure boot result with the Root key Krc and transmit the result to the key generation device 1300. In this case, the key generation device 1300 receives the encrypted secure boot result "pass or fail" and decrypts the result with the Root key Krc of the first ECU 1010.

In a case where the secure boot result "pass or fail" received from the first ECU 1010 of the car 1001 by the key generation device 1300 is a "pass", the process proceeds to step S38. On the other hand, in a case where the secure boot result "pass or fail" is a "fail", the process of FIG. 7 is terminated. In addition, in a case where the secure boot result "pass or fail" is a "fail", the key generation device 1300 may execute the predetermined error processing.

(Step S38) The key generation unit 34 of the HSM 1012 of the first ECU 1010 generates an in-vehicle key Kv. The storage unit 1013 stores the in-vehicle key Kv.

Next, steps S39 and S40 are executed. Step S39 is the same as step S10 in Example 1 of the management method according to FIG. 5. Step S40 is the same as step S11 in Example 1 of the management method according to FIG. 5. Next, step S41 is executed.

(Step S41) The cryptographic processing unit 16 of the key generation device 1300 encrypts the signing key Kb1 of the second ECU (1) 1020 and the expected value E1$n$ with the Root key Kr1 of the second ECU (1) 1020, respectively, to generate second encrypted data Kr1 (Kb1) and fourth encrypted data Kr1 (E1$n$). The key generation device 1300 transmits the second encrypted data Kr1 (Kb1) and the fourth encrypted data Kr1 (E1$n$) to the second ECU (1) 1020 via the first ECU 1010 of the car 1001 through the vehicle interface 11. In a case where the second encrypted data Kr1 (Kb1) and the fourth encrypted data Kr1 (E1$n$) are received from the key generation device 1300 via the diagnostic port 1060 through the interface unit 20, the first ECU 1010 of the car 1001 transmits the second encrypted data Kr1 (Kb1) and the fourth encrypted data Kr1 (E1$n$) to the second ECU (1) 1020 via the CAN 1030 through the interface unit 20. The second ECU (1) 1020 receives the second encrypted data Kr1 (Kb1) and the fourth encrypted data Kr1 (E1$n$) from the first ECU 1010 via the CAN 1030 through the interface unit 40.

(Step S42) The control unit 41 of the second ECU (1) 1020 delivers the second encrypted data Kr1 (Kb1) and the fourth encrypted data Kr1 (E1$n$) to the SHE 1022. The cryptographic processing unit 52 of the SHE 1022 decrypts the second encrypted data Kr1 (Kb1) and the fourth encrypted data Kr1 (E1$n$) with the Root key Kr1 stored in the storage unit 1023, respectively, and acquires the signing key Kb1 and the expected value E1$n$. The SHE 1022 stores the acquired signing key Kb1 in the storage unit 1023. The SHE 1022 may store the acquired signing key Kb1 in place of the initial signing key Kbi in the storage unit 1023. In addition, the SHE 1022 sets the acquired expected value E1$n$ to an expected value which is used in the secure boot process.

(Step S43) The control unit 41 of the second ECU (1) 1020 delivers the initial ECU code E1$i$ stored in the storage unit 42 to the SHE 1022, and causes the SHE 1022 to execute the secure boot process. In the secure boot process, the measurement unit 53 of the SHE 1022 calculates the measured value of the initial ECU code E1$i$ using the signing key Kb1 stored in the storage unit 1023. In the present embodiment, as an example of the measured value, the CMAC is used. Thus, the measurement unit 53 calculates the CMAC of the initial ECU code E1$i$ using the signing key Kb1 stored in the storage unit 1023. The CMAC of this calculation result is referred to as a measured value E1$n$_x.

The measurement unit 53 compares the measured value E1$n$_x with the expected value E1$n$, and determines whether both are coincident with each other. In a case where the result of this determination is that both are coincident with each other, the verification of the measured value E1$n$_x is a pass. On the other hand, in a case where both are not coincident with each other, the verification of the measured value E1$n$_x is a fail. The SHE 1022 delivers the "pass or fail" which is a verification result for the measured value E1$n$_x to the control unit 41.

(Step S44) The control unit 41 transmits the "pass or fail" which is a verification result for the measured value E1$n$_x as the secure boot result to the key generation device 1300 via the CAN 1030 by way of the first ECU 1010 through the interface unit 40. In a case where the secure boot result "pass or fail" is received from the second ECU (1) 1020 via the CAN 1030 through the interface unit 20, the first ECU 1010 transmits the secure boot result "pass or fail" to the key generation device 1300 via the diagnostic port 1060 through the interface unit 20. The key generation device 1300 receives the secure boot result "pass or fail" of the second ECU (1) 1020 from the first ECU 1010 of the car 1001 via the diagnostic port 1060 through the vehicle interface 11.

Also, the second ECU (1) 1020 may encrypt the "pass or fail" which is a verification result for the measured value E1$n$_x as the secure boot result with the Root key Kr1 and transmit the result to the key generation device 1300. In this case, the key generation device 1300 receives the encrypted secure boot result "pass or fail" and decrypts the result with the Root key Kr1 of the second ECU (1) 1020.

In a case where the secure boot result "pass or fail" received from the second ECU (1) 1020 of the car 1001 by the key generation device 1300 is a "pass", the process proceeds to step S45.

On the other hand, in a case where the secure boot result "pass or fail" is a fail, the process of FIG. 7 is terminated with respect to the second ECU (1) 1020. Thus, in a case where the secure boot result "pass or fail" from the second ECU (1) 1020 is a fail, step S45 is not executed with respect to the second ECU (1) 1020. In addition, in a case where the secure boot result "pass or fail" from the second ECU (1) 1020 is a fail, the key generation device 1300 may execute the predetermined error processing.

Next, the processes of steps S45 to S47 are executed. Step S45 is the same as step S17 in Example 1 of the management method according to FIG. 5. Step S46 is the same as step S18 in Example 1 of the management method according to FIG. 5. Step S47 is the same as step S19 in Example 1 of the management method according to FIG. 5.

The processes of steps S39 to S47 described above are similarly executed with respect to all the second ECUs (n) 1020 installed in the car 1001.

According to Example 3 of the management method described above, the expected value of the ECU code of the ECU installed in the car 1001 is generated by the key generation device 1300 and is supplied to the ECU. The ECU verifies the measured value of its own ECU code on the basis of the expected value supplied from the key generation device 1300, and notifies the key generation device 1300 of this verification result. Thereby, the determination of authenticity of the ECU installed in the car 1001 is performed. Thereby, the reliability of the ECU installed in the car 1001 is improved.

Example 4 of Management Method

Figure 8:
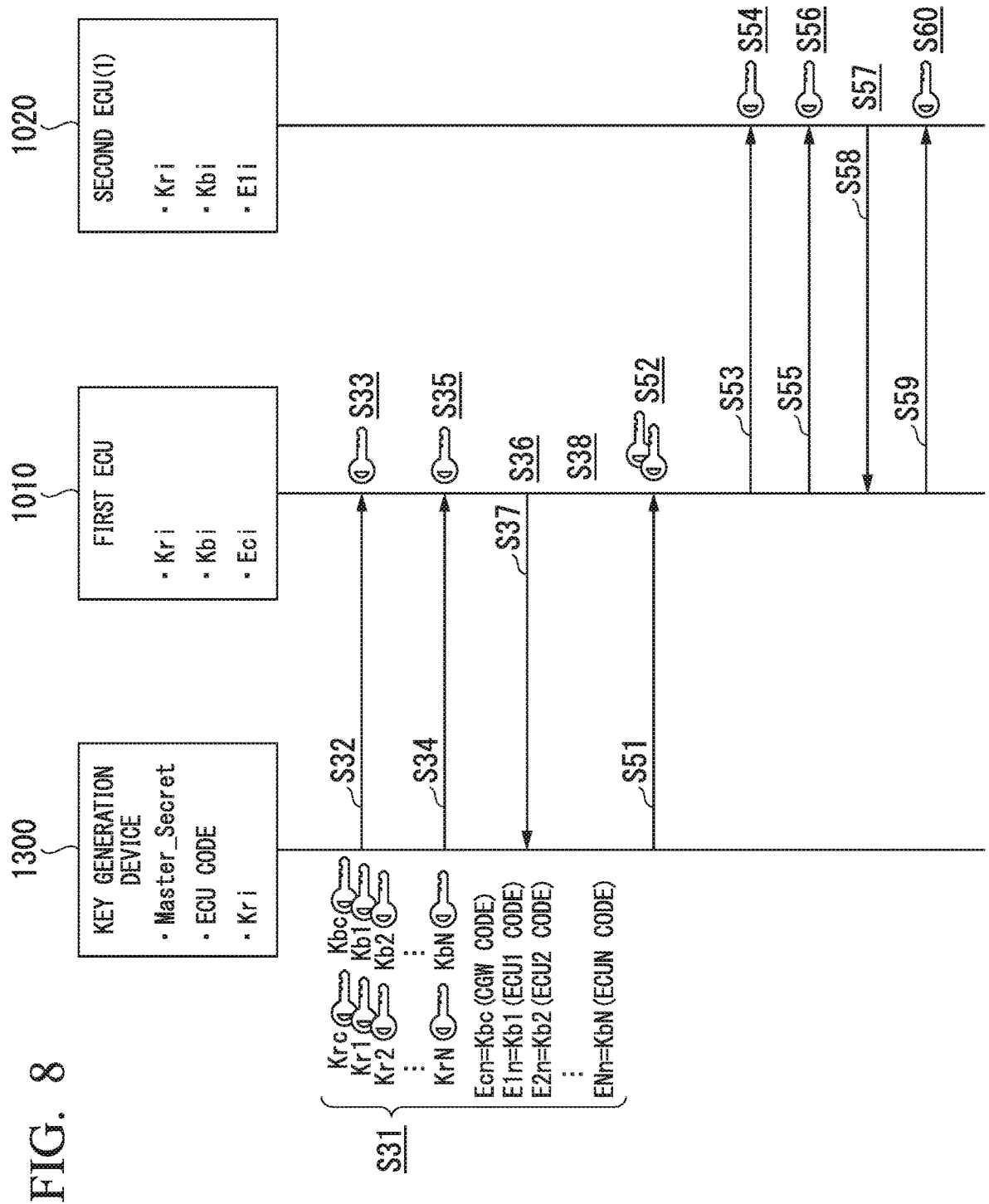
FIG. 8 is a sequence diagram of Example 4 of the management method according to an embodiment.

Example 4 of the management method is a modification example of Example 3 of the management method described above. FIG. 8 is a sequence diagram of Example 4 of the management method according to the present embodiment. In FIG. 8, portions corresponding to the respective units of FIG. 7 are denoted by the same reference numerals and signs, and thus the description thereof will not be given. Hereinafter, points different from those in Example 3 of the management method described above will be mainly described with reference to FIG. 8.

The vehicle interface 11 of the key generation device 1300 and the diagnostic port 1060 of the car 1001 are connected to each other. The processes of steps S31 to S38 are executed. The processed of steps S31 to S38 are the same as those in Example 3 of the management method according to FIG. 7 described above. In a case where the secure boot result "pass or fail" received from the first ECU 1010 of the car 1001 by the key generation device 1300 is a "pass", step S51 is executed subsequently to step S38. On the other hand, in a case where the secure boot result "pass or fail" is a "fail", the process of FIG. 8 is terminated. In addition, in a case where the secure boot result "pass or fail" is a "fail", the key generation device 1300 may execute the predetermined error processing.

(Step S51) The cryptographic processing unit 16 of the key generation device 1300 encrypts the Root key Km, the signing key Kbn and the expected value Enn of each of the N second ECUs (n) 1020 with the Root key Krc of the first ECU 1010, respectively. N pieces of first encrypted data Krc (Kr1), Krc (Kr2), . . . , Krc (KrN), N pieces of second encrypted data Krc (Kb1), Krc (Kb2), . . . , Krc (KbN), and N pieces of fourth encrypted data Krc (E1$n$), Krc (E2$n$), . . . , Krc (ENn) are generated by this encryption.

The key generation device 1300 transmits the N pieces of first encrypted data Krc (Kr1), Krc (Kr2), . . . , Krc (KrN), the N pieces of second encrypted data Krc (Kb1). Krc (Kb2), . . . , Krc (KbN), and the N pieces of fourth encrypted data Krc (E1$n$), Krc (E2$n$), . . . , Krc (ENn) to the first ECU 1010 of the car 1001 through the vehicle interface 11. The first ECU 1010 of the car 1001 receives the N pieces of first encrypted data Krc (Kr1), Krc (Kr2), . . . , Krc (KrN), the N pieces of second encrypted data Krc (Kb1), Krc (Kb2), . . . , Krc (KbN), and the N pieces of fourth encrypted data Krc (E1$n$), Krc (E2$n$), . . . , Krc (ENn) from the key generation device 1300 via the diagnostic port 1060 through the interface unit 20.

(Step S52) The control unit 21 of the first ECU 1010 delivers the N pieces of first encrypted data Krc (Kr1), Krc (Kr2), . . . , Krc (KrN), the N pieces of second encrypted data Krc (Kb1), Krc (Kb2), . . . , Krc (KbN), and the N pieces of fourth encrypted data Krc (E1$n$), Krc (E2$n$), . . . , Krc (ENn) to the HSM 1012. The cryptographic processing unit 32 of the HSM 1012 decrypts the N pieces of first encrypted data Krc (Kr1), Krc (Kr2), . . . , Krc (KrN), the N pieces of second encrypted data Krc (Kb1), Krc (Kb2), . . . , Krc (KbN), and the N pieces of fourth encrypted data Krc (E1$n$), Krc (E2$n$), . . . , Krc (ENn) with the Root key Krc stored in the storage unit 1013, respectively. N Root keys Kr1, Kr2, . . . , KrN. N signing keys Kb1, Kb2, . . . , KbN, and N expected values E1$n$, E2$n$, . . . , ENn are acquired by this decryption. The HSM 1012 stores the acquired N Root keys Kr1, Kr2, . . . , KrN, N signing keys Kb1, Kb2, . . . , KbN, and N expected values E1$n$, E2$n$, . . . , ENn in the storage unit 1013.

Next, steps S53 and S54 are executed. Step S53 is the same as step S24 in Example 2 of the management method according to FIG. 6. Step S54 is the same as step S25 in Example 2 of the management method according to FIG. 6. Next, step S55 is executed.

(Step S55) The cryptographic processing unit 32 of the HSM 1012 of the first ECU 1010 encrypts the signing key Kb1 of the second ECU (1) 1020 and expected value E1$n$ with the Root key Kr1 of the second ECU (1) 1020, respectively, to generate the second encrypted data Kr1 (Kb1) and the fourth encrypted data Kr1 (E1$n$). The HSM 1012 delivers the second encrypted data Kr1 (Kb1) and the fourth encrypted data Kr1 (E1$n$) to the control unit 21. The control unit 21 transmits the second encrypted data Kr1 (Kb1) and the fourth encrypted data Kr1 (E1$n$) to the second ECU (1) 1020 via the CAN 1030 through the interface unit 20. The second ECU (1) 1020 receives the second encrypted data Kr1 (Kb1) and the fourth encrypted data Kr1 (E1$n$) from the first ECU 1010 through the CAN 1030 through the interface unit 40.

(Step S56) The control unit 41 of the second ECU (1) 1020 delivers the second encrypted data Kr1 (Kb1) and the fourth encrypted data Kr1 (E1$n$) to the SHE 1022. The cryptographic processing unit 52 of the SHE 1022 decrypts the second encrypted data Kr1 (Kb1) and the fourth encrypted data Kr1 (E1$n$) with the Root key Kr1 stored in the storage unit 1023, respectively, and acquires the signing key Kb1 and the expected value E1$n$. The SHE 1022 stores the acquired signing key Kb1 in the storage unit 1023. The SHE 1022 may store the acquired signing key Kb1 in place of the initial signing key Kbi in the storage unit 1023. In addition, the SHE 1022 sets the acquired expected value E1$n$ to an expected value which is used in the secure boot process.

Next, step S57 is executed. Step S57 is the same as step S43 in Example 3 of the management method according to FIG. 7. Next, step S58 is executed.

(Step S58) The control unit 41 of the second ECU (1) 1020 transmits the "pass or fail" which is a verification result for the measured value E1$n$_x as the secure boot result to the first ECU 1010 via the CAN 1030 through the interface unit 40. The first ECU 1010 receives the secure boot result "pass or fail" from the second ECU (1) 1020 via the CAN 1030 through the interface unit 20.

In a case where the secure boot result "pass or fail" received from the second ECU (1) 1020 by the first ECU 1010 is a "pass", the process proceeds to step S59. On the other hand, in a case where the secure boot result "pass or fail" is a fail, the process of FIG. 8 is terminated with respect to the second ECU (1) 1020. Thus, in a case where the secure boot result "pass or fail" from the second ECU (1) 1020 is a fail, step S59 is not executed with respect to the second ECU (1) 1020. In addition, in a case where the secure boot result "pass or fail" from the second ECU (1) 1020 is a fail, the first ECU 1010 may execute the predetermined error processing.

(Step S59) The cryptographic processing unit 32 of the HSM 1012 of the first ECU 1010 encrypts the in-vehicle key Kv with the Root key Kr1 of the second ECU (1) 1020 to generate encrypted data Kr1 (Kv). The HSM 1012 delivers the encrypted data Kr1 (Kv) to the control unit 21. The control unit 21 transmits the encrypted data Kr1 (Kv) to the second ECU (1) 1020 via the CAN 1030 through the interface unit 20. The second ECU (1) 1020 receives the encrypted data Kr1 (Kv) from the first ECU 1010 via the CAN 1030 through the interface unit 40.

(Step S60) The control unit 41 of the second ECU (I) 1020 delivers the encrypted data Kr1 (Kv) to the SHE 1022. The cryptographic processing unit 52 of the SHE 1022 decrypts the encrypted data Kr1 (Kv) with the Root key Kr1 stored in the storage unit 1023, and acquires the in-vehicle key Kv. The SHE 1022 stores the acquired in-vehicle key Kv in the storage unit 1023.

The processes of steps S53 to S60 described above are similarly executed with respect to all the second ECUs (n) 1020 installed in the car 1001.

Also, the processes of steps S53 to S60 described above are processes which are performed within the car 1001. Therefore, while the processes of steps S53 to S60 are executed, the vehicle interface 11 of the key generation device 1300 and the diagnostic port 1060 of the car 1001 may not be connected to each other.

According to Example 4 of the management method described above, similarly to Example 3 of the management method, the expected value of the ECU code of the ECU installed in the car 1001 is generated by the key generation device 1300 and is supplied to the ECU. The ECU verifies the measured value of its own ECU code on the basis of the expected value supplied from the key generation device 1300. According to Example 4 of the present management method, by notifying the key generation device 1300 of the result of verification performed by the first ECU 1010, and thus the determination of authenticity of the first ECU 1010 installed in the car 1001 is performed. In addition, by notifying the first ECU 1010 of the result of verification performed by the second ECU (n) 1020, and thus the determination of authenticity of the second ECU (n) 1020 installed in the car 1001 is performed. Thereby, the reliability of the ECU installed in the car 1001 is improved. In addition, the first ECU 1010 performs the determination of authenticity of the N second EC Is (n) 1020, and thus a time during which the key generation device 1300 and the car 1001 are connected to each other can be further shortened than in Example 3 of the management method.

In addition, according to Example 4 of the management method, the first ECU 1010 has a function (function corresponding to steps S52, S53 and S55) of relaying the N pieces of first encrypted data Krc (Kr1), Krc (Kr2), . . . , Krc (KrN), the N pieces of second encrypted data Krc (Kb1), Krc (Kb2), . . . , Krc (KbN), and the N pieces of fourth encrypted data Krc (E1n), Krc (E2n), . . . , Krc (ENn), transmitted from the key generation device 1300, to the second ECU (n) 1020. Thereby, a time during which the key generation device 1300 and the car 1001 are connected to each other can be further shortened than in Example 3 of the management method.

Example 5 of Management Method

Figure 9:
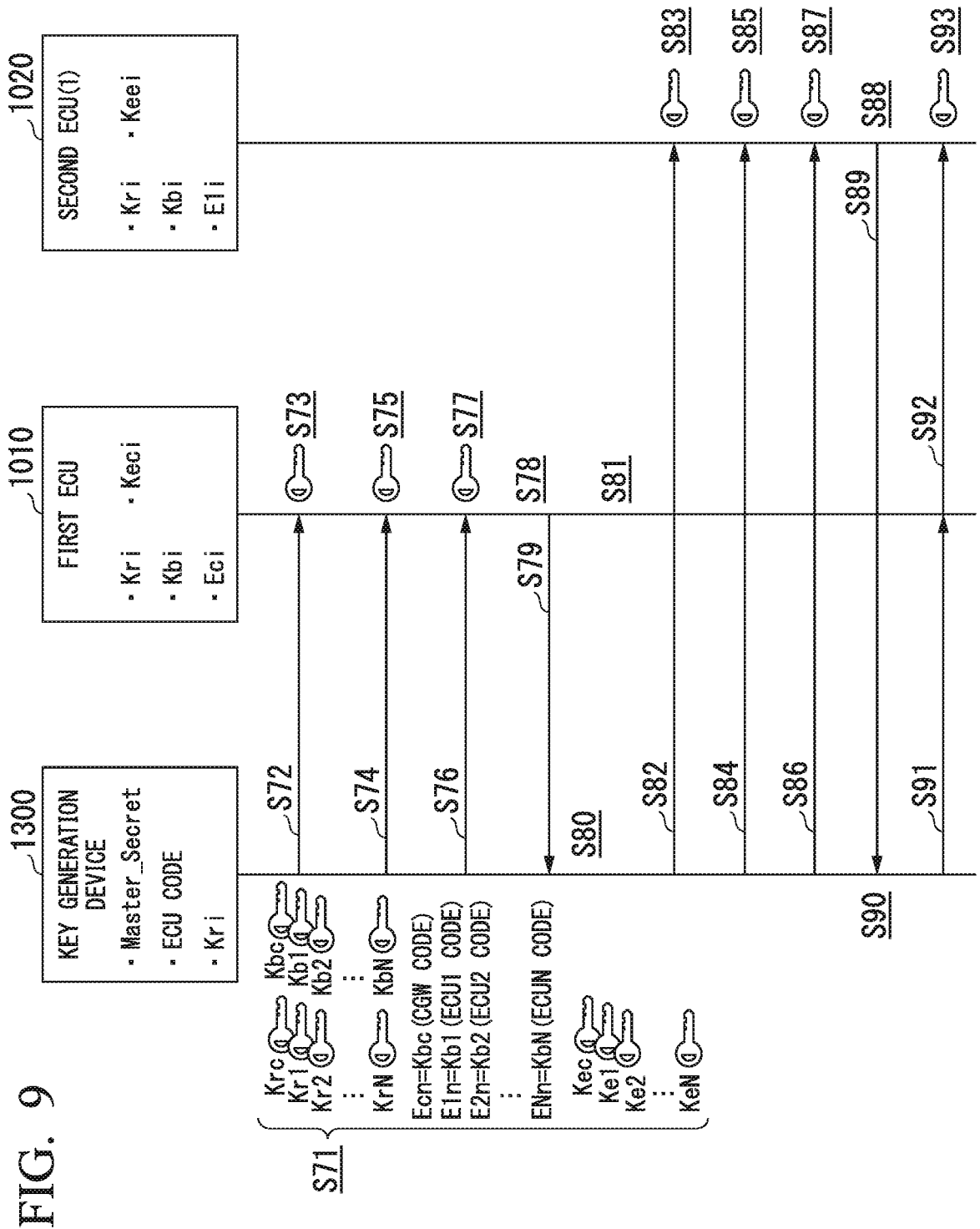
FIG. 9 is a sequence diagram of Example 5 of the management method according to an embodiment.

FIG. 9 is a sequence diagram of Example 5 of the management method according to the present embodiment. Example 5 of the management method according to the present embodiment will be described with reference to FIG. 9. The key generation device 1300 is provided in, for example, the manufacturing plant of the car 1001. The vehicle interface 11 of the key generation device 1300 is connected to the diagnostic port 1060 of the car 1001 during manufacturing in the manufacturing plant.

FIG. 9 shows only one second ECU (1) 1020 out of the second ECUs (n) 1020 installed in the car 1001, for convenience of description. Where, n is an integer from 1 to n. N is the number of second ECUs 1020 which are targets for key distribution among the second ECUs 1020 installed in the car 1001.

Similarly to Example 1 of the management method according to FIG. 5, the key generation device 1300 stores a master key Master_Secret, an ECU code of the ECU, and an initial Root key Kri in advance in the storage unit 12. The ECU code of an ECU includes an initial ECU code of the ECU.

Similarly to Example 1 of the management method according to FIG. 5, the HSM 1012 of the first ECU 1010 stores the initial Root key Kri and an initial signing key Kbi in advance in the storage unit 1013. In Example 5 of the present management method, the HSM 1012 of the first ECU 1010 further stores an initial encryption key Keci in advance in the storage unit 1013. Similarly to Example 1 of the management method according to FIG. 5, the SHE 1022 of the second ECU 1020 stores the initial Root key Kri and the initial signing key Kbi in advance in the storage unit 1023. In Example 5 of the present management method, the SHE 1022 of the second ECU 1020 further stores an initial encryption key Keei in advance in the storage unit 1023.

Similarly to Example 1 of the management method according to FIG. 5, the main computing unit 1011 of the first ECU 1010 stores an initial ECU code Eci in advance in the storage unit 22. Similarly to Example 1 of the management method according to FIG. 5, the main computing unit 1021 of the second ECU (n) 1020 stores an initial ECU code Eni in advance in the storage unit 42.

Hereinafter, the vehicle interface 11 of the key generation device 1300 and the diagnostic port 1060 of the car 1001 are connected to each other.

(Step S71) In the key generation device 1300, the key generation unit 15 generates a Root key and a signing key of the ECU installed in the car 1001. In the present embodiment, the key generation unit 15 generates the Root key Krc and the signing key Kbc of the first ECU 1010, and the Root key Krn and the signing key Kbn of each of the N second ECUs (n) 1020. The storage unit 12 stores the Root key Krc and the signing key Kbc of the first ECU 1010, and the Root key Krn and the signing key Kbn of each of the N second ECUs (n) 1020. The Root keys Krc and Krn correspond to a first key. The signing keys Kbc and Kbn correspond to a second key. A method of generation the Root keys Krc and Krn and the signing keys Kbc and Kbn is the same as step S1 of Example 1 of the management method according to FIG. 5.

In Example 5 of the present management method, the key generation unit 15 further generates an encryption key of the ECU installed in the car 1001. The encryption key is generated differently from the Root key and the signing key. For example, the value of the variable Nk for the Root key is set to Nk_1, the value of the variable Nk for the signing key is set to Nk_2, and the value of the variable Nk for the encryption key is set to Nk_3. The key generation unit 15 uses the master key Master_Secret and the ECU identifier ECU_ID of the ECU to generate the Root key, the signing key and the encryption key as different keys on the basis of the following expressions:

Root key=digest (Master_Secret, ECU_ID, Nk_1),

Signing key=digest (Master_Secret, ECU_ID, Nk_2), and

Encryption key=digest (Master_Secret, ECU_ID, Nk_3).

The key generation unit 15 further generates an encryption key Kec of the first ECU 1010 and an encryption key Ken of each of the N second ECUs (n) 1020, in addition to the Root key Krc and the signing key Kbc of the first ECU 1010 and the Root key Krn and the signing key Kbn of each of the N second ECUs (n) 1020 described above. The storage unit 12 further stores the encryption key Kec of the first ECU 1010 and the encryption key Ken of each of the N second ECUs (n) 1020, in addition to the Root key Krc and the signing key Kbc of the first ECU 1010 and the Root key Krn and the signing key Kbn of each of the N second ECUs (n) 1020 described above. The encryption keys Kec and Ken correspond to a third key.

The expected value calculation unit 13 calculates the CMAC of the initial ECU code Eci (CGW code) of the first ECU 1010 using the signing key Kbc of the first ECU 1010. The CMAC of this calculation result is referred to as an expected value Ecn. The expected value calculation unit 13 calculates the CMAC of the initial ECU code Eni (ECUn code) of the second ECU (n) 1020 using the signing key Kbn of the second ECU (n) 1020. The CMAC of this calculation result is referred to as an expected value Enn. Thereby, the expected value Ecn relating the initial ECU code Eci (CGW code) of the first ECU 1010 and each of expected values E1n, E2n, . . . , ENn relating to the initial ECU code Eni (ECUn code) of the N second ECUs (n) 1020 are generated by the expected value calculation unit 13. The storage unit 12 stores the expected value Ecn relating to the initial ECU code Eci (CGW code) of the first ECU 1010 and each of the expected values E1n, E2n, . . . , ENn relating to the initial ECU code Eni (ECUn code) of the N second ECUs (n) 1020.

Next, steps S72 and S73 are executed. Step S72 is the same as step S2 in Example 1 of the management method according to FIG. 5. Step S73 is the same as step S3 in Example 1 of the management method according to FIG. 5. Next, step S74 is executed.

(Step S74) The cryptographic processing unit 16 of the key generation device 1300 encrypts the encryption key Kec of the first ECU 1010 with the Root key Krc of the first ECU 1010, to generate fifth encrypted data Krc (Kec). The verification unit 14 generates a random number Nonce. The storage unit 12 stores the random number Nonce. The key generation device 1300 transmits the fifth encrypted data Krc (Kec) and the random number Nonce to the first ECU 1010 of the car 1001 through the vehicle interface 11. The first ECU 1010 of the car 1001 receives the fifth encrypted data Krc (Kec) and the random number Nonce from the key generation device 1300 via the diagnostic port 1060 through the interface unit 20.

(Step S75) The control unit 21 of the first ECU 1010 delivers the fifth encrypted data Krc (Kec) to the HSM 1012. The cryptographic processing unit 32 of the HSM 1012 decrypts the fifth encrypted data Krc (Kec) with the Root key Krc stored in the storage unit 1013, and acquires the encryption key Kec. The HSM 1012 stores the acquired encryption key Kec in the storage unit 1013. The HSM 1012 may store the acquired encryption key Kec in place of the initial encryption key Keci in the storage unit 1013. In the present embodiment, the encryption key Kec is set as an encryption key capable of being used in a case where the verification of the measured value has been passed in the secure boot process which is executed by the HSM 1012. Therefore, the encryption key Kec is not used in a case where the verification of the measured value has failed in the secure boot process which is executed by the HSM 1012.

The storage unit 22 stores the random number Nonce. The storage place of the random number Nonce is a non-volatile storage area which is not a target for the measurement of secure boot among storage areas of the storage unit 22.

(Step S76) The cryptographic processing unit 16 of the key generation device 1300 encrypts the signing key Kbc and the expected value Ecn of the first ECU 1010 with the Root key Krc of the first ECU 1010, to generate second encrypted data Krc (Kbc) and the fourth encrypted data Krc (Ecn). The key generation device 1300 transmits the second encrypted data Krc (Kbc) and the fourth encrypted data Krc (Ecn) to the first ECU 1010 of the car 1001 through the vehicle interface 11. The first ECU 1010 of the car 1001 receives the second encrypted data Krc (Kbc) and the fourth encrypted data Krc (Ecn) from the key generation device 1300 via the diagnostic port 1060 through the interface unit 20.

(Step S77) The control unit 21 of the first ECU 1010 delivers the second encrypted data Krc (Kbc) and the fourth encrypted data Krc (Ecn) to the HSM 1012. The cryptographic processing unit 32 of the HSM 1012 decrypts the second encrypted data Krc (Kbc) and the fourth encrypted data Krc (Ecn) with the Root key Krc stored in the storage unit 1013, respectively, and acquires the signing key Kbc and the expected value Ecn. The HSM 1012 stores the acquired signing key Kbc in the storage unit 1013. The HSM 1012 may store the acquired signing key Kbc in place of the initial signing key Kbi in the storage unit 1013. In addition, the HSM 1012 sets the acquired expected value Ecn to an expected value which is used in the secure boot process.

(Step S78) The control unit 21 of the first ECU 1010 delivers the initial ECU code Eci stored in the storage unit 22 to the HSM 1012, and causes the HSM 1012 to execute the secure boot process. In the secure boot process, the measurement unit 33 of the HSM 1012 calculates the measured value of the initial ECU code Eci using the signing key Kbc stored in the storage unit 1013. In the present embodiment, as an example of the measured value, the CMAC is used. Thus, the measurement unit 33 calculates the CMAC of the initial ECU code Eci using the signing key Kbc stored in the storage unit 1013. The CMAC of this calculation result is referred to as a measured value Ecn_x.

The measurement unit 33 compares the measured value Ecn_x with the expected value Ecn, and determines whether both are coincident with each other. In a case where the result of this determination is that both are coincident with each other, the verification of the measured value Ecn_x is a pass. In a case where the verification of the measured value Ecn_x has been passed, the encryption key Kec can be used. On the other hand, in a case where both are not coincident with each other, the verification of the measured value Ecn_x is a fail. In a case where the verification of the measured value Ecn_x has failed, the encryption key Kec is not used. The HSM 1012 delivers the "pass or fail" which is a verification result for the measured value Ecn_x to the control unit 21.

(Step S79) In a case where the verification result for the measured value Ecn_x received from the HSM 1012 is a "pass", the control unit 21 delivers the random number Nonce stored in the storage unit 22 to the HSM 1012, and causes the HSM 1012 to execute encryption with the encryption key Kec. The cryptographic processing unit 32 of the HSM 1012 encrypts the random number Nonce with the encryption key Kec stored in the storage unit 1013, to generate sixth encrypted data Kec (Nonce). The HSM 1012 delivers the sixth encrypted data Kec (Nonce) to the control unit 21. On the other hand, in a case where the verification result for the measured value Ecn_x received from the HSM 1012 is a "fail", the control unit 21 does not perform the encryption of the random number Nonce.

The control unit 21 transmits the "pass or fail" which is a verification result for the measured value Ecn_x as a secure boot result to the key generation device 1300 via the diagnostic port 1060 through the interface unit 20. At this time, in a case where the verification result for the measured value Ecn_x is a "pass", the control unit 21 includes the sixth encrypted data Kec (Nonce) in the secure boot result "pass (OK)". The key generation device 1300 receives the secure boot result "pass or fail" of the first ECU 1010 from the first ECU 1010 of the car 1001 via the diagnostic port 1060 through the vehicle interface 11.

Also, the random number Nonce as it is without encryption may be included in the secure boot result "pass (OK)" by the control unit 21. In addition, the random number Nonce and the CMAC of the random number Nonce may be included in the secure boot result "pass (OK)" by the control unit 21. The CMAC of the random number Nonce may be calculated using the encryption key Kec. In a case where the random number Nonce and the CMAC of the random number Nonce are included in the secure boot result "pass (OK)", either the random number Nonce or the CMAC of the random number Nonce or both the random number Nonce and the CMAC of the random number Nonce may be encrypted.

(Step S80) The cryptographic processing unit 16 of the key generation device 1300 decrypts the sixth encrypted data Kec (Nonce) included in the secure boot result "pass (OK)" of the first ECU 1010 with the encryption key Kec of the first ECU 1010, and acquires the decrypted data Nonce. The verification unit 14 compares the decrypted data Nonce with the random number Nonce stored in the storage unit 12, and determines whether both are coincident with each other. In a case where the result of this determination is that both are coincident with each other, the secure boot result "pass" of the first ECU 1010 is determined to be correct. In a case where the secure boot result "pass" is determined to be correct, the process proceeds to step S81. On the other hand, in a case where both are not coincident with each other, the secure boot result "pass" of the first ECU 1010 is determined not to be correct. In a case where the secure boot result "pass" is determined not to be correct, the process of FIG. 9 is terminated. In addition, in a case where the secure boot result "pass" is determined not to be correct, the key generation device 1300 may execute the predetermined error processing.

In addition, in a case where the key generation device 1300 has received the secure boot result "fail" of the first ECU 1010 of the car 1001, the process of FIG. 9 is terminated. In addition, in a case where the secure boot result "fail" has been received, the key generation device 1300 may execute the predetermined error processing.

(Step S81) The key generation unit 34 of the HSM 1012 of the first ECU 1010 generates an in-vehicle key Kv. The storage unit 1013 stores the in-vehicle key Kv.

Next, steps S82 and S83 are executed. Step S82 is the same as step S10 in Example 1 of the management method according to FIG. 5. Step S83 is the same as step S11 in Example 1 of the management method according to FIG. 5. Next, step S84 is executed.

(Step S84) The cryptographic processing unit 16 of the key generation device 1300 encrypts an encryption key Ke1 of the second ECU (1) 1020 with the Root key Kr1 of the second ECU (1) 1020, to generate fifth encrypted data Kr1 (Ke1). The verification unit 14 generates a random number Nonce 1. The storage unit 12 stores the random number Nonce 1. The key generation device 1300 transmits the fifth encrypted data Kr1 (Ke1) and the random number Nonce1 to the second ECU (1) 1020 via the first ECU 1010 of the car 1001 through the vehicle interface 11. In a case where the fifth encrypted data Kr1 (Ke1) and the random number Nonce1 are received from the key generation device 1300 via the diagnostic port 1060 through the interface unit 20, the first ECU 1010 of the car 1001 transmits the fifth encrypted data Kr1 (Ke1) and the random number Nonce1 to the second ECU (1) 1020 via the CAN 1030 through the interface unit 20. The second ECU (1) 1020 receives the fifth encrypted data Kr1 (Ke1) and the random number Nonce1 from the first ECU 1010 via the CAN 1030 through the interface unit 40.

(Step S85) The control unit 41 of the second ECU (1) 1020 delivers the fifth encrypted data Kr1 (Ke1) to the SHE 1022. The cryptographic processing unit 52 of the SHE 1022 decrypts the fifth encrypted data Kr1 (Ke1) with the Root key Kr1 stored in the storage unit 1023, and acquires the encryption key Ke1. The SHE 1022 stores the acquired encryption key Ke1 in the storage unit 1023. The SHE 1022 may store the acquired encryption key Ke1 in place of the initial encryption key Keei in the storage unit 1023. In the present embodiment, the encryption key Ke1 is set as an encryption key capable of being used in a case where verification of the measured value has been passed in the secure boot process which is executed by the SHE 1022. Therefore, the encryption key Ke1 is not used in a case where the verification of the measured value has failed in the secure boot process which is executed by the SHE 1022.

The storage unit 42 stores the random number Nonce1. The storage place of the random number Nonce1 is a non-volatile storage area which is not a target for the measurement of secure boot among storage areas of the storage unit 42.

(Step S86) The cryptographic processing unit 16 of the key generation device 1300 encrypts the signing key Kb1 of the second ECU (1) 1020 and the expected value E1$n$ with the Root key Kr1 of the second ECU (1) 1020, respectively, to generate second encrypted data Kr1 (Kb1) and fourth encrypted data Kr1 (E1$n$). The key generation device 1300 transmits the second encrypted data Kr1 (Kb1) and the fourth encrypted data Kr1 (E1$n$) to the second ECU (1) 1020 via the first ECU 1010 of the car 1001 through the vehicle interface 11. In a case where the second encrypted data Kr1 (Kb1) and the fourth encrypted data Kr1 (E1$n$) are received from the key generation device 1300 via the diagnostic port 1060 through the interface unit 20, the first ECU 1010 of the car 1001 transmits the second encrypted data Kr1 (Kb1) and the fourth encrypted data Kr1 (E1$n$) to the second ECU (1) 1020 via the CAN 1030 through the interface unit 20. The second ECU (1) 1020 receives the second encrypted data Kr1 (Kb1) and the fourth encrypted data Kr1 (E1$n$) from the first ECU 1010 via the CAN 1030 through the interface unit 40.

(Step S87) The control unit 41 of the second ECU (1) 1020 delivers the second encrypted data Kr1 (Kb1) and the fourth encrypted data Kr1 (E1$n$) to the SHE 1022. The cryptographic processing unit 52 of the SHE 1022 decrypts the second encrypted data Kr1 (Kb1) and the fourth encrypted data Kr1 (E1$n$) with the Root key Kr1 stored in the storage unit 1023, respectively, and acquires the signing key Kb1 and the expected value E1$n$. The SHE 1022 stores the acquired signing key Kb1 in the storage unit 1023. The SHE 1022 may store the acquired signing key Kb1 in place of the initial signing key Kbi in the storage unit 1023. In addition, the SHE 1022 sets the acquired expected value E1$n$ to an expected value which is used in the secure boot process.

(Step S88) The control unit 41 of the second ECU (1) 1020 delivers the initial ECU code E1$i$ stored in the storage unit 42 to the SHE 1022, and causes the SHE 1022 to execute the secure boot process. In the secure boot process, the measurement unit 53 of the SHE 1022 calculates the measured value of the initial ECU code E1$i$ using the signing key Kb1 stored in the storage unit 1023. In the present embodiment, as an example of the measured value, the CMAC is used. Thus, the measurement unit 53 calculates the CMAC of the initial ECU code E1$i$ using the signing key Kb1 stored in the storage unit 1023. The CMAC of this calculation result is referred to as a measured value E1$n$_x.

The measurement unit 53 compares the measured value E1$n$_x with the expected value E1$n$, and determines whether both are coincident with each other. In a case where the result of this determination is that both are coincident with each other, the verification of the measured value E1$n$_x is a pass. In a case where the verification of the measured value E1$n$_x has been passed, the encryption key Ke1 can be used.

On the other hand, in a case where both are not coincident with each other, the verification of the measured value E1n_x is a fail. In a case where the verification of the measured value E1n_x has failed, the encryption key Ke1 is not used. The SHE 1022 delivers the "pass or fail" which is a verification result for the measured value E1n_x to the control unit 41.

(Step S89) In a case where the verification result for the measured value E1n_x received from SHE 1022 is a "pass", the control unit 41 delivers the random number Nonce1 stored in the storage unit 42 to the SHE 1022, and causes the SHE 1022 to execute encryption with the encryption key Ke1. The cryptographic processing unit 52 of the SHE 1022 encrypts the random number Nonce1 with the encryption key Ke1 stored in the storage unit 1023, to generate sixth encrypted data Ke1 (Nonce1). The SHE 1022 delivers the sixth encrypted data Ke1 (Nonce1) to the control unit 41. On the other hand, in a case where the verification result for the measured value E1n_x received from the SHE 1022 is a "fail", the control unit 41 does not perform the encryption of the random number Nonce1.

The control unit 41 transmits the "pass or fail" which is a verification result for the measured value E1n_x as the secure boot result to the key generation device 1300 via the CAN 1030 by way of the first ECU 1010 through the interface unit 40. At this time, in a case where the verification result for the measured value E1n_x is a "pass", the sixth encrypted data Ke1 (Nonce1) is included in the secure boot result "pass (OK)" by the control unit 41. In a case where the secure boot result "pass or fail" is received from the second ECU (1) 1020 via the CAN 1030 through the interface unit 20, the first ECU 1010 transmits the secure boot result "pass or fail" to the key generation device 1300 via the diagnostic port 1060 through the interface unit 20. The key generation device 1300 receives the secure boot result "pass or fail" of the second ECU (1) 1020 from the first ECU 1010 of the car 1001 via the diagnostic port 1060 through the vehicle interface 11.

Also, the random number Nonce1 as it is without encryption may be included in the secure boot result "pass (OK)" by the control unit 41. In addition, the random number Nonce1 and the CMAC of the random number Nonce1 may be included in the secure boot result "pass (OK)" by the control unit 41. The CMAC of the random number Nonce1 may be calculated using the encryption key Ke1. In a case where the random number Nonce1 and the CMAC of the random number Nonce1 are included in the secure boot result "pass (OK)", either the random number Nonce1 or the CMAC of the random number Nonce1 or both the random number Nonce1 and the CMAC of the random number Nonce 1 may be encrypted.

(Step S90) The cryptographic processing unit 16 of the key generation device 1300 decrypts the sixth encrypted data Ke1 (Nonce1) included in the secure boot result "pass (OK)" of the second ECU (1) 1020 with the encryption key Ke1 of the second ECU (1) 1020, and acquires the decrypted data Nonce1. The verification unit 14 compares the decrypted data Nonce1 with the random number Nonce1 stored in the storage unit 12, and determines whether both are coincident with each other. In a case where the result of this determination is that both are coincident with each other, the secure boot result "pass" of the second ECU (1) 1020 is determined to be correct. In a case where the secure boot result "pass" is determined to be correct, the process proceeds to step S91. On the other hand, in a case where both are not coincident with each other, the secure boot result "pass" of the second ECU (1) 1020 is determined not to be correct. In a case where the secure boot result "pass" of the second ECU (1) 1020 is determined not to be correct, the process of FIG. 9 is terminated with respect to the second ECU (1) 1020. Thus, in a case where the secure boot result "pass" of the second ECU (1) 1020 is determined not to be correct, step S91 is not executed with respect to the second ECU (1) 1020. In addition, in a case where the secure boot result "pass" is determined not to be correct, the key generation device 1300 may execute the predetermined error processing.

In addition, in a case where the key generation device 1300 has received the secure boot result "fail" of the second ECU (1) 1020 of the car 1001, the process of FIG. 9 is terminated with respect to the second ECU (1) 1020. Thus, in a case where the secure boot result "fail" of the second ECU (1) 1020 has been received, step S91 is not executed with respect to the second ECU (1) 1020. In addition, in a case where the secure boot result "fail" has been received, the key generation device 1300 may execute the predetermined error processing.

Next, the processes of steps S91 to S93 are executed. Step S91 is the same as step S17 in Example 1 of the management method according to FIG. 5. Step S92 is the same as step S18 in Example 1 of the management method according to FIG. 5. Step S93 is the same as step S19 in Example 1 of the management method according to FIG. 5.

The processes steps S82 to S93 described above are similarly executed with respect to all the second ECUs (n) 1020 installed in the car 1001.

According to Example 5 of the management method described above, the expected value of the ECU code of the ECU installed in the car 1001 is generated by the key generation device 1300 and is supplied to the ECU. The ECU verifies the measured value of its own ECU code on the basis of the expected value supplied from the key generation device 1300, and notifies the key generation device 1300 of this verification result. Thereby, the determination of authenticity of the ECU installed in the car 1001 is performed. Thereby, the reliability of the ECU installed in the car 1001 is improved.

Further, according to Example 5 of the management method described above, when the ECU notifies the key generation device 1300 of the verification result for the measured value of its own ECU code, the verification values (random numbers Nonce and Nonce1 in the above-described example) supplied from the key generation device 1300 are encrypted with an encryption key capable of being used in a case where the verification of the measured value has been passed to generate sixth encrypted data, and the sixth encrypted data is transmitted to the key generation device 1300. The encryption key is shared with the key generation device 1300. The key generation device 1300 decrypts the sixth encrypted data, and determines the coincidence between this decrypted data and an original verification value supplied to the ECU, whereby it is possible to confirm the validity of the verification result for the measured value of the ECU code of the ECU.

Example 6 of Management Method

Figure 10:
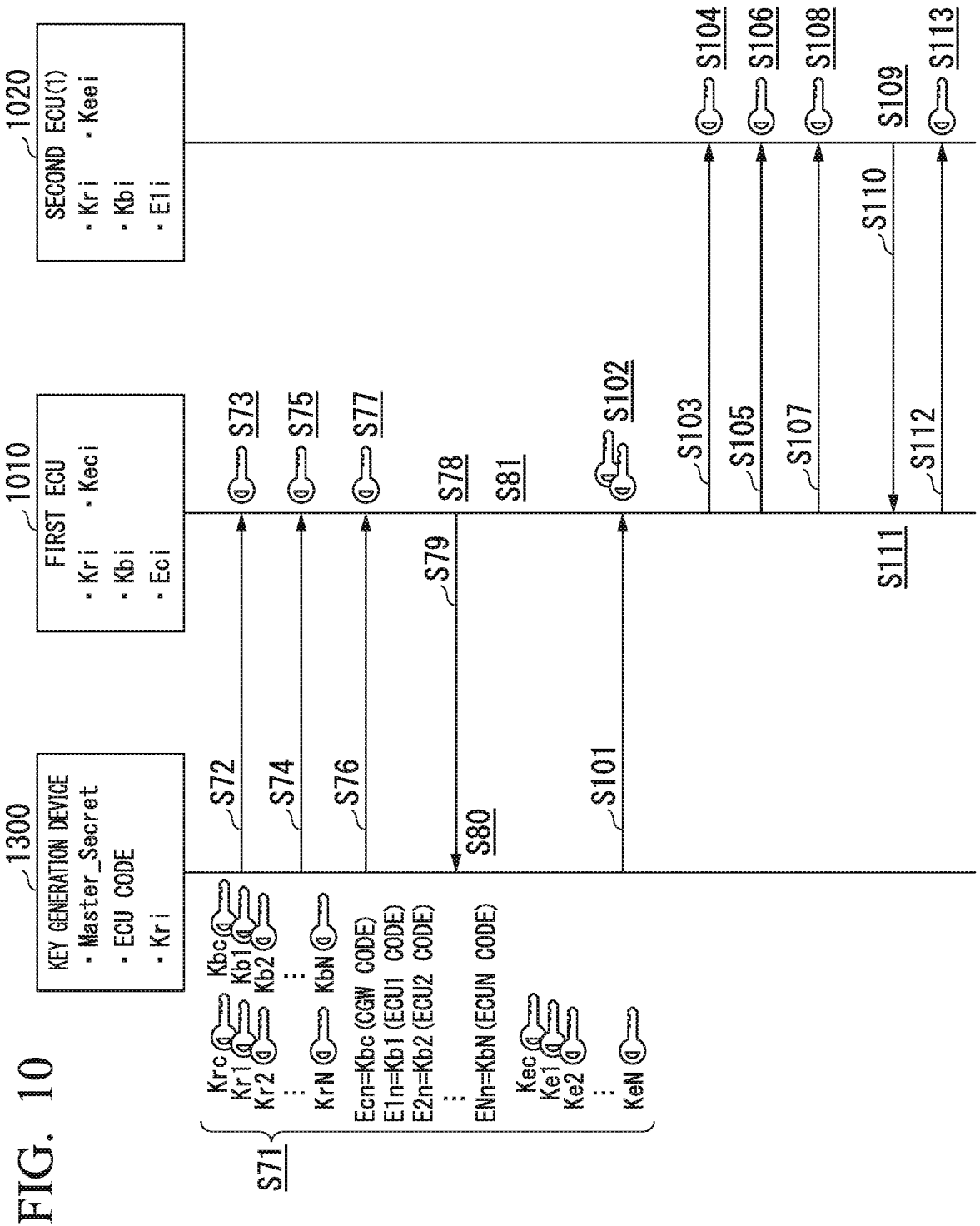
FIG. 10 is a sequence diagram of Example 6 of the management method according to an embodiment.

Example 6 of the management method is a modification example of Example 5 of the management method described above. FIG. 10 is a sequence diagram of Example 6 of the management method according to the present embodiment. In FIG. 10, portions corresponding to the respective units of FIG. 9 are denoted by the same reference numerals and signs, and thus the description thereof will not be given.

Hereinafter, points different from those in Example 5 of the management method described above will be mainly described with reference to FIG. 10.

The vehicle interface 11 of the key generation device 1300 and the diagnostic port 1060 of the car 1001 are connected to each other. The processes of steps S71 to S81 are executed. The processes of steps S71 to S81 are the same as those in Example 5 of the management method according to FIG. 9 described above. In a case where the secure boot result "pass" of the first ECU 1010 of the car 1001 received by the key generation device 1300 is determined to be correct, step S101 is executed subsequently to step S81. In this case, since the secure boot result of the first ECU 1010 is a "pass", the encryption key Kec can be used in the HSM 1012 of the first ECU 1010.

On the other hand, in a case where the secure boot result "pass" is determined not to be correct and a case where the key generation device 1300 has received the secure boot result "fail" of the first ECU 1010 of the car 1001, the process of FIG. 10 is terminated. In addition, in a case where the secure boot result "pass" is determined not to be correct and a case where the key generation device 1300 has received the secure boot result "fail" of the first ECU 1010 of the car 1001, the key generation device 1300 may execute the predetermined error processing.

(Step S101) The cryptographic processing unit 16 of the key generation device 1300 encrypts the Root key Krn, the signing key Kbn, the expected value Enn and the encryption key Ken of each of the N second ECUs (n) 1020 with the encryption key Kec of the first ECU 1010, respectively. N pieces of first encrypted data Kec (Kr1), Kec (Kr2), ..., Kec (KrN), N pieces of second encrypted data Kec (Kb1), Kec (Kb2), ..., Kec (KbN), N pieces of fourth encrypted data Kec (E1n), Kec (E2n), ..., Kec (ENn), and N pieces of seventh encrypted data Kec (Kc1), Kec (Kc2), ..., Kec (KeN) are generated by this encryption.

The key generation device 1300 transmits the N pieces of first encrypted data Kec (Kr1), Kec (Kr2), ..., Kec (KrN), the N pieces of second encrypted data Kec (Kb1), Kec (Kb2), ..., Kec (KbN), the N pieces of fourth encrypted data Kec (E1n), Kec (E2n), ..., Kec (ENn), and the N pieces of seventh encrypted data Kec (Ke1), Kec (Ke2), ..., Kec (KeN) to the first ECU 1010 of the car 1001 through the vehicle interface 11. The first ECU 1010 of the car 1001 receives the N pieces of first encrypted data Kec (Kr1), Kec (Kr2), ..., Kec (KrN), the N pieces of second encrypted data Kec (Kb1), Kec (Kb2), ..., Kec (KbN), the N pieces of fourth encrypted data Kec (E1n), Kec (E2n), ..., Kec (ENn), and the N pieces of seventh encrypted data Kec (Ke1), Kec (Ke2), ..., Kec (KeN) from the key generation device 1300 via the diagnostic port 1060 through the interface unit 20.

(Step S102) The control unit 21 of the first ECU 1010 delivers the N pieces of first encrypted data Kec (Kr1), Kec (Kr2), ..., Kec (KrN), the N pieces of second encrypted data Kec (Kb1), Kec (Kb2), ..., Kec (KbN), the N pieces of fourth encrypted data Kec (E1n), Kec (E2n), ..., Kec (ENn), and the N pieces of seventh encrypted data Kec (Ke1), Kec (Ke2), ..., Kec (KeN) to the HSM 1012, and executes decryption with the encryption key Kec. The HSM 1012 decrypts the N pieces of first encrypted data Kec (Kr1), Kec (Kr2), ..., Kec (KrN), the N pieces of second encrypted data Kec (Kb1), Kec (Kb2), ..., Kec (KbN), the N pieces of fourth encrypted data Kec (E1n), Kec (E2n), ..., Kec (ENn), and the N pieces of seventh encrypted data Kec (Ke1), Kec (Ke2), ..., Kec (KeN) with the encryption key Kec stored in the storage unit 1013, respectively. N Root keys Kr1, Kr2, ..., KrN, N signing keys Kb1, Kb2, ..., KbN, N expected values E1n, E2n, ..., ENn, and N encryption keys Ke1, Ke2, ..., KeN are acquired by this decryption. The HSM 1012 stores the acquired N Root keys Kr1, Kr2, ..., KrN, N signing keys Kb1. Kb2, ..., KbN, N expected values E1n, E2n, ..., ENn, and N encryption keys Ke1, Ke2, ..., KeN in the storage unit 1013.

Next, steps S103 and S104 re executed. Step S103 is the same as step S24 in Example 2 of the management method according to FIG. 6. Step S104 is the same as step S25 in Example 2 of the management method according to FIG. 6. Next, step S105 is executed.

(Step S105) The cryptographic processing unit 32 of the HSM 1012 of the first ECU 1010 encrypts the encryption key Ke1 of the second ECU (1) 1020 with the Root key Kr1 of the second ECU (1) 1020, to generate fifth encrypted data Kr1 (Ke1). The HSM 1012 delivers the fifth encrypted data Kr1 (Ke1) to the control unit 21. The control unit 21 generates a random number Nonce1. The storage unit 22 stores the random number Nonce1. The control unit 21 transmits the fifth encrypted data Kr1 (Ke1) and the random number Nonce1 to the second ECU (1) 1020 via the CAN 1030 through the interface unit 20. The second ECU (1) 1020 receives the fifth encrypted data Kr1 (Ke1) and the random number Nonce1 from the first ECU 1010 via the CAN 1030 through the interface unit 40.

(Step S106) The control unit 41 of the second ECU (1) 1020 delivers the fifth encrypted data Kr1 (Ke1) to the SHE 1022. The cryptographic processing unit 52 of the SHE 1022 decrypts the fifth encrypted data Kr1 (Ke1) with the Root key Kr1 stored in the storage unit 1023, and acquires the encryption key Ke1. The SHE 1022 stores the acquired encryption key Ke1 in the storage unit 1023. The SHE 1022 may store the acquired encryption key Ke1 in place of the initial encryption key Keel in the storage unit 1023. In the present embodiment, the encryption key Ke1 is set as an encryption key capable of being used in a case where the verification of the measured value has been passed in the secure boot process which is executed by the SHE 1022. Therefore, the encryption key Ke1 is not used in a case where the verification of the measured value has failed in the secure boot process which is executed by the SHE 1022.

The storage unit 42 stores the random number Nonce1. The storage place of the random number Nonce1 is a non-volatile storage area which is not a target for the measurement of secure boot among storage areas of the storage unit 42.

(Step S107) The cryptographic processing unit 32 of the HSM 1012 of the first ECU 1010 encrypts the signing key Kb1 of the second ECU (1) 1020 and expected value E1n with the Root key Kr1 of the second ECU (1) 1020, to generate the second encrypted data Kr1 (Kb1) and the fourth encrypted data Kr1 (E1n). The HSM 1012 delivers the second encrypted data Kr1 (Kb1) and the fourth encrypted data Kr1 (E1n) to the control unit 21. The control unit 21 transmits the second encrypted data Kr1 (Kb1) and the fourth encrypted data Kr1 (E1n) to the second ECU (1) 1020 via the CAN 1030 through the interface unit 20. The second ECU (1) 1020 receives the second encrypted data Kr1 (Kb1) and the fourth encrypted data Kr1 (E1n) from the first ECU 1010 via the CAN 1030 through the interface unit 40.

(Step S108) The control unit 41 of the second ECU (1) 1020 delivers the second encrypted data Kr1 (Kb1) and the fourth encrypted data Kr1 (E1n) to the SHE 1022. The cryptographic processing unit 52 of the SHE 1022 decrypts the second encrypted data Kr1 (Kb1) and the fourth encrypted data Kr1 (E1n) with the Root key Kr1 stored in the storage unit 1023, and acquires the signing key Kb1 and the expected value E1n. The SHE 1022 stores the acquired signing key Kb1 in the storage unit 1023. The SHE 1022 may store the acquired signing key Kb1 in place of the initial signing key Kbi in the storage unit 1023. In addition, the SHE 1022 sets the acquired expected value E1n to an expected value which is used in the secure boot process.

Next, step S109 is executed. Step S109 is the same as step S88 in Example 5 of the management method according to FIG. 9. Next, step S110 is executed.

(Step S110) In a case where the verification result for the measured value E1n_x received from SHE 1022 is a "pass", the control unit 41 delivers the random number Nonce1 stored in the storage unit 42 to the SHE 1022, and executes encryption with the encryption key Ke1. The cryptographic processing unit 52 of the SHE 1022 encrypts the random number Nonce1 with the encryption key Ke1 stored in the storage unit 1023, to generate sixth encrypted data Ke1 (Nonce1). The SHE 1022 delivers the sixth encrypted data Ke1 (Nonce1) to the control unit 41. On the other hand, in a case where the verification result for the measured value E1n_x received from the SHE 1022 is a "fail", the control unit 41 does not perform the encryption of the random number Nonce 1.

The control unit 41 transmits the "pass or fail" which is a verification result for the measured value E1n_x as the secure boot result to the first ECU 1010 via the CAN 1030 through the interface unit 40. At this time, in a case where the verification result for the measured value E1n_x is a "pass", the control unit 41 includes the sixth encrypted data Ke1 (Nonce1) in the secure boot result "pass (OK)". The first ECU 1010 receives the secure boot result "pass or fail" of the second ECU (1) 1020 from the second ECU (1) 1020 via the CAN 1030 through the interface unit 20.

Also, the random number Nonce1 as it is without encryption may be included in the secure boot result "pass (OK) by the control unit 41". In addition, the random number Nonce1 and the CMAC of the random number Nonce1 may be included in the secure boot result "pass (OK)" by the control unit 41. The CMAC of the random number Nonce1 may be calculated using the encryption key Ke1. In a case where the random number Nonce1 and the CMAC of the random number Nonce1 are included in the secure boot result "pass (OK)", either the random number Nonce1 or the CMAC of the random number Nonce1 or both the random number Nonce1 and the CMAC of the random number Nonce1 may be encrypted.

(Step S111) The control unit 21 of the first ECU 1010 delivers the sixth encrypted data Ke1 (Nonce1) included in the secure boot result "pass (OK)" of the second ECU (1) 1020 to the HSM 1012, and causes the HSM 1012 to execute decryption with the encryption key Ke1 of the second ECU (1) 1020. The cryptographic processing unit 32 of the HSM 1012 decrypts the sixth encrypted data Ke1 (Nonce1) with the encryption key Ke1 of the second ECU (1) 1020 stored in the storage unit 1013, and acquires the decrypted data Nonce 1. The HSM 1012 delivers the decrypted data Nonce1 to the control unit 21.

The control unit 21 compares the decrypted data Nonce1 with the random number Nonce1 stored in the storage unit 22, and determines whether both are coincident with each other. In a case where the result of this determination is that both are coincident with each other, the secure boot result "pass" of the second ECU (1) 1020 is determined to be correct.

In a case where the secure boot result "pass" is determined to be correct, the process proceeds to step S112. On the other hand, in a case where both are not coincident with each other, the secure boot result "pass" of the second ECU (1) 1020 is determined not to be correct. In a case where the secure boot result "pass" of the second ECU (1) 1020 is determined not to be correct, the process of FIG. 10 is terminated with respect to the second ECU (1) 1020. Thus, in a case where the secure boot result "pass" of the second ECU (1) 1020 is determined not to be correct, step S112 is not executed with respect to the second ECU (1) 1020. In addition, in a case where the secure boot result "pass" is determined not to be correct, the key generation device 1300 may execute the predetermined error processing.

In addition, in a case where the first ECU 1010 has received the secure boot result "fail" of the second ECU (1) 1020, the process of FIG. 10 is terminated with respect to the second ECU (1) 1020. Thus, in a case where the secure boot result "fail" of the second ECU (1) 1020 has been received, step S112 is not executed with respect to the second ECU (1) 1020. In addition, in a case where the secure boot result "fail" has been received, the first ECU 1010 may execute the predetermined error processing.

Next, steps S112 and S113 are executed. Step S112 is the same as step S59 in Example 4 of the management method according to FIG. 8. Step S113 is the same as step S60 in Example 4 of the management method according to FIG. 8.

The processes of steps S103 to S113 described above are similarly executed with respect to all the second ECUs (n) 1020 installed in the car 1001.

Also, the processes steps S103 to S113 described above are processes which are performed within the car 1001. Therefore, while the processes of steps S103 to S113 are executed, the vehicle interface 11 of the key generation device 1300 and the diagnostic port 1060 of the car 1001 may not be connected to each other.

According to Example 6 of the management method described above, similarly to Example 5 of the management method, the expected value of the ECU code of the ECU installed in the car 1001 is generated by the key generation device 1300 and is supplied to the ECU. The ECU verifies the measured value of its own ECU code on the basis of the expected value supplied from the key generation device 1300. According to Example 6 of the present management method, by notifying the key generation device 1300 the result of verification performed by the first ECU 1010, and thus the determination of authenticity of the first ECU 1010 installed in the car 1001 is performed. In addition, by notifying the first ECU 1010 the result of verification performed by the second ECU (n) 1020, and thus the determination of authenticity of the second ECU (n) 1020 installed in the car 1001 is performed. Thereby, the reliability of the ECU installed in the car 1001 is improved. In addition, the first ECU 1010 performs the determination of authenticity of the N second ECUs (n) 1020, and thus a time during which the key generation device 1300 and the car 1001 are connected to each other can be further shortened than in Example 5 of the management method.

Further, according to Example 6 of the management method described above, similarly to Example 5 of the management method, when the first ECU 1010 notifies the key generation device 1300 of the verification result for the measured value of its own ECU code, the verification value (random number Nonce in the above-described example) supplied from the key generation device 1300 is encrypted with an encryption key capable of being used in a case where the verification of the measured value has been passed to generate sixth encrypted data, and the sixth encrypted data is transmitted to the key generation device 1300. The encryption key is shared with the key generation device 1300. The key generation device 1300 decrypts the sixth encrypted data, and determines the coincidence between this decrypted data and an original verification value supplied to the first ECU 1010, whereby it is possible to confirm the validity of the verification result for the measured value of the ECU code of the first ECU 1010.

In addition, according to Example 6 of the management method described above, when the second ECU 1020 notifies the first ECU 1010 of the verification result for the measured value of its own ECU code, the verification value (random number Nonce1 in the above-described example) supplied from the first ECU 1010 is encrypted with an encryption key capable of being used in a case where the verification of the measured value has been passed to generate sixth encrypted data, and the sixth encrypted data is transmitted to the first ECU 1010. The encryption key is shared with the first ECU 1010. The first ECU 1010 decrypts the sixth encrypted data, and determines the coincidence between this decrypted data and an original verification value supplied to the second ECU 1020, whereby it is possible to confirm the validity of the verification result for the measured value of the ECU code of the second ECU 1020.

Also, the verification value (random number Nonce or random number Nonce1 in the above-described example) may be transmitted to the key generation device 1300 or the first ECU 1010 without being encrypted. In addition, the verification value and the CMAC of the verification value may be transmitted to the key generation device 1300 or the first ECU 1010. The CMAC of the verification value may be calculated using an encryption key capable of being used in a case where the verification of the measured value has been passed. In a case where the verification value and the CMAC of the verification value are transmitted to the key generation device 1300 or the first ECU 1010, either the verification value or the CMAC of the verification value or both the verification value and the CMAC of the verification value may be encrypted.

Another Configuration Example of Car

Figure 11:
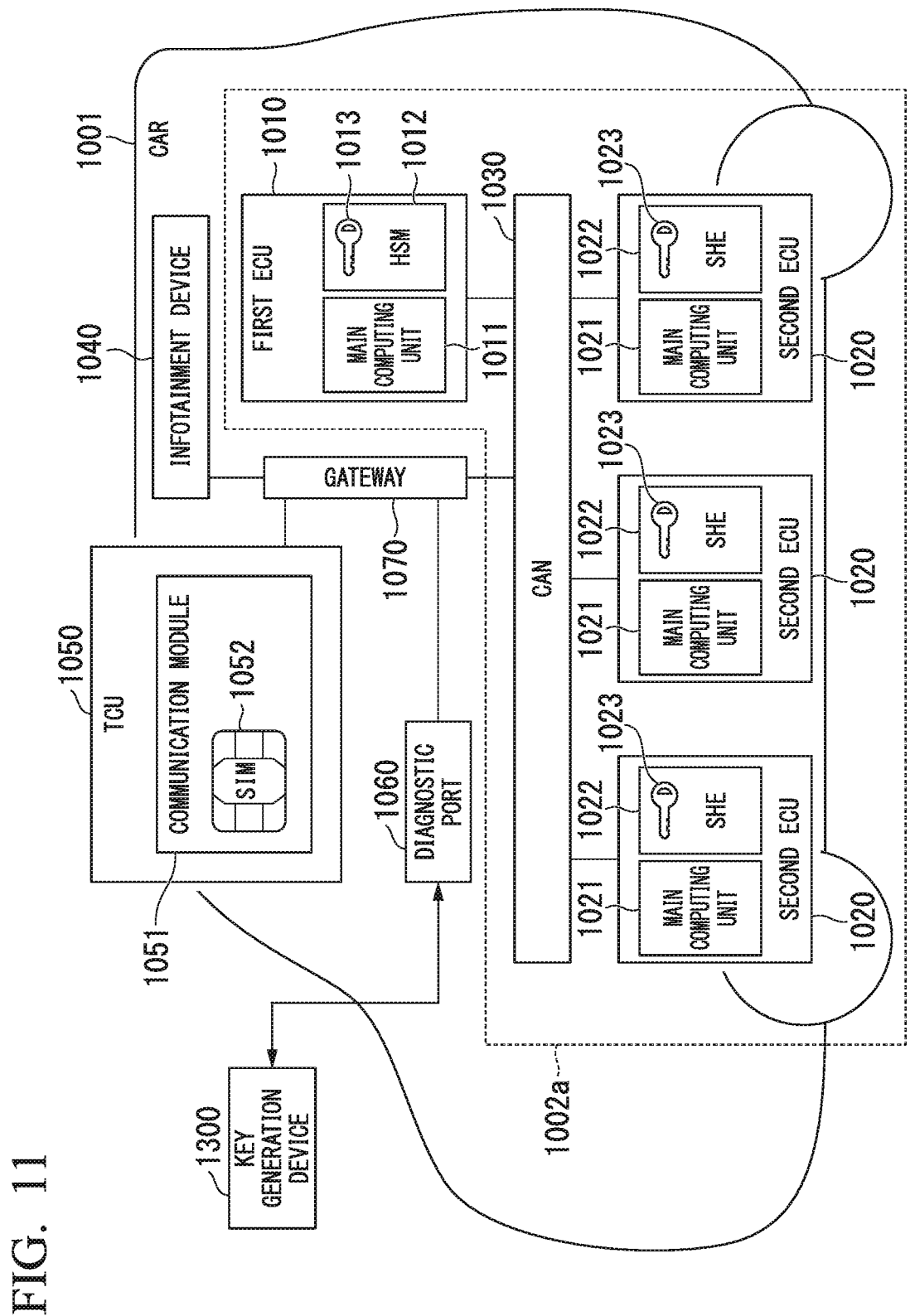
FIG. 11 is a diagram illustrating another configuration example of a management system and a car 1001 according to an embodiment.

FIG. 1 is a diagram illustrating another configuration example of the management system and the car 1001 according to the present embodiment. In FIG. 11, portions corresponding to the respective units of FIG. 1 are denoted by the same reference numerals and signs, and thus the description thereof will not be given. Hereinafter, points different from those in the car 1001 shown in FIG. 1 will be mainly described with reference to FIG. 11.

In FIG. 11, examples of points different from configuration shown in FIG. 1 include a point that the first ECU 1010 does not have a gateway function, and a point that a gateway 1070 is provided as a separate device from the first ECU 1010. The gateway 1070 is connected to the CAN 1030. The gateway 1070 is connected to the infotainment device 1040, the TCU 1050 and the diagnostic port 1060. An in-vehicle computer system 1002*a* included in the car 1001 shown in FIG. 11 is configured such that the first ECU 1010 and a plurality of second ECUs 1020 are connected to the CAN 1030. The first ECU 1010 and the second ECU 1020 perform communication with a device outside of the in-vehicle computer system 1002*a* through the gateway 1070. The gateway 1070 monitors communication between inside and outside of the in-vehicle computer system 1002*a*. In the present embodiment, the in-vehicle computer system 1002*a* functions as an in-vehicle control system of the car 1001.

Also, the CAN 1030 may be configured such that the CAN 1030 includes a plurality of buses (communication lines), and that the plurality of buses are connected to the gateway 1070. In this case, one ECU or a plurality of ECUs are connected to one bus. In addition, the first ECU 1010 and the second ECU 1020 may be connected to the same bus, or a bus to which the first ECU 1010 is connected and a bus to which the second ECU 1020 is connected may be configured separately.

Another Example of Management Method

Figure 12:
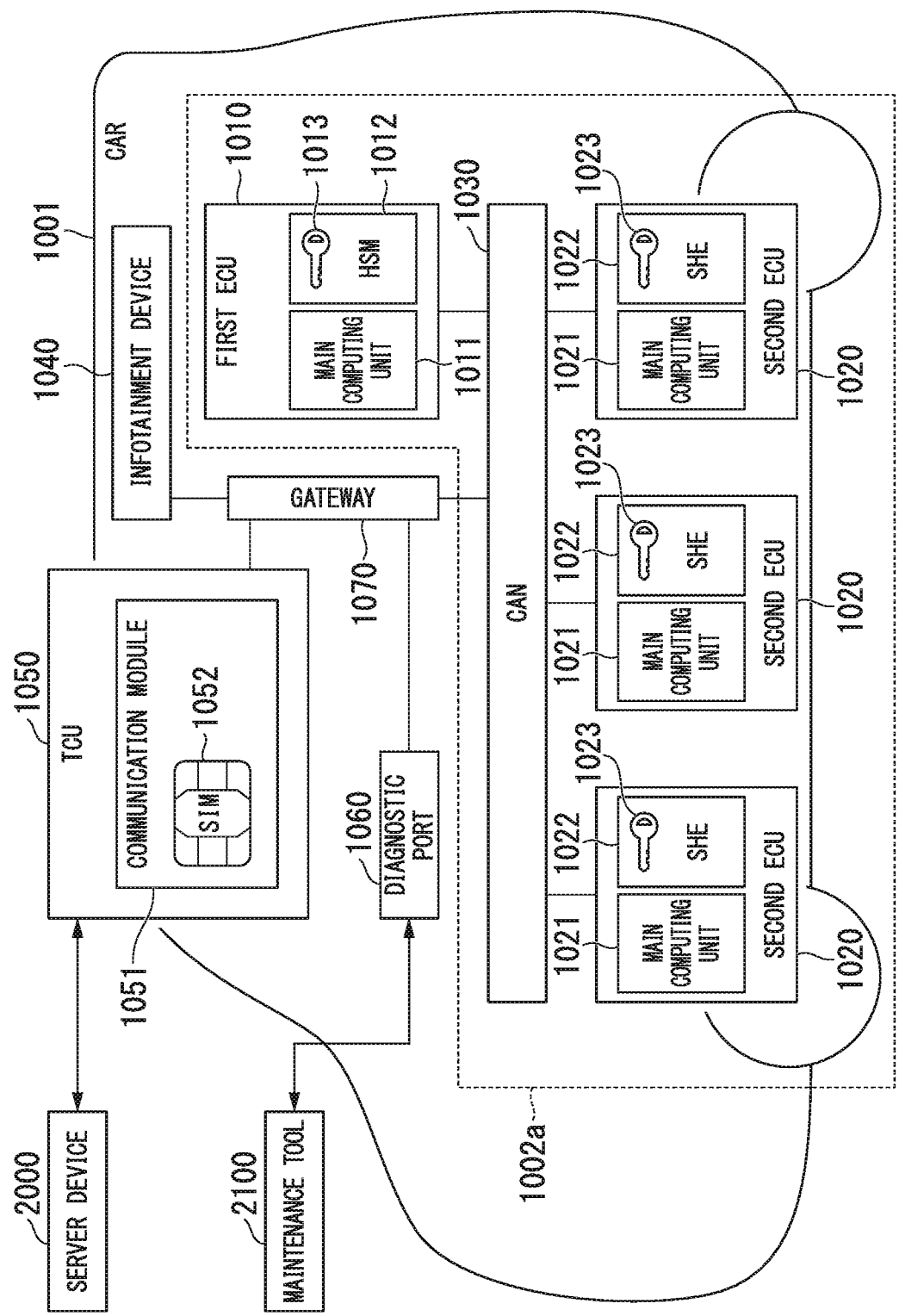
FIG. 12 is a diagram illustrating another configuration example of the management system according to an embodiment.

Another example of the management method will be described with reference to FIGS. 12, 13 and 14. Another example of the present management method is an example of a management method of an ECU code. FIG. 12 is a diagram illustrating another configuration example of the management system according to the present embodiment. In FIG. 12, the car 1001 has the configuration of FIG. 11 applied thereto. Meanwhile, the configuration of the car 1001 shown in FIG. 1 may be applied thereto. The management system shown in FIG. 12 includes a server device 2000.

The server device 2000 transmits and receives data to and from the communication module 1051 of the TCU 1050 of the car 1001 through a communication channel. The server device 2000 transmits and receives data to and from the communication module 1051 through a wireless communication network which is used by the communication module 1051 of the TCU 1050 of the car 1001. Alternatively, the server device 2000 may transmit and receive data to and from the communication module 1051 through a communication network such as the Internet and the wireless communication network. In addition, for example, the server device 2000 and the communication module 1051 may be connected to each other through a dedicated channel such as a virtual private network (VPN) channel, and data may be transmitted and received through the dedicated channel. For example, a dedicated channel such as a VPN channel may be provided by a wireless communication network corresponding to the SIM 1052.

The server device 2000 provides the car 1001 with an ECU code applied to an ECU. The ECU code is an example of data applied to an ECU. The ECU code may be a computer program such as an update program which is installed on an ECU, or may be setting data such as a parameter setting value which is set in an ECU.

A maintenance tool (maintenance tool) 2100 can be connected to the diagnostic port 1060 of the car 1001. The maintenance tool 2100 connected to the diagnostic port 1060 of the car 1001 can perform communication with an ECU which is connected to the CAN 1030 through the gateway 1070. The maintenance tool 2100 may have a function of a diagnostic terminal in the related art which is connected to an OBD port.

Figure 13:
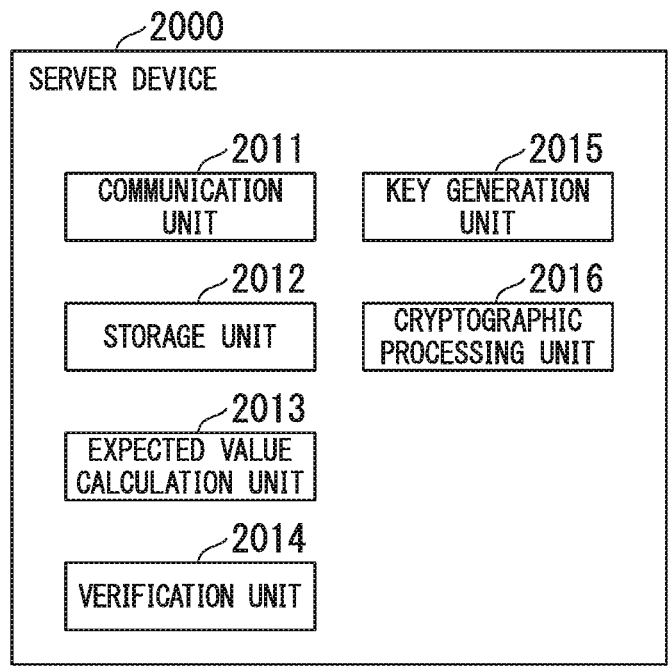
FIG. 13 is a diagram illustrating a configuration example of a server device 2000 according to an embodiment.
Figure 14:
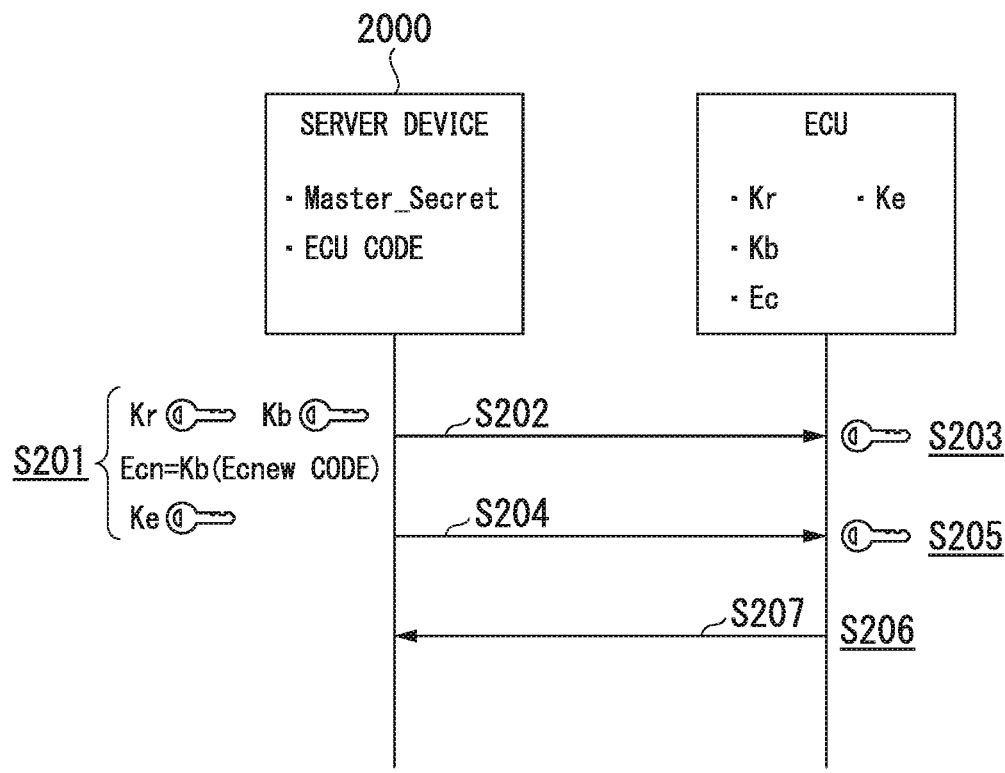
FIG. 14 is a sequence chart illustrating an example of an ECU code providing procedure according to an embodiment.

FIG. 13 is a diagram illustrating a configuration example of the server device 2000. In FIG. 13, the server device 2000 includes a communication unit 2011, a storage unit 2012, an expected value calculation unit 2013, a verification unit 2014, a key generation unit 2015, and a cryptographic processing unit 2016. The communication unit 2011 performs communication with other devices through a communication channel. The storage unit 2012 stores data such as a key. The expected value calculation unit 2013 calculates an expected value relating to the ECU code. The verification unit 2014 performs verification relating to the ECU code. The key generation unit 2015 generates a key of an ECU.

The cryptographic processing unit 2016 performs the encryption of data and the decryption of encrypted data.

The function of the server device 2000 is realized by a CPU included in the server device 2000 executing a computer program. Also, the server device 2000 may be configured using a general-purpose computer device, or may be configured as a dedicated hardware device.

Next, a procedure of another example of the management method will be described with reference to FIG. 14. FIG. 14 is a sequence chart illustrating an example of an ECU code providing procedure. Also, in FIG. 14, the ECU is an ECU which is installed in the car 1001, and may be the first ECU 1010 or the second ECU 1020.

The server device 2000 stores the master key Master_Secret and the ECU code of an ECU in advance in the storage unit 2012. The ECU code of an ECU includes an ECU code to be applied to the ECU. The ECU stores a Root key Kr, a signing key Kb, an encryption key Ke and an ECU code Ec in advance. In the first ECU 1010, the storage unit 1013 of the HSM 1012 stores each of the keys, and the storage unit 22 of the main computing unit 1011 stores the ECU code. In the second ECU 1020, the storage unit 1023 of the SHE 1022 stores each of the keys, and the storage unit 42 of the main computing unit 1021 stores the ECU code.

Hereinafter, the server device 2000 performs communication with the TCU 1050 of the car 1001 through the communication unit 2011 and transmits and receives data to and from each ECU which is connected to the CAN 1030 of the car 1001 through the TCU 1050 and the gateway 1070. In addition, in the following description, the first ECU 1010 and the second ECU 1020 are not particularly distinguished from each other, and are described as the ECU. Therefore, for convenience of description, a secure element refers to the HSM 1012 in a case where the ECU is the first ECU 1010, and refers to the SHE 1022 in a case where the ECU is the second ECU 1020. In addition, the storage unit of the secure element refers to the storage unit 1013 of the HSM 1012 in a case where the ECU is the first ECU 1010, and refers to the storage unit 1023 of the SHE 1022 in a case where the ECU is the second ECU 1020. In addition, the control unit of the ECU refers to the control unit 21 in a case where the ECU is the first ECU 1010, and refers to the control unit 41 in a case where the ECU is the second ECU 1020.

(Step S201) The key generation unit 2015 of the server device 2000 generates the Root key Kr, the signing key Kb and the encryption key Ke of the ECU installed in the car 1001. A method of generation these keys is the same as a method of generation the Root key, the signing key and the encryption key according to step S71 in Example 5 of the management method according to FIG. 9. For example, the value of the variable Nk for the Root key is set to Nk_1, the value of the variable Nk for the signing key is set to Nk_2, and the value of the variable Nk for the encryption key is set to Nk_3.

The key generation unit 2015 uses the master key Master_Secret and the ECU identifier ECU_ID of the ECU to generate the Root key Kr, the signing key Kb and the encryption key Ke as different keys on the basis of the following expressions:

Root key=digest (Master_Secret, ECU_ID, Nk_1).
Signing key=digest (Master_Secret, ECU_ID, Nk_2), and
Encryption key=digest (Master_Secret, ECU_ID, Nk_3).

The storage unit 2012 stores the Root key Kr, the signing key Kb and the encryption key Ke.

In addition, the expected value calculation unit 2013 of the server device 2000 calculates the CMAC of an ECU code (hereinafter, called an Ecnew code) to be applied to the ECU installed in the car 1001 using the signing key Kb. The CMAC of this calculation result is referred to as an expected value Ecn. The storage unit 2012 stores the expected value Ecn.

(Step S202) The server device 2000 transmits the expected value Ecn to the ECU through the communication unit 2011. The ECU receives the expected value Ecn transmitted from the server device 2000.

(Step S203) The secure element of the ECU sets the expected value Ecn received from the server device 2000 to an expected value which is used in the secure boot process.

(Step S204) The server device 2000 transmits the Ecnew code to the ECU through the communication unit 2011. The ECU receives the Ecnew code transmitted from the server device 2000.

(Step S205) The control unit of the ECU applies the Ecnew code received from the server device 2000 to its own self.

(Step S206) The control unit of the ECU executes secure boot alter the application of the Ecnew code. In this secure boot, the secure element of the ECU calculates the CMAC of the Ecnew code using the signing key Kb stored in the storage unit of the secure element, and performs the comparison of the CMAC of the calculation result with the expected value Ecn. In a case where the result of this comparison is that both are coincident with each other, the secure boot result is a pass. In a case where both are not coincident with each other, the secure boot result is a fail. The secure element of the ECU delivers the secure boot result to the control unit of the ECU. The control unit of the ECU advances the execution of the Ecnew code in a case where the secure boot result is a pass. On the other hand, the ECU stops the execution of the Ecnew code in a case where the secure boot result is a fail.

(Step S207) The ECU transmits the secure boot result "pass or fail" to the server device 2000. The server device 2000 receives the secure boot result "pass or fail" transmitted from the ECU through the communication unit 2011. The server device 2000 executes a predetermined process in accordance with the secure boot result "pass or fail" received from the ECU. For example, in a case where the secure boot result is a pass, that effect is recorded. On the other hand, in a case where the secure boot result is a fail, for example, the server device 2000 regenerates the expected value Ecn, and the server device 2000 and the ECU re-execute steps S202 to S207 described above. The regeneration of this expected value Ecn and the re-execution of steps S202 to S207 are repeated until the secure boot result is passed, or are repeated a predetermined number of times.

Next, a modification example of the ECU code providing procedure of FIG. 14 described above will be described.

Modification Example 1 of ECU Code Providing Procedure

In step S202, the server device 2000 encrypts the expected value Ecn with the cryptographic processing unit 2016, and transmits the encrypted value to the ECU. A key which is used in this encryption may be any of the Root key Kr, the signing key Kb or the encryption key Ke. The secure element of the ECU decrypts the encrypted data received from the server device 2000 with an applicable key stored in the storage unit of the secure element through its own cryptographic processing unit, and acquires the expected value Ecn.

Modification Example 2 of ECU Code Providing Procedure

In step S204, the server device 2000 encrypts the Ecnew code with the cryptographic processing unit 2016, and transmits the encrypted code to the ECU. A key which is used in this encryption may be any of the Root key Kr, the signing key Kb. or the encryption key Ke. The secure element of the ECU decrypts the encrypted data received from the server device 2000 an applicable key stored in the storage unit of the secure element through its own cryptographic processing unit, and acquires the Ecnew code.

Modification Example 3 of ECU Code Providing Procedure

Both Modification Example 1 of the ECU code providing procedure and Modification Example 2 of the ECU code providing procedure are applied. That is, both the expected value Ecn and the Ecnew code are encrypted, and are transmitted from the server device 2000 to the ECU.

Modification Example 4 of ECU Code Providing Procedure

In step S207, the secure boot result "pass or fail" which is transmitted from the ECU to the server device 2000 is set to a predetermined value. For example, a pass is "1", and a fail is "0".

Modification Example 5 of ECU Code Providing Procedure

In step S207, the secure boot result "pass or fail" which is transmitted from the ECU to the server device 2000 is set to the CMAC of the Ecnew code which is a result calculated in the secure boot of step S206. The verification unit 2014 of the server device 2000 compares the CMAC of the secure boot result received from the ECU with the expected value Ecn transmitted to the ECU in step S202. The verification unit 2014 of the server device 2000 determines that the secure boot result of the ECU is a pass in a case where the result of this comparison is that both are coincident with each other, and determines that the secure boot result of the ECU is a fail in a case where both are not coincident with each other.

Modification Example 6 of ECU Code Providing Procedure

The server device 2000 supplies a verification value (for example, random number Nonce) in advance to the ECU. In step S207, the ECU includes the verification value in the secure boot result "pass" in a case where the secure boot result is a pass, and does not include the verification value in the secure boot result "fail" in a case where the secure boot result is a fail. The verification unit 2014 of the server device 2000 compares the verification value included in the secure boot result "pass" received from the ECU with an original verification value supplied in advance to the ECU. The verification unit 2014 of the server device 2000 determines that the secure boot result of the ECU is a pass in a case where the result of this comparison is that both are coincident with each other, and determines that the secure boot result of the ECU is a fail in a case where both are not coincident with each other.

Modification Example 7 of ECU Code Providing Procedure

A combination of any plurality of Modification Examples 4, 5, and 6 of the ECU code providing procedures are applied.

Modification Example 8 of ECU Code Providing Procedure

In Modification Examples 4, 5, 6, and 7 of the ECU code providing procedures, the ECU the secure boot result using the cryptographic processing unit of the secure element, and transmits the encrypted result to the server device 2000. A key which is used in this encryption may be any of the Root key Kr or the signing key Kb. The server device 2000 decrypts the encrypted data received from the ECU with an applicable key stored in the storage unit 2012 through the cryptographic processing unit 2016 and acquires the secure boot result. Also, in a case where the secure boot result is a pass, the encryption key Ke can be used, and thus the secure boot result "pass" may be encrypted with the encryption key Ke.

According to another example of the management method described above, the server device 2000 provides the ECU with the expected value of the ECU code applied to the ECU. The ECU verifies the ECU code provided from the server device 2000 on the basis of the expected value of the ECU code provided from the server device 2000. The ECU transmits the verification result for the ECU code to the server device 2000. Thereby, it is possible to improve the reliability of the ECU code applied to the ECU.

In another example of the management method described above, the server device 2000 corresponds to a data providing device, and the communication unit 2011 corresponds to a vehicle interface.

Also, the maintenance tool 2100 may be configured to have the same function as that of the server device 2000, and to provide the ECU with the ECU code via the diagnostic port 1060 through the same ECU code providing procedure as that of the server device 2000.

In addition, the TCU 1050 of the car 1001 may receive the ECU code from the server device 2000, generate an expected value with respect to the received ECU code, and provide the ECU with the expected value of the generated ECU code. For example, the SIM 1052 of the communication module 1051 of the TCU 1050 stores the master key Master_Secret in advance, generates a key which is used in the generation of the CMAC using the master key Master_Secret and the ECU identifier ECU_ID of the ECU, and calculates the CMAC (expected value) of the ECU code using the generated key.

In addition, the first ECU 1010 of the car 1001 may receive the ECU code of the second ECU 1020 from the server device 2000, generate an expected value with respect to the received ECU code of the second ECU 1020, and provide the second ECU 1020 with the generated expected value of the ECU code of the second ECU 1020. For example, the HSM 1012 of the first ECU 1010 may store the master key Master_Secret in advance, generate a key which is used in the generation of the CMAC using the master key Master_Secret and the ECU identifier ECU_ID of the second ECU 1020, and calculate the CMAC (expected value) of the ECU code of the second ECU 1020 using the generated key.

Hereinbefore, the embodiments of the present invention have been described in detail with the accompanying drawings, but specific configurations are not limited to these embodiments, and also include a change in design and the like without departing from the scope of the present invention.

In the above-described embodiment, the HSM or the SHE is included in the ECU, but cryptographic processing chips other than the HSM and the SHE may be used. A cryptographic processing chip referred to as, for example, "trusted platform module (TPM) f" may be used in the first ECU 1010. The TPMf is tamper resistant. The TPMf is an example of the secure element. A cryptographic processing chip referred to as, for example, "TPMt" may be used in the second ECU 1020. The TPMt is tamper resistant. The TPMt is an example of the secure element.

The above-described embodiment may be applied to a new ECU installed in a car in a process of manufacturing a car in a car manufacturing plant. In addition, the above-described embodiment may be applied to a new ECU installed in a car when the ECU of a car is newly exchanged in a car maintenance factory, store or the like.

In the above-described embodiment, an example of a vehicle includes a car, but the embodiment can also be applied to vehicles other than a car such as a motorized bicycle or a railroad vehicle.

In addition, a computer program for realizing the key generation device or the function of the ECU described above is recorded in a computer readable recording medium, and thus a computer system may be caused to read and execute the program recorded in this recording medium. Also, the term "computer system" as used herein may have an OS or hardware such as peripheral devices included therein.

In addition, the term "computer readable recording medium" refers to a writable non-volatile memory such as a flexible disk, a magnetooptic disc, a ROM, or a flash memory, a portable medium such as a digital versatile disc (DVD), or a storage device such as a hard disk built into the computer system.

Further, the term "computer readable recording medium" also includes a medium that holds a program for a certain period of time like a volatile memory (for example, dynamic random access memory (DRAM)) inside a computer system serving as a server or a client when the program is transmitted through networks such as the Internet or communication lines such as a telephone line.

In addition, the above program may be transmitted from a computer system having the program stored in a storage device or the like through a transmission medium or through transmitted waves in the transmission medium to other computer systems. Here, the "transmission medium" that transmits a program refers to a medium having a function of transmitting information like networks (communication networks) such as the Internet or communication channels (communication lines) such as a telephone line.

In addition, the above-mentioned program may realize a portion of the above-mentioned functions.

Further, the above-mentioned program may be a so-called difference file (difference program) capable of realizing the above-mentioned functions by a combination with a program which is already recorded in a computer.

INDUSTRIAL APPLICABILITY

According to the present invention, an effect is obtained in which it is possible to improve the reliability of an in-vehicle computer such as an ECU installed in a vehicle such as a car.

REFERENCE SIGNS LIST

11 Vehicle interface
12, 22, 42, 2012 Storage unit
13, 2013 Expected value calculation unit
14, 2014 Verification unit
15, 34, 2015 Key generation unit
16, 32, 52, 2016 Cryptographic processing unit
20, 40 Interface unit
21, 41 Control unit
31, 51 Measured value calculation unit
33, 53 Measurement unit
1001 Car
1002, 1002*a* In-vehicle computer system
1010 First ECU
1011, 1021 Main computing unit
1012 HSM
1013, 1023 Storage unit
1020 Second ECU
1022 SHE
1030 CAN
1040 Infotainment device
1050 TCU
1051 Communication module
1052 SIM
1060 Diagnostic port
1070 Gateway
1300 Key generation device
2000 Server device
2011 Communication unit
2100 Maintenance tool

The invention claimed is:

1. A management system comprising:
a key generation device; and
a plurality of in-vehicle computers which are installed in a vehicle,
wherein the key generation device includes:
at least one first memory configured to store instructions; and
at least one first processor configured to execute the instructions to:
generate a first key and a second key which are stored in the plurality of in-vehicle computers,
encrypt the first key with an initial key which is stored in advance in the plurality of in-vehicle computers to generate first encrypted data, and encrypt the second key with the first key to generate second encrypted data,
calculate an expected value of stored data which is stored in advance in the plurality of in-vehicle computers using the second key, and
decrypt third encrypted data received from the vehicle with the first key to acquire a measured value, and verify on the basis of the measured value acquired by decrypting and the calculated expected value,
wherein the first encrypted data and the second encrypted data are transmitted to the vehicle, and
wherein each of the plurality of in-vehicle computers includes:
at least one second memory configured to store instructions; and
at least one second processor configured to execute the instructions to:
decrypt the first encrypted data transmitted from the key generation device with the initial key which is stored in advance in the plurality of in-vehicle computers to acquire the first key, and decrypt the second encrypted data transmitted from the key generation device with the acquired first key to acquire the second key, and
calculate the measured value of the stored data which is stored in advance in the plurality of in-vehicle computers using the acquired second key,
wherein:
the at least one second processor is configured to encrypt the measured value with the acquired first key to generate the third encrypted data,
the third encrypted data is transmitted to the key generation device, and
a first in-vehicle computer out of the plurality of in-vehicle computers relays, to a second in-vehicle computer out of the plurality of in-vehicle computers, the first encrypted data and the second encrypted data, which are transmitted from the key generation device when the measured value acquired by decrypting matches the calculated expected value.

2. A management system comprising:
a key generation device; and
an in-vehicle computer which is installed in a vehicle,
wherein the key generation device includes:
at least one first memory configured to store instructions; and
at least one first processor configured to execute the instructions to:
generate a first key and a second key which are stored in the in-vehicle computer,
calculate an expected value of stored data which is stored in advance in the in-vehicle computer using the second key, and
encrypt the first key with an initial key which is stored in advance in the in-vehicle computer to generate first encrypted data, encrypt the second key with the first key to generate second encrypted data, and encrypt the expected value with the first key, which is the same key used to encrypt the second key, to generate fourth encrypted data,
wherein the first encrypted data, the second encrypted data and the fourth encrypted data are transmitted to the vehicle, and
wherein the in-vehicle computer includes:
at least one second memory configured to store instructions; and
at least one second processor configured to execute the instructions to:
decrypt the first encrypted data received from the key generation device with the initial key which is stored in advance in the in-vehicle computer to acquire the first key, decrypt the second encrypted data received from the key generation device with the first key acquired by the decryption with the initial key to acquire the second key, and decrypt the fourth encrypted data received from the key generation device with the first key, which is acquired by the decryption with the initial key and being the same key used to acquire the second key, to acquire the expected value, and
calculate a measured value of the stored data which is stored in advance in the in-vehicle computer using the acquired second key, and verify the measured value on the basis of the expected value, which is acquired using the first key which is the same key used to acquire the second key,
wherein a verification result for the measured value is transmitted.

3. The management system according to claim 2,
wherein a plurality of the in-vehicle computers are installed in the vehicle, and a first in-vehicle computer out of the plurality of in-vehicle computers relays the first encrypted data, the second encrypted data and the fourth encrypted data, transmitted from the key generation device, to a second in-vehicle computer out of the plurality of in-vehicle computers.

4. A management system comprising:
a key generation device; and
an in-vehicle computer which is installed in a vehicle,
wherein the key generation device includes:
at least one first memory configured to store instructions; and
at least one first processor configured to execute the instructions to:
generate a first key and a second key which are stored in the in-vehicle computer,
calculate an expected value of stored data which is stored in advance in the in-vehicle computer using the second key, and
encrypt the first key with an initial key which is stored in advance in the in-vehicle computer to generate first encrypted data, encrypt the second key with the first key to generate second encrypted data, and encrypt the expected value with the first key to generate fourth encrypted data,
wherein a verification value, the first encrypted data, the second encrypted data and the fourth encrypted data are transmitted to the vehicle,
wherein the in-vehicle computer includes:
at least one second memory configured to store instructions; and
at least one second processor configured to execute the instructions to:
decrypt the first encrypted data received from the key generation device with the initial key which is stored in advance in the in-vehicle computer to acquire the first key, decrypt the second encrypted data received from the key generation device with the acquired first key to acquire the second key, and decrypt the fourth encrypted data received from the key generation device with the acquired first key to acquire the expected value, and
calculate a measured value of the stored data which is stored in advance in the in-vehicle computer using the acquired second key, and verify the measured value on the basis of the acquired expected value,
wherein a verification result for the measured value is transmitted,
wherein the at least one second processor is configured to transmit the verification result which is inclusive of the verification value received from the key generation device in a case where the verification of the measured value has been passed, and transmit the verification result which is not inclusive of the verification value received from the key generation device in a case where the verification of the measured value has failed, and
wherein the at least one first processor is configured to verify the verification value included in the verification result received from the vehicle on the basis of the verification value supplied to the vehicle.

5. The management system according to claim 4,
wherein a plurality of the in-vehicle computers are installed in the vehicle, and a first in-vehicle computer out of the plurality of in-vehicle computers relays the first encrypted data, the second encrypted data and the fourth encrypted data, transmitted from the key generation device, to a second in-vehicle computer out of the plurality of in-vehicle computers.

6. A key generation device comprising:
at least one memory configured to store instructions; and
at least one processor configured to execute the instructions to:
generate a first key and a second key which are stored in a plurality of in-vehicle computers installed in a vehicle;
encrypt the first key with an initial key which is stored in advance in the plurality of in-vehicle computers to generate first encrypted data, and encrypt the second key with the first key to generate second encrypted data;
calculate an expected value of stored data which is stored in advance in the plurality of in-vehicle computers using the second key; and
decrypt third encrypted data received from the vehicle with the first key to acquire a measured value, and verify on the basis of the measured value acquired by decrypting and the calculated expected value,
wherein the first encrypted data and the second encrypted data are transmitted to the vehicle for relaying to another in-vehicle computer when the measured value acquired by decrypting matches the calculated expected value.

7. An in-vehicle computer which is installed in a vehicle, comprising:
at least one memory configured to store instructions; and
at least one processor configured to execute the instructions to:
decrypt first encrypted data transmitted from a key generation device with an initial key which is stored in advance in the in-vehicle computer to acquire a first key, and decrypt second encrypted data transmitted from the key generation device with the acquired first key to acquire a second key; and
calculate a measured value of stored data which is stored in advance in the in-vehicle computer using the acquired second key, wherein:
the at least one processor is configured to encrypt the measured value with the acquired first key to generate third encrypted data,
the third encrypted data is transmitted to the key generation device, and
a first in-vehicle computer out of a plurality of in-vehicle computers relays, to a second in-vehicle computer out of the plurality of in-vehicle computers, the first encrypted data and the second encrypted data, which are transmitted from the key generation device when the measured value acquired by decrypting matches the calculated expected value.

8. A key generation device comprising:
at least one memory configured to store instructions; and
at least one processor configured to execute the instructions to:
generate a first key and a second key which are stored in an in-vehicle computer installed in the vehicle;
calculate an expected value of stored data which is stored in advance in the in-vehicle computer using the second key; and
encrypt the first key with an initial key which is stored in advance in the in-vehicle computer to generate first encrypted data, encrypt the second key with the first key to generate second encrypted data, and encrypt the expected value with the first key, which is the same key used to encrypt the second key, to generate fourth encrypted data,
wherein the first encrypted data, the second encrypted data and the fourth encrypted data are transmitted to the vehicle.

9. An in-vehicle computer which is installed in a vehicle, comprising:
at least one memory configured to store instructions; and
at least one processor configured to execute the instructions to:
decrypt first encrypted data received from a key generation device with an initial key which is stored in advance in the in-vehicle computer to acquire a first key, decrypt second encrypted data received from the key generation device with the first key acquired by the decryption with the initial key to acquire a second key, and decrypt fourth encrypted data received from the key generation device with the first key, which is acquired by the decryption with the initial key and being the same key used to acquire the second key, to acquire an expected value; and
calculate a measured value of stored data which is stored in advance in the in-vehicle computer using the acquired second key, and verify the measured value on the basis of the expected value, which is acquired using the first key which is the same key used to acquire the second key,
wherein a verification result for the measured value is transmitted.

10. A method of managing a management system including a key generation device and a plurality of in-vehicle computers which are installed in a vehicle, the method comprising:
causing the key generation device to generate a first key and a second key which are stored in the plurality of in-vehicle computers;
causing the key generation device to encrypt the first key with an initial key which is stored in advance in the plurality of in-vehicle computers to generate first encrypted data, and to encrypt the second key with the first key to generate second encrypted data;
causing each of the plurality of in-vehicle computers to decrypt the first encrypted data transmitted from the key generation device through an interface unit that transmits and receives data to and from a device outside of the in-vehicle computer with the initial key which is stored in advance in the in-vehicle computer to acquire the first key, and to decrypt the second encrypted data transmitted from the key generation device through the interface unit with the acquired first key to acquire the second key;
causing the each of the plurality of in-vehicle computers to calculate a measured value of stored data which is stored in advance in the in-vehicle computer using the acquired second key;
causing the each of the plurality of in-vehicle computers to encrypt the measured value with the acquired first key to generate third encrypted data;
causing the each of the plurality of in-vehicle computers to transmit the third encrypted data to the key generation device through the interface unit;
causing the key generation device to calculate an expected value of stored data which is stored in advance in the plurality of in-vehicle computers using the second key;

causing the key generation device to decrypt the third encrypted data received from the vehicle through a vehicle interface that transmits and receives data to and from the vehicle with the first key to acquire the measured value;

causing the key generation device to verify on the basis of the measured value acquired by decrypting and the expected value that is calculated in the key generation device; and causing a first in-vehicle computer out of the plurality of in-vehicle computers to relay, to a second in-vehicle computer out of the plurality of in-vehicle computers, the first encrypted data and the second encrypted data, which are transmitted from the key generation device when the measured value acquired by decrypting matches the calculated expected value.

11. A method of managing a management system including a key generation device and an in-vehicle computer which is installed in a vehicle, the method comprising:

causing the key generation device to generate a first key and a second key which are stored in the in-vehicle computer;

causing the key generation device to calculate an expected value of stored data which is stored in advance in the in-vehicle computer using the second key;

causing the key generation device to encrypt the first key with an initial key which is stored in advance in the in-vehicle computer to generate first encrypted data, to encrypt the second key with the first key to generate second encrypted data, and to encrypt the expected value with the first key, which is the same key used to encrypt the second key, to generate fourth encrypted data;

causing the in-vehicle computer to decrypt the first encrypted data received from the key generation device through an interface unit that transmits and receives data to and from a device outside of the in-vehicle computer with the initial key which is stored in advance in the in-vehicle computer to acquire the first key, to decrypt the second encrypted data received from the key generation device through the interface unit with the first key acquired by the decryption with the initial key to acquire the second key, and to decrypt the fourth encrypted data received from the key generation device through the interface unit with the first key, which is acquired by the decryption with the initial key and being the same key used to acquire the second key, to acquire the expected value;

causing the in-vehicle computer to calculate a measured value of stored data which is stored in advance in the in-vehicle computer using the acquired second key, and verify the measured value on the basis of the expected value, which is acquired using the first key which is the same key used to acquire the second key; and causing the in-vehicle computer to transmit a verification result for the measured value through the interface unit.

12. A method of managing a management system including a key generation device and an in-vehicle computer which is installed in a vehicle, the method comprising:

causing the key generation device to generate a first key and a second key which are stored in the in-vehicle computer;

causing the key generation device to calculate an expected value of stored data which is stored in advance in the in-vehicle computer using the second key;

causing the key generation device to encrypt the first key with an initial key which is stored in advance in the in-vehicle computer to generate first encrypted data, to encrypt the second key with the first key to generate second encrypted data, and to encrypt the expected value with the first key to generate fourth encrypted data;

causing the in-vehicle computer to decrypt the first encrypted data received from the key generation device through an interface unit that transmits and receives data to and from a device outside of the in-vehicle computer with the initial key which is stored in advance in the in-vehicle computer to acquire the first key, to decrypt the second encrypted data received from the key generation device through the interface unit with the acquired first key to acquire the second key, and to decrypt the fourth encrypted data received from the key generation device through the interface unit with the acquired first key to acquire the expected value;

causing the in-vehicle computer to calculate a measured value of stored data which is stored in advance in the in-vehicle computer using the acquired second key, and verify the measured value on the basis of the acquired expected value;

causing the in-vehicle computer to generate a verification result for the measured value which is inclusive of a verification value received from the key generation device through the interface unit in a case where the verification of the measured value has been passed, and to generate the verification result which is not inclusive of the verification value received from the key generation device through the interface unit in a case where the verification of the measured value has failed;

causing the in-vehicle computer to transmit the verification result through the interface unit; and causing the key generation device to verify the verification value included in the verification result received from the vehicle through a vehicle interface on the basis of the verification value supplied to the vehicle.

13. A non-transitory computer-readable recording medium storing a computer program causing a computer of a key generation device having a vehicle interface that transmits and receives data to and from a vehicle to execute the following processes of:

generating a first key and a second key which are stored in an in-vehicle computer installed in the vehicle;

encrypting the first key with an initial key which is stored in advance in the in-vehicle computer to generate first encrypted data, and encrypting the second key with the first key to generate second encrypted data;

calculating an expected value of stored data which is stored in advance in the in-vehicle computer using the second key;

decrypting third encrypted data received from the vehicle through the vehicle interface with the first key to acquire a measured value, and verifying on the basis of the measured value acquired by decrypting and the expected value that is calculated; and transmitting the first encrypted data and the second encrypted data to the vehicle through the vehicle interface for relaying to another vehicle when the measured value acquired by decrypting matches the calculated expected value.

14. A non-transitory computer-readable recording medium storing a computer program causing an in-vehicle computer which is installed in a vehicle to execute the following processes of:

decrypting first encrypted data received from a key generation device through an interface unit that transmits and receives data to and from a device outside of the in-vehicle computer with an initial key which is stored in advance in the in-vehicle computer to acquire a first key, and decrypting second encrypted data received from the key generation device through the interface unit with the acquired first key to acquire a second key;

calculating a measured value of stored data which is stored in advance in the in-vehicle computer using the acquired second key;

encrypting the measured value with the acquired first key to generate third encrypted data; and transmitting the third encrypted data to the key generation device through the interface unit, wherein a first in-vehicle computer out of a plurality of in-vehicle computers relays, to a second in-vehicle computer out of the plurality of in-vehicle computers, the first encrypted data and the second encrypted data, which are transmitted from the key generation device when the measured value acquired by decrypting matches the calculated expected value.

15. A non-transitory computer-readable recording medium storing a computer program causing a computer of a key generation device having a vehicle interface that transmits and receives data to and from a vehicle to execute the following processes of:

generating a first key and a second key which are stored in an in-vehicle computer installed in the vehicle;

calculating an expected value of stored data which is stored in advance in the in-vehicle computer using the second key;

encrypting the first key with an initial key which is stored in advance in the in-vehicle computer to generate first encrypted data, encrypting the second key with the first key to generate second encrypted data, and encrypting the expected value with the first key, which is the same key used to encrypt the second key, to generate fourth encrypted data; and transmitting the first encrypted data, the second encrypted data and the fourth encrypted data to the vehicle through the vehicle interface.

16. A non-transitory computer-readable recording medium storing a computer program causing an in-vehicle computer which is installed in a vehicle to execute the following processes of:

decrypting first encrypted data received from a key generation device through an interface unit that transmits and receives data to and from a device outside of the in-vehicle computer with an initial key which is stored in advance in the in-vehicle computer to acquire a first key, decrypting second encrypted data received from the key generation device through the interface unit with the first key acquired by the decryption with the initial key to acquire a second key, and decrypting fourth encrypted data received from the key generation device through the interface unit with the first key, which is acquired by the decryption with the initial key and being the same key used to acquire the second key, to acquire an expected value;

calculating a measured value of stored data which is stored in advance in the in-vehicle computer using the acquired second key, and verifying the measured value on the basis of the expected value, which is acquired using the first key which is the same key used to acquire the second key; and transmitting a verification result for the measured value through the interface unit.

17. A management system comprising:
a data providing device; and
an in-vehicle computer which is installed in a vehicle,
wherein the data providing device includes:
at least one first memory configured to store instructions; and
at least one first processor configured to execute the instructions to:
generate a first key and a second key which are stored in the in-vehicle computer,
calculate an expected value of applied data which is applied to the in-vehicle computer using the second key, and
encrypt the first key with an initial key which is stored in advance in the in-vehicle computer to generate first encrypted data, encrypt the second key with the first key to generate second encrypted data, and encrypt the expected value with the first key, which is the same key used to encrypt the second key, to generate fourth encrypted data,
wherein the applied data, the first encrypted data, the second encrypted data and the fourth encrypted data are transmitted to the vehicle, and
a verification result for a measured value of the applied data is received from the vehicle,
wherein the in-vehicle computer includes:
at least one second memory configured to store instructions; and
at least one second processor configured to execute the instructions to:
decrypt the first encrypted data received from the data providing device with the initial key which is stored in advance in the in-vehicle computer to acquire the first key, decrypt the second encrypted data received from the data providing device with the first key acquired by the decryption with the initial key to acquire the second key, and decrypt the fourth encrypted data received from the data providing device with the first key, which is acquired by the decryption with the initial key and being the same key used to acquire the second key, to acquire the expected value, and
calculate the measured value of the applied data received from the data providing device using the acquired second key, and verify the measured value on the basis of the expected value, which is acquired using the first key which is the same key used to acquire the second key,
wherein the verification result for the measured value is transmitted to the data providing device.

18. A method of managing a management system including a data providing device and an in-vehicle computer which is installed in a vehicle, the method comprising:
causing the data providing device to generate a first key and a second key which are stored in the in-vehicle computer;
causing the data providing device to calculate an expected value of applied data which is applied to the in-vehicle computer using the second key;
causing the data providing device to encrypt the first key with an initial key which is stored in advance in the in-vehicle computer to generate first encrypted data, encrypt the second key with the first key to generate second encrypted data, and encrypt the expected value with the first key, which is the same key used to encrypt the second key, to generate fourth encrypted data;

causing the data providing device to transmit the applied data, the first encrypted data, the second encrypted data and fourth encrypted data to the vehicle through a vehicle interface that transmits and receives data to and from the vehicle;

causing the in-vehicle computer to decrypt the first encrypted data received from the data providing device through an interface unit that transmits and receives data to and from a device outside of the in-vehicle computer with the initial key which is stored in advance in the in-vehicle computer to acquire the first key, decrypt the second encrypted data received from the data providing device through the interface unit with the acquired first key acquired by the decryption with the initial key to acquire the second key, and decrypt the fourth encrypted data received from the data providing device through the interface unit with the first key, which is acquired by the decryption with the initial key and being the same key used to acquire the second key, to acquire the expected value;

causing the in-vehicle computer to calculate a measured value of the applied data received from the data providing device through the interface unit using the acquired second key, and to verify the measured value on the basis of the expected value, which is acquired using the first key which is the same key used to acquire the second key;

causing the in-vehicle computer to transmit a verification result for the measured value to the data providing device through the interface unit; and causing the data providing device to receive the verification result for the measured value of the applied data from the vehicle through the vehicle interface.

19. A non-transitory computer-readable recording medium storing a computer program causing a computer of a data providing device including a vehicle interface that transmits and receives data to and from a vehicle to execute the following processes of:

generating a first key and a second key which are stored in an in-vehicle computer which is installed in the vehicle;

calculating an expected value of applied data which is applied to the in-vehicle computer using the second key;

encrypting the first key with an initial key which is stored in advance in the in-vehicle computer to generate first encrypted data, encrypting the second key with the first key to generate second encrypted data, and encrypting the expected value with the first key, which is the same key used to encrypt the second key, to generate fourth encrypted data;

transmitting the applied data, the first encrypted data, the second encrypted data and the fourth encrypted data to the vehicle through the vehicle interface; and receiving a verification result for a measured value of the applied data from the vehicle through the vehicle interface.

20. A non-transitory computer-readable recording medium storing a computer program causing an in-vehicle computer which is installed in a vehicle to execute the following processes of:

decrypting first encrypted data received from a data providing device through an interface unit, which transmits and receives data to and from a device outside of the in-vehicle computer, with an initial key which is stored in advance in the in-vehicle computer to acquire a first key, decrypting second encrypted data received from the data providing device through the interface unit with the acquired first key acquired by the decryption with the initial key to acquire a second key, and decrypting the fourth encrypted data received from the data providing device through the interface unit with the first key, which is acquired by the decryption with the initial key and being the same key used to acquire the second key, to acquire the expected value, calculating a measured value of applied data received from the data providing device through the interface unit using the acquired second key, and verifying the measured value on the basis of the expected value, which is acquired using the first key which is the same key used to acquire the second key; and transmitting a verification result for the measured value to the data providing device through the interface unit.

* * * * *

UNITED STATES PATENT AND TRADEMARK OFFICE
CERTIFICATE OF CORRECTION

PATENT NO. : 11,212,087 B2
APPLICATION NO. : 16/307681
DATED : December 28, 2021
INVENTOR(S) : Takemori et al.

It is certified that error appears in the above-identified patent and that said Letters Patent is hereby corrected as shown below:

In the Claims

Column 58, Line 30 (Claim 20, Line 14) please change "decrypting the fourth" to -- decrypting fourth --

Signed and Sealed this
Seventeenth Day of May, 2022

Katherine Kelly Vidal
Director of the United States Patent and Trademark Office